United States Patent
Fu et al.

(10) Patent No.: US 12,458,957 B2
(45) Date of Patent: Nov. 4, 2025

(54) METAL-CONTAINING MOR-TYPE ZEOLITES FOR CAPTURE OF CARBON DIOXIDE FROM LOW-$CO_2$ CONTENT SOURCES AND METHODS OF USING THE SAME

(71) Applicant: California Institute of Technology, Pasadena, CA (US)

(72) Inventors: Donglong Fu, Pasadena, CA (US); Mark E. Davis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 282 days.

(21) Appl. No.: 18/149,942

(22) Filed: Jan. 4, 2023

(65) Prior Publication Data
US 2023/0234038 A1 Jul. 27, 2023

Related U.S. Application Data

(60) Provisional application No. 63/377,586, filed on Sep. 29, 2022, provisional application No. 63/352,908, filed on Jun. 16, 2022, provisional application No. 63/296,396, filed on Jan. 4, 2022.

(51) Int. Cl.
| | |
|---|---|
| *B01D 53/02* | (2006.01) |
| *B01D 53/04* | (2006.01) |
| *B01D 53/26* | (2006.01) |
| *B01J 29/00* | (2006.01) |
| *B01J 29/18* | (2006.01) |
| *B01J 29/85* | (2006.01) |
| *B01J 29/90* | (2006.01) |
| *B01J 38/02* | (2006.01) |

(52) U.S. Cl.
CPC ............ *B01J 29/18* (2013.01); *B01D 53/04* (2013.01); *B01D 53/261* (2013.01); *B01J 29/005* (2013.01); *B01J 29/85* (2013.01); *B01J 29/90* (2013.01); *B01J 38/02* (2013.01); *B01D 2253/1085* (2013.01); *B01D 2253/1122* (2013.01); *B01D 2257/504* (2013.01); *B01D 2257/80* (2013.01); *B01D 2259/40083* (2013.01)

(58) Field of Classification Search
CPC ........ B01D 2253/106; B01D 2253/108; B01D 2253/1085; B01D 2253/1122; B01D 2256/10; B01D 2256/12; B01D 2257/504; B01D 2257/80; B01D 2258/06; B01D 2259/40083; B01D 53/02; B01D 53/04; B01D 53/261; B01J 29/005; B01J 29/18; B01J 29/85; B01J 29/90; B01J 38/02; B01J 38/06; Y02C 20/40
See application file for complete search history.

(56) References Cited

U.S. PATENT DOCUMENTS

| | | | |
|---|---|---|---|
| 6,468,501 B1 * | 10/2002 | Chen | C01B 39/026 502/61 |
| 2005/0234279 A1 * | 10/2005 | Serra | C07C 6/126 585/475 |
| 2017/0022129 A1 * | 1/2017 | Salciccioli | C07C 41/09 |
| 2021/0054512 A1 * | 2/2021 | Abo-Hashema | C25B 3/23 |
| 2021/0214237 A1 * | 7/2021 | Rimer | C01B 39/265 |
| 2022/0280912 A1 * | 9/2022 | Fu | B01J 20/2808 |
| 2023/0249152 A1 * | 8/2023 | Fu | C01B 39/48 95/117 |

FOREIGN PATENT DOCUMENTS

| | | |
|---|---|---|
| WO | 2018/034570 A1 | 2/2018 |
| WO | 2021/206564 A1 | 10/2021 |

OTHER PUBLICATIONS

Baerlocher et al., Atlas of Zeolite Framework Types, Sixth Revised Edition, 2007.
Bhatt et al., "A fine-tuned fluorinated MOF addresses the needs for trace CO2 removal and air capture Using physisorption", J. Am. Chem. Soc., 2016, 138, 9301-9307.
Bonelli et al., "Vibrational and thermodynamic study of the adsorption of carbon dioxide on the zeolite Na-ZSM-5", Langmuir, 2000, 16, 4976-4983.
Boronat et al., "Demonstrated that the O33 site is active for the selective carbonylation of DME as it stabilizes the adsorbed methoxy species. Enzyme-like Specificity in Zeolites: A unique site position in mordenite for selective carbonylation of methanol and dimethyl ether with Co", J. Am. Chem. Soc., 2008, 130, 16316-16323.
Cartraud et al., "Carbon Dioxide Adsorption by Synthetic Mordenite Isotherms and Differential Heat of Adsorption", Thermochimica Acta, 1967, 197-211.
Delgado et al., "Adsorption equilibrium of carbon dioxide, methane and nitrogen onto Na- and H-mordenite at high pressures", Science Direct, 2006, 223-228.
Dell'Osso et al., "Mixed-Gas Adsorption and Vacuum Desorption of Carbon Dioxide on Molecular Sieve. Bed Design for Use in a Humid Atmosphere", Ind. Eng. Chem. Process Des. Dev., 1969, 8(4), 469-476.
Fu et al., "Zinc containing small-pore zeolites for capture of low concentration carbon dioxide", Angew. Chem. Int. Ed., 2022, 61, e202112916.
Hernandez-Huesca et al., "Adsorption equilibria and kinetics of CO2, CH4 and N2 in natural zeolites", Separation and Purification Technology, 1999, 163-173.

(Continued)

*Primary Examiner* — Christopher P Jones
(74) *Attorney, Agent, or Firm* — MERCHANT & GOULD P.C.

(57) ABSTRACT

The present disclosure is directed to metal ion-containing zeolitic compositions having MOR topology that are useful for scavenging $CO_2$ from low-$CO_2$-content feed streams, including air, and method of making and using the same.

28 Claims, 57 Drawing Sheets

(56) References Cited

OTHER PUBLICATIONS

Itadani et al., "Material Exhibiting Efficient CO2 Adsorption at Room Temperature for Concentrations Lower Than 1000 ppm: Elucidation of the State of Barium Ion Exchanged in an MFI-Type Zeolite", Applied Materials Interface, 2016, 8821-8833.

Jiao et al., "Shape-selective zeolites promote ethylene formation from syngas via a ketene intermediate", Angew. Chem. Int. Ed., 2018, 57, 4692-4696.

Khuoschchev et al., "Isotherms and Isosteric Heats of Adsorption of CO2 on Synthetic Sodium Faujasites and Mordenites", Physical Chem., 1970, 2298-2303.

Kim et al., "Surface Energetic Heterogeneity of Nanoporous Solids for CO2 and CO Adsorption: The Key to an Adsorption Capacity and Selectivity at Low Pressures", Journal Nanoscience and Nanotechnology, 2016, 4474-4479.

Kwon et al., "Tailoring the CO2 selective adsorption properties of MOR zeolites by post functionalization", Journal CO2 Utilization, 2022, 7 pages.

Mcdonald et al., "Capture of carbon dioxide from air and flue gas in the alkylamineappended Metal-Organic Framework mmen-Mg2(dobpdc)", J. Am. Chem. Soc., 2012, 134, 7056-7065.

Mukherjee et al., "Trace CO2 capture by an ultramicroporous physisorbent with low water affinity", Sci. Adv., 2019, 5, eaax9171.

Perrotta et al., "The synthesis, characterization, and catalytic activity of omega and ZSM-4 zeolites", J. Catal., 1978, 55, 240-249.

Pham et al., "Have shown that the No. of energetically favorable sites is decisive for adsorption of low pressure CO2, while CO2 molecules at high pressure can sit in all available sites, i.e., Na cations Experimental and computational studies on the adsorption of CO2 and N2 on pure silica zeolites", Microporous Mesoporous Mater, 2014, 185, 157-166.

Rim et al., "Sub-ambient temperature direct air capture of CO2 using amine-impregnated MIL101(Cr) enables ambient temperature CO2 recovery", JACS, 2022, 2, 380-393.

Sagues et al., "Enhanced carbon dioxide removal from coupled direct air capture-bioenergy systems Sustain", Energy Fuels, 2019, 3, 3135-3146.

Sanz-Perez et al., "Direct capture of CO2 from ambient air", Chern. Rev., 2016, 116, 11840-11876.

Thakkar et al., "CO2 Capture from Air Using Amine Functionalized Kaolin-Based Zeolites", Chemical Engineering and Technology, 2007, 1999-2007.

Triebe et al., "Adsorption of nitrogen, carbon monoxide, carbon dioxide and nitric oxide on molecular sieves", Gas. Sep. Purif., 1995, 223-230.

Ullah et al., "Adsorption equilibrium studies of CO2, CH4 and N2 on various modified zeolites at high pressures up to 200 bars", Micro. and Meso. Materials, 2018, 49-58.

Vansant et al., "Adsorption of Binary Gas Mixtures in lon-exchanged Forms of Mordenite", J. Chem. Soc., 1981, 1371-1380.

Villarreal et al., "Adsorption and separation of CO2 from N2-rich gas on zeolites: Na-X faujasite vs Na-mordenite", Journal of CO2 Utilization, 2017, 266-275.

Villarreal et al., "Analysis of the interaction of CO2 with Na, K, and Ca-exchanged Mordenite. An infrared spectroscopic study", J. Mex Chem. Society, 2017, 102-108.

Wang et al., "Adsorption Separation of Low Concentrations of CO2 and NO2 by Synthetic Zeolites", Energy and Fuels, 1998, 1055-1060.

Wang et al., "Characterization and CO2 Adsorptivity of Acid-Washed and Cation-Exchanged Natural Mordenites", J. Colloid and Interface Science, 1997, 300-306.

Wang et al., "Modifying the acidity of H-MOR and its catalytic carbonylation of dimethyl ether", Chin. J. Catal., 2016, 37, 1530-1537.

Wang et al., "The Separate Removal of Trace 14C02 and Moist NOx from Off-gases by Adsorption on H-type Mordenite", Absorp Sci and Tech, 1999, 255-268.

Ward et al., "The infrared spectra of carbon dioxide adsorbed on zeolite", X. J. Phys. Chem., 1966, 70, 1178-1182.

Yamoshia et al., "Synthetic and natural MOR zeolites as high-capacity adsorbents for the removal of nitrous oxide", Chemical Common., 2021, 1312-1315.

Yang et al., "CO2 adsorption over ion-exchanged zeolite beta with alkali and alkaline earth metal ions", Microporous Mesoporous Mater., 2010, 135, 90-94.

Zhang et al., "Differences between ZSM-5 and ZSM-11 zeolite catalysts in 1- hexene aromatization and isomerization", Fuel Process Technol., 2010, 91, 449-455.

Zhang, "A. Synthesis of large mordenite crystals with different aspect ratios", Microporous Mesoporous Mater., 2009, 126, 115-124.

Zhou et al., "Self-assembled iron-containing mordenite monolith for carbon dioxide sieving", Science, 2021, 315-320.

Zhu et al., "Ultrafast, OSDA-free synthesis of mordenite zeolite", Cryst Eng Comm., 2017, 19, 632-640.

* cited by examiner

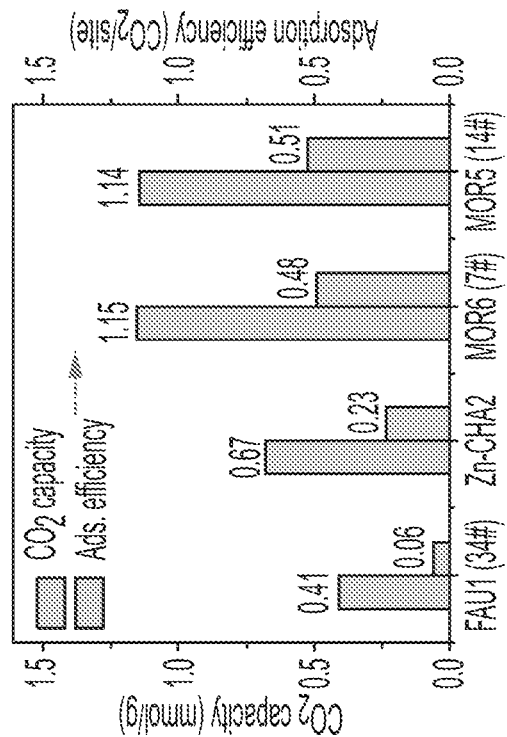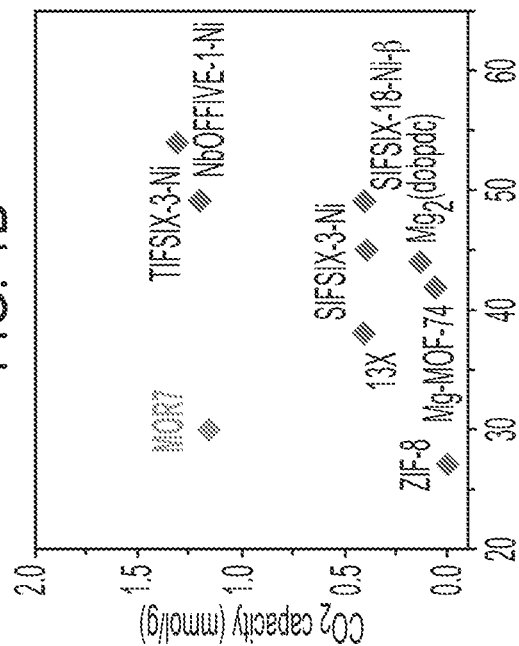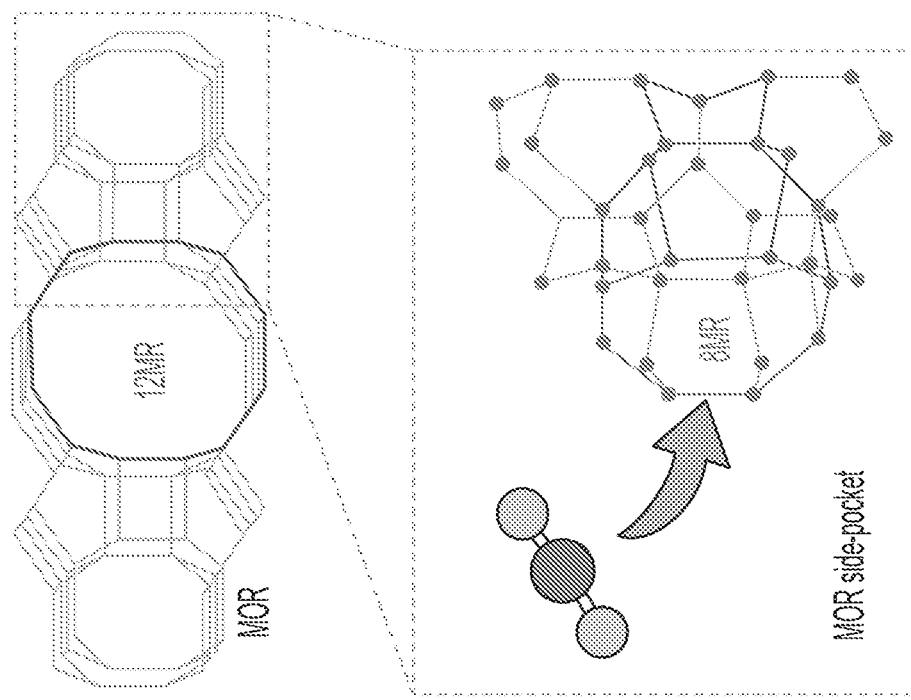
FIG. 1A
FIG. 1B
FIG. 1C

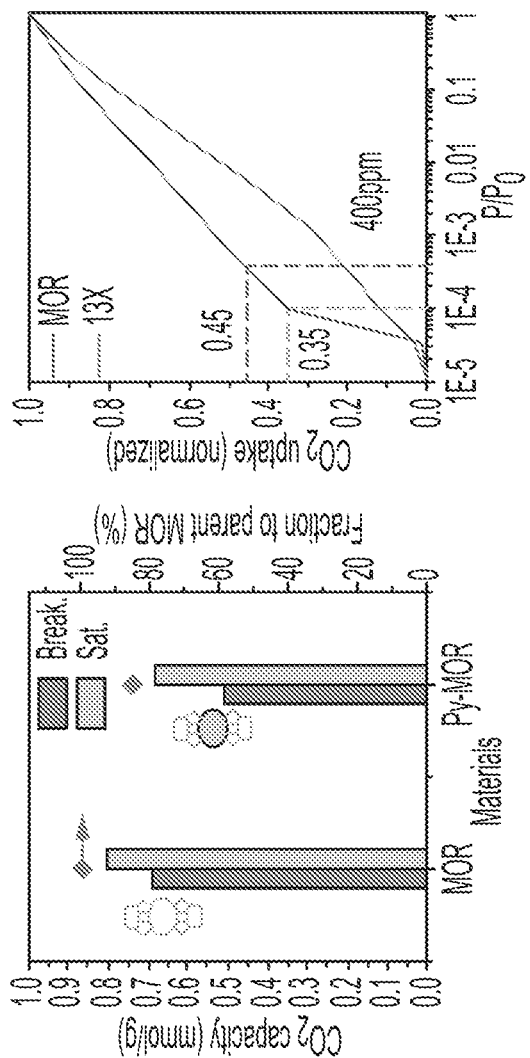
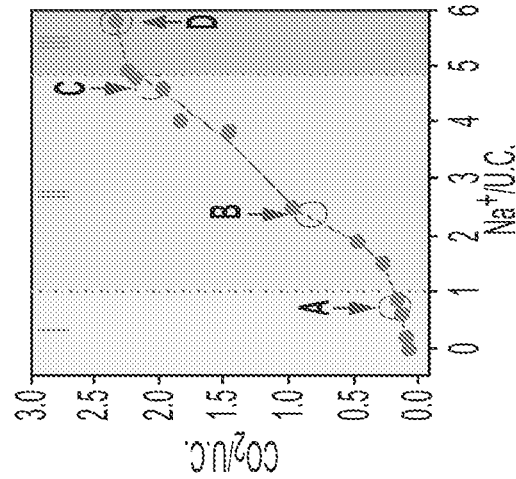
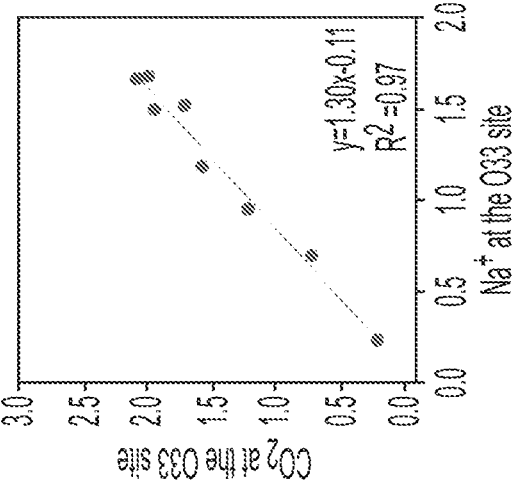
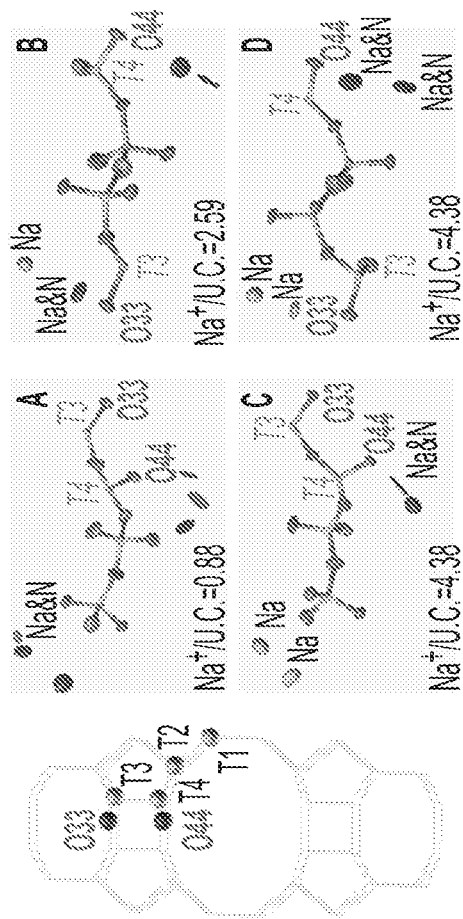
FIG. 2A
FIG. 2B
FIG. 2C
FIG. 2D
FIG. 2E

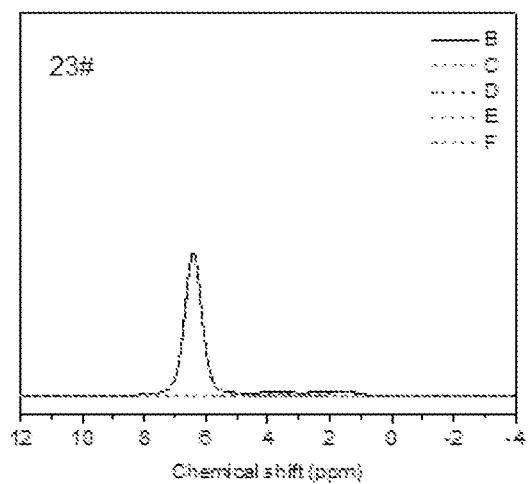
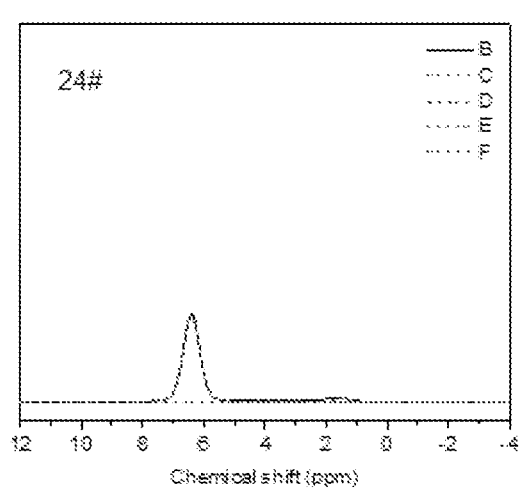
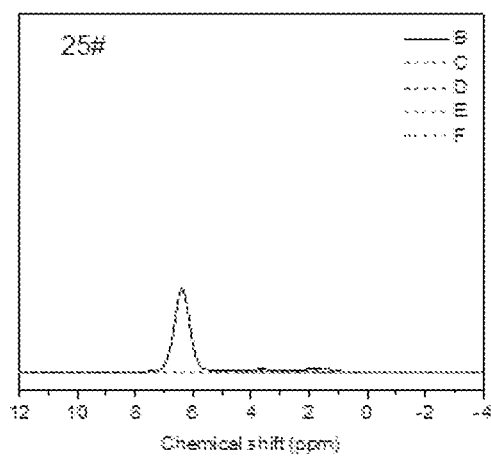
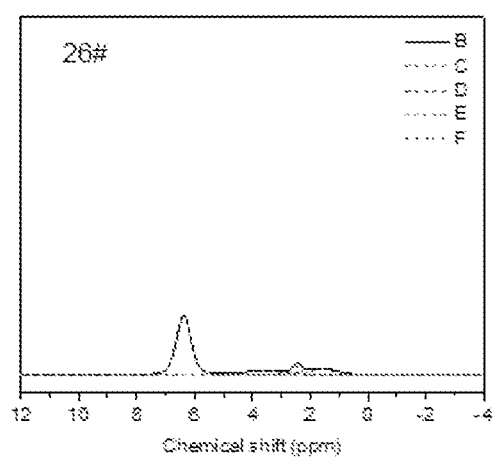
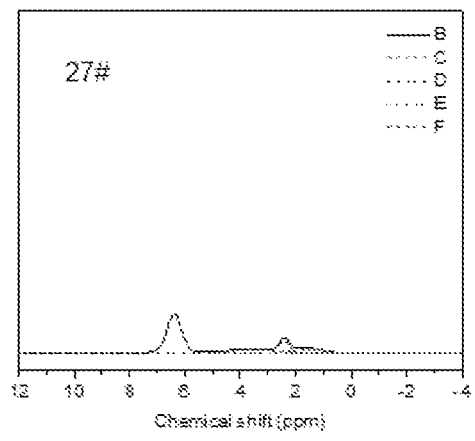
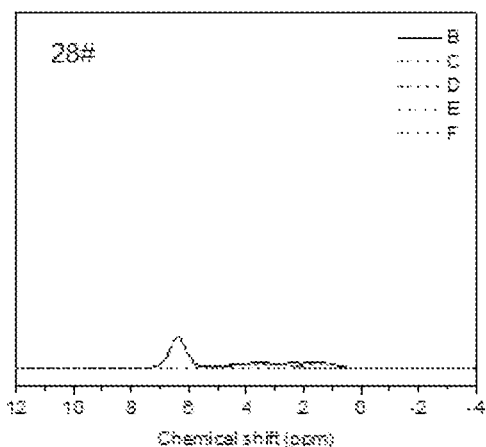
FIG. 22 (cont)

Adsorption conditions: 30°C, flow rate 20 mL/min, 500 mg zeolites; CO2/N2: 400 ppmCO2/ 1% Ar (internal standard)/ 20% He/N2
Desorption conditions: 500 min at 60°C, 120 min at 550°C

| Sample code | Sample source | Adsorbent | Si/Al ratio a | Na/Al |
|---|---|---|---|---|
| 1 | Commercial | Na-HSZ620 | 7.36 | 0.93 |
| 2 | Commercial | Na-HSZ640 | 9.19 | 0.67 |
| 3 | Commercial | Na-HSZ660 | 12.79 | 0.83 |
| 4 | Commercial | CBV10A | 5.81 | 1.03 |
| 5 | OSDA-directed synthesis | | 5.30 | 0.91 |
| 6 | OSDA-directed synthesis | | 5.67 | 0.95 |
| 7 | OSDA-directed synthesis | | 5.04 | 0.89 |
| 8 | OSDA-directed synthesis | | 5.35 | 0.86 |
| 9 | OSDA-directed synthesis | | 5.37 | 0.83 |
| 10 | OSDA-directed synthesis | | 5.51 | 0.82 |
| 11 | OSDA-directed synthesis | | 5.10 | 0.81 |
| 12 | OSDA-directed synthesis | | 5.72 | 0.90 |
| 13 | OSDA-directed synthesis | | 4.89 | 0.98 |
| 14 | OSDA-free synthesis | | 4.38 | 0.75 |
| 15 | OSDA-free synthesis | | 9.46 | 1.03 |
| 16 | OSDA-free synthesis | | 13.47 | 0.94 |

FIG. 40

| Cation | Uptake (mmol/g) | |
|---|---|---|
| | 1 bar | 400 ppm |
| Li | 3.67 | 1.00 |
| Na | 3.32 | 0.77 |
| K | 2.83 | 0.27 |
| Rb | 2.36 | 0.15 |
| Li-2IE | | |

FIG. 45

| Cation | Uptake (mmol/g) | |
|---|---|---|
| | 1 bar | 400 ppm |
| Na | 3.34 | 0.77 |
| Mg | 3.03 | 0.41 |
| Ca | 3.10 | 0.87 |
| Sr | 3.10 | 0.93 |
| Ba | 2.82 | 0.60 |

FIG. 46

| Cation | Uptake (mmol/g) | |
| --- | --- | --- |
| | 1 bar | 400 ppm |
| Li | | |
| Na | 2.39 | 0.02 |
| K (as rec.) | 2.62 | 0.02 |
| Zn-uncal. | 1.67 | 0.05 |
| Zn-air | 1.71 | 0.006 |
| Zn-He | 2.04 | 0.01 |

FIG. 47

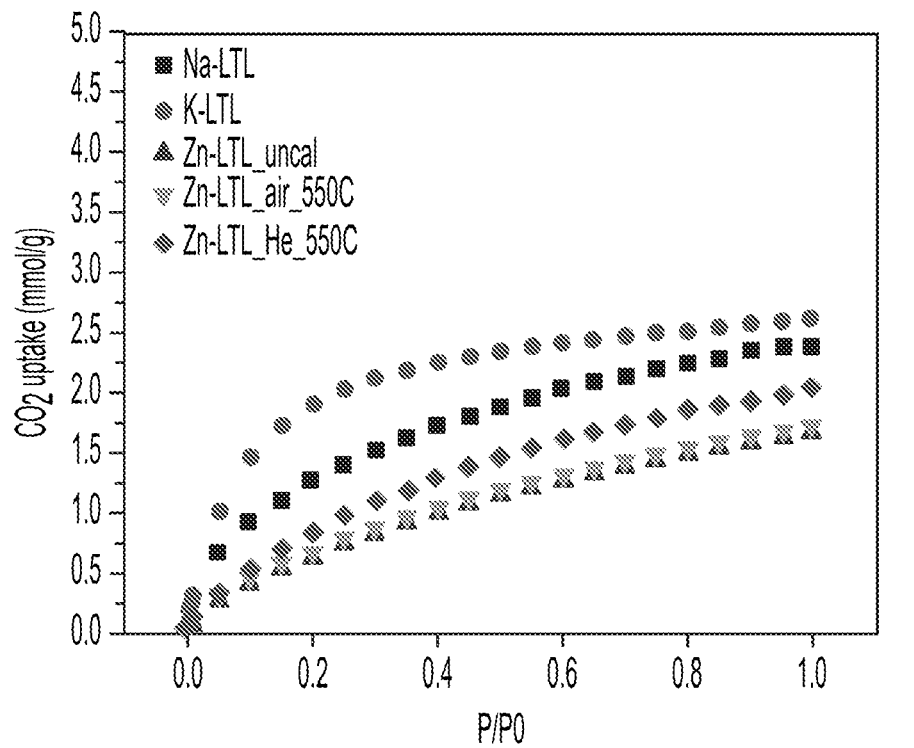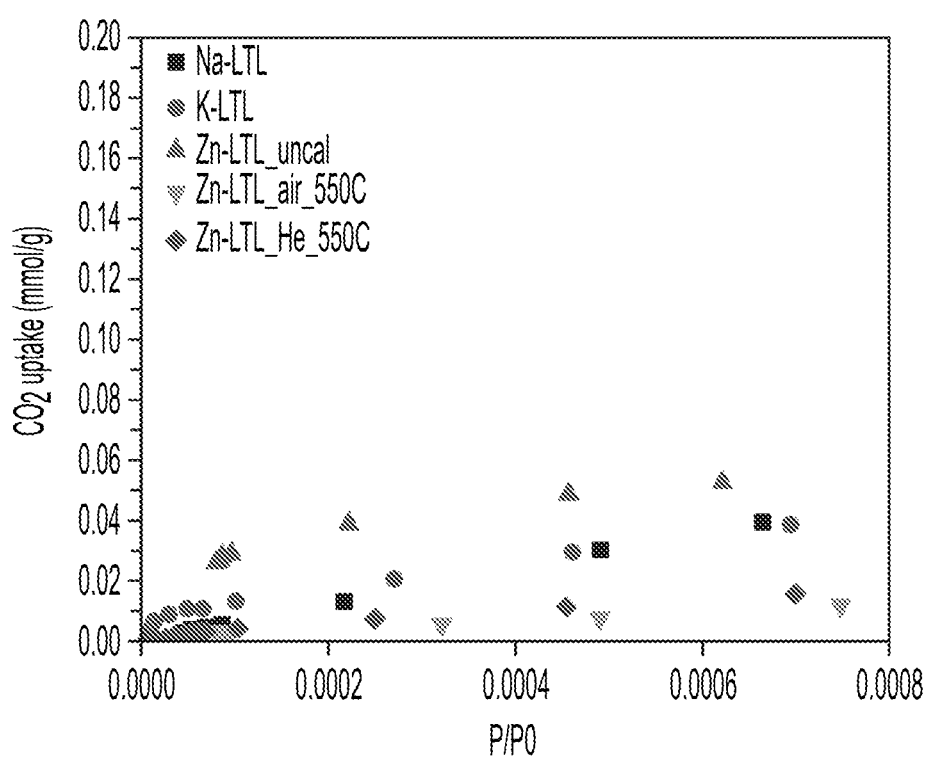
FIG. 47 (cont)

| Framework | Uptake (mmol/g) | |
| --- | --- | --- |
| | 1 bar | 400 ppm |
| LTL3 | 2.39 | 0.02 |
| MOR7 | 3.32 | 0.77 |
| LTA1 | 3.69 | 0.46 |
| FAU1 | 5.64 | 0.40 |
| FER10 | 2.12 | 0.106 |
| GME6 | 1.80 | 0.07 |

FIG. 48

METAL-CONTAINING MOR-TYPE ZEOLITES FOR CAPTURE OF CARBON DIOXIDE FROM LOW-$CO_2$ CONTENT SOURCES AND METHODS OF USING THE SAME

CROSS-REFERENCE TO RELATED APPLICATIONS

This application claims the benefit of U.S. Provisional Application No. 63/296,396, filed Jan. 4, 2022, U.S. Provisional Application No. 63/352,908, filed Jun. 16, 2022, and U.S. Provisional Application No. 63/377,586, filed Sep. 29, 2022. Each of the aforementioned applications is incorporated by reference herein in its entirety.

TECHNICAL FIELD

The present disclosure is directed to metal ion-containing zeolitic compositions, that are useful for scavenging carbon dioxide ($CO_2$) from low-$CO_2$-content gaseous source mixtures, including air with or without water ($H_2O$), and methods of making and using the same. In some preferred embodiments, the compositions comprise metal ion-doped zeolites having MOR topology capable of efficiently removing carbon dioxide from low-$CO_2$-content gaseous source mixtures.

BACKGROUND

The anthropogenic emission of carbon dioxide ($CO_2$) is associated with the continuous increase in global temperature. As such, many $CO_2$ mitigation strategies have been under investigation in the past years with the goal of net-zero emission by 2050. Point-source capture provides solutions for the sustainable operation of steel industries, cement plants, coal-based power stations, etc. Direct air capture (DAC) and bioenergy with carbon capture and storage (BECCS) are being investigated for the direct removal of $CO_2$ from air to address the emissions from mobile sources such as automobile, airplanes, and cargo ships, etc. See E. S. Sanz-Perez, et al., Direct capture of $CO_2$ from ambient air. Chem. Rev. 116, 11840-11876 (2016); 2. W. J. Sagues, et al., Enhanced carbon dioxide removal from coupled direct air capture-bioenergy systems. Sustain. Energy Fuels 3, 3135-3146 (2019); 3. G. Rim, et al., Sub-ambient temperature direct air capture of $CO_2$ using amine-impregnated MIL-101(Cr) enables ambient temperature $CO_2$ recovery. JACS Au 2, 380-393 (2022). DAC and BECCS provide opportunities for net-negative emissions.

A challenge with carbon capture technology is the search for adsorbents that are affordable, effective, energy efficient, environmentally friendly, and safe for large-scale utilizations. This is particularly significant for DAC because of the low diffusion rates and low $CO_2$ capacities resulting from the trace concentrations of $CO_2$. It is believed that physisorbents would not be effective due to their weak affinity for $CO_2$, and thus chemisorption-based sorbents are the foremost option for trace $CO_2$ capture. Liquid amine and alkaline adsorbents as well as other types of chemisorbents, e.g., ionic liquids and electric based membranes, have been investigated for the capture of $CO_2$ from low concentration environments. However, the intensive energy requirements for desorption (60-120 kJ/mol) and slow kinetics may be problematic for processing the large quantities needed for the implementation of DAC with chemisorbents. Amines supported on porous materials have also been studied for DAC to increase surface exposure and diffusion kinetics. The toxic, time-dependent oxidative degradation, and evaporation of amines are intrinsic challenges to the use of these methods. The development of new physisorbents with high stability, low energy cost for desorption, fast sorption kinetics, high capacity, as well as with moderate adsorption heat of 30-60 kJ/mol and fully reversible physisorption properties could be enabling adsorbents for large-scale DAC.

The most widely studied physisorbents for DAC are metal-organic frameworks (MOFs). Promising $CO_2$ capture performances are reported for hybrid ultramicroporous materials; a subgroup of MOFs. The high-performance of these solids originates from the toxic, strong electronegative fluorine-based adsorption centers as well as the well-controlled pore size. However, it is still a challenging task to obtain a MOF sorbent for DAC with cost-effective scalability, high performance and long-term stability. Zeolites are another type of microporous materials with vast structural and physicochemical properties and high stability. They can be synthesized in large quantities in cost-effective processes, and have a long history of record in the industry for catalysis and adsorption. For carbon capture, they often possess faster kinetics than supported amines. These merits have made zeolites interesting candidates for the capture of high con-centration $CO_2$. The known challenges for the capacities for low concentration $CO_2$ capture as well as the detrimental effect of water. With the former issue, research has been focused on maximizing the number or adjusting the type of extraframework adsorption sites to increase the capacity for trace $CO_2$ capture. However, there remains a need for a zeolitic adsorbent with competitive capacity and high stability.

The later issue can be addressed by engineering multi-bed systems with a desiccant bed before the zeolitic adsorbents. Currently, most of the literature focuses on the performance on dry conditions, and the issue of $H_2O$ adsorption during the DAC process has been little studied. NASA has been investigating the capture of $CO_2$ from air for their manned spacecraft since the 1960's. [*Ind. Eng. Chem. Process Des. Dev.* 1969, 8 (4), 469-476. https://doi.org/10.1021/i260032a006.] Their work involves the use of a desiccant bed (silica gel for bulk $H_2O$ and 13X zeolite for trace $H_2O$) upstream of the $CO_2$ adsorbent bed (5 A or 13X zeolite). [$CO_2$ Removal for the International Space Station—4-Bed Molecular Sieve Material Selection and System Design. 49*th Int. Conf. Environ. Syst.* 2019, 1-10; Development of Carbon Dioxide Removal Systems for NASA's Deep Space Human Exploration Missions 2016-2017. 48*th Int. Conf. Environ. Syst.* 2017, 1-17] A similar combination of silica gel and zeolites was studied by GreenCap Solutions AS and is being used by Removr Inc. for DAC. [A System for Climate Control in Closed or Semi Closed Spaces. WO2018034570A1; A Method and Arrangement for Capturing Carbon Dioxide from a Gas Stream Using an Adsorption System Comprising a Heat Storage and Recovery Unit. WO2021206564A1] However, the high regeneration temperature (typically ca. 300° C.) due to the adsorption of trace amount of $H_2O$ in zeolites after silica gel desiccants limits the use of this configuration for large-scale DAC technologies. [A Method and Arrangement for Capturing Carbon Dioxide from a Gas Stream Using an Adsorption System Comprising a Heat Storage and Recovery Unit. WO2021206564A1; Investigation of Desiccants and $CO_2$ Sorbents for Exploration Systems 2016-2017. 47*th Int. Conf. Environ. Syst.* 2017; Investigation of Desiccants and $CO_2$ Sorbents for Advanced Exploration Systems 2015-

2016. 46th Int. Conf. Environ. Syst. 2016, 1-13] For DAC applications, the capture of atmospheric water could be a useful endeavor to complement the removal of $CO_2$ in areas where fresh water is badly needed.

The disclosure herein demonstrates that the confinement effect in zeolites greatly affects the adsorption of low concentration $CO_2$. MOR-type zeolites with 8 membered ring (8-MR) side-pockets synthesized with or without organic structure-directing agents (OSDAs) can give a $CO_2$ capacity of ca. 1.15 mmol/g, among the highest for physisorbents for DAC. This capacity results in an approximate order of magnitude improvement of adsorption efficiency, i.e., $CO_2$ per adsorption site, compared to the standard 13X zeolite adsorbent. The O33 site in the 8-MR side-pocket is the primary adsorption site of MOR-type zeolites, and the size of the confined space for the adsorption site in zeolites dictates their properties for the adsorption of 400 ppm $CO_2$. Moreover, the disclosure also shows that with humid air the use of the commercially available AQSOA Z02 (SAPO-34 with the CHA framework) with MOR can realize a fully regenerable system for DAC at 100° C., while 200-300° C. is required for the use of MOR alone. The regeneration of the SAPO-34+MOR was realized by purging the system with a reverse flow.

SUMMARY

In some aspects, the disclosure provides metal ion-doped crystalline microporous aluminosilicate compositions comprising: a three-dimensional aluminosilicate framework having Mordenite topology comprising 12-MR channels and 8-MR side pockets; wherein the crystalline microporous aluminosilicate contains 2.5 to 9 metal ions per unit cell, wherein the ratio of metal ions to aluminum within the unit cell is from 0.3 to 1.4; and wherein the metal ion-doped crystalline microporous aluminosilicate composition adsorbs carbon dioxide when exposed to a gaseous mixture comprising $CO_2$, such as, for example, a gaseous mixture comprising 400 ppm $CO_2$.

In other aspects, the disclosure provides methods of capturing carbon dioxide from a gaseous source mixture that comprises carbon dioxide, the method comprising contacting the gaseous source mixture with the metal ion-doped crystalline microporous aluminosilicate of any one of the preceding claims such that carbon dioxide in the gaseous source mixture is adsorbed by the metal ion-doped crystalline microporous aluminosilicate.

In other aspects, the disclosure provides methods of capturing carbon dioxide from a gaseous source mixture that comprises carbon dioxide and moisture, the method comprising contacting the gaseous source mixture with molecular sieve for moisture adsorption and the metal ion-doped crystalline microporous aluminosilicate of any one of the preceding claims such that carbon dioxide in the gaseous source mixture is adsorbed by the metal ion-doped crystalline microporous aluminosilicate.

BRIEF DESCRIPTION OF THE DRAWINGS

FIGS. 1A-1C show performance of MOR-type zeolites for the capture of 400 ppm $CO_2$. 1A) MOR-type framework with the 12 membered-ring (12-MR) channel and 8-MR side-pocket highlighted in green and pink, respectively. Straight line segments represent bridging oxygen atoms, and their intersection points the tetrahedral atoms (Si or Al). Arrows indicate the adsorption of $CO_2$ molecules in the 8-MR side-pocket. 1B) The capacities for $CO_2$ adsorption in Na$^+$ form of MOR-type (MORa) zeolites, where a indicates the Si/Al ratio. Sample codes in the bracket are listed in Table S1. 13X and Zn-CHA are used as references. Note that $Zn^{2+}$ was the adsorption site for Zn-CHA2, while $Na^+$ was used for the other zeolites. 1C) The $CO_2$ capacity versus the isosteric heat of adsorption for MOR-type zeolites (7 #) as compared to other types of physisorbents for 400 ppm$CO_2$ capture. Data were taken from the literature for, ZIF-8 (S. Mukherjee, et al., Trace $CO_2$ capture by an ultramicroporous physisorbent with low water affinity. Sci. Adv. 5, eaax9171 (2019)), 13X(Id.), SIFSIX-18-Ni(Id.), SIFSIX-18-Ni-β(Id.), NbOFFIVE-1-Ni(P. M. Bhatt, et al., A fine-tuned fluorinated MOF addresses the needs for trace $CO_2$ removal and air capture Using physisorption. J. Am. Chem. Soc. 138, 9301-9307 (2016)), Mg$_2$(dobpdc)(T. M. McDonald, et al., Capture of carbon dioxide from air and flue gas in the alkylamine appended Metal-Organic Framework mmen-Mg2(dobpdc). J. Am. Chem. Soc. 134, 7056-7065 (2012)), and Mg-MOF-74 (S. Mukherjee, et al.).

FIGS. 2A-2E shows identification of adsorption sites in MOR-type zeolites. 2A) Bar graphs of breakthrough and saturation capacities from MOR6(4 #) at 30° C. before and after pyridine modification, denoted as MOR and py-MOR, respectively. 2B) Normalized CO2 adsorption isotherms of MOR- and FAU-type zeolites with logarithm relative pressure. 2C) CO2 molecules adsorbed per MOR unit cell (CO2/U.C.) as a function of Na+ cation loading density (Na+/U.C.). 2D) The four T-sites (left panel) and the visualization (middle and right panels) of the positions of Na+ in the MOR framework as a function of Na+ loading. (2A-2D) are the results from samples shown in FIG. 2C. T sites, oxygen, Na+ and N from NH4+. Oxy denotes the oxygen atom connected to Tx and Ty sites. 2E) Correlation of the number of CO2 molecules adsorbed and the Na+ cations loading in the O33 site in the 8-MR side-pocket per MOR unit cell.

Panel 26C) shows that sample 26B had the O31 position fully occupied Na$^+$ cations, while the O33 site was partially occupied by Na$^+$ cations. Panel 26D) shows that sample 26C had both O31 and O33 sites fully occupied by Na$^+$ cations, while the O44 site was partially occupied by Na$^+$ cations. Panel 26E) shows that the occupancy of sample 26D is similar to that of sample 26C, with extra Na$^+$ cations added to O42 site. The details of the occupancy for each site are summarized in Tables S7-S10.

Figure 27:
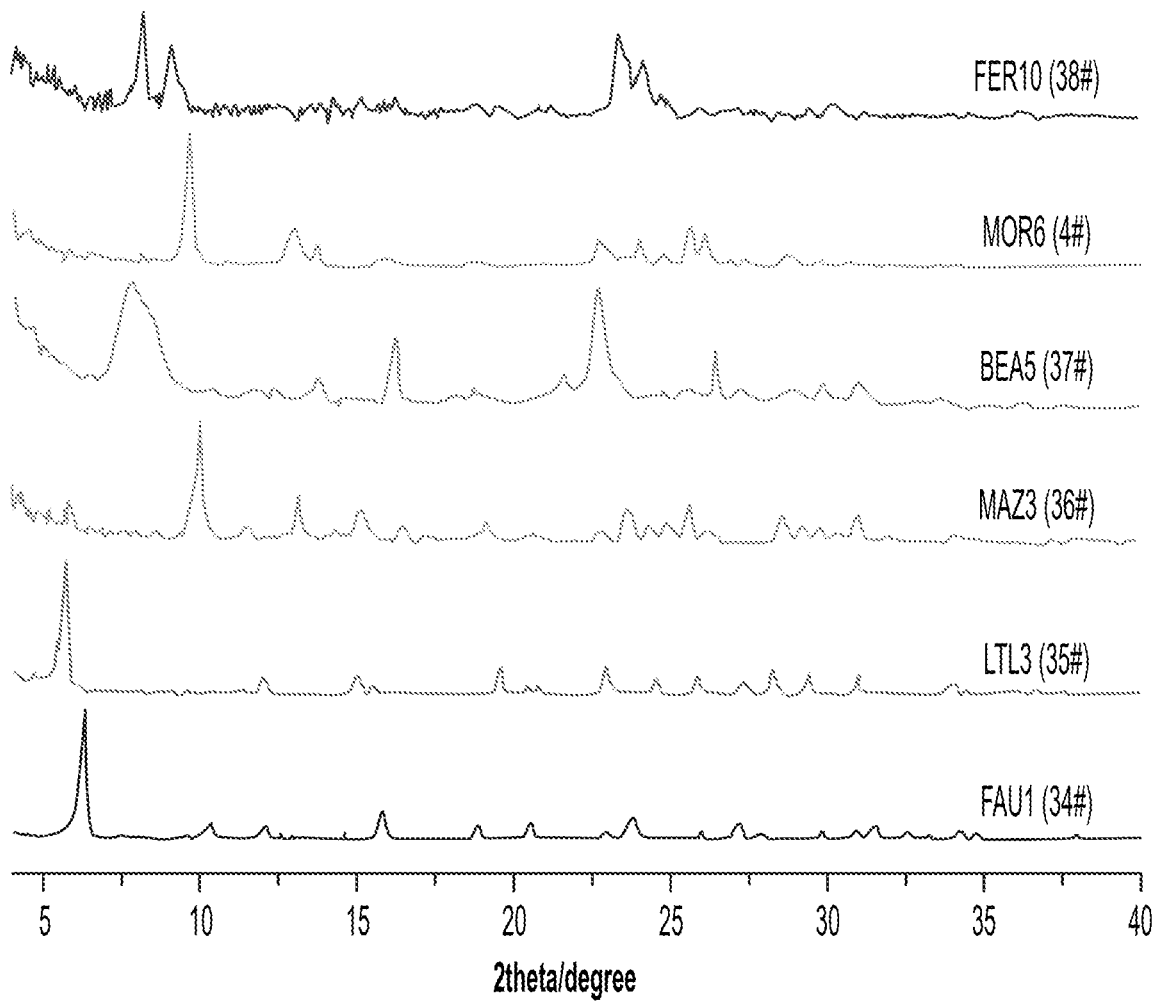

FIG. 27 shows X-ray diffraction patterns of the zeolites tested with different framework topologies.

Figure 28:
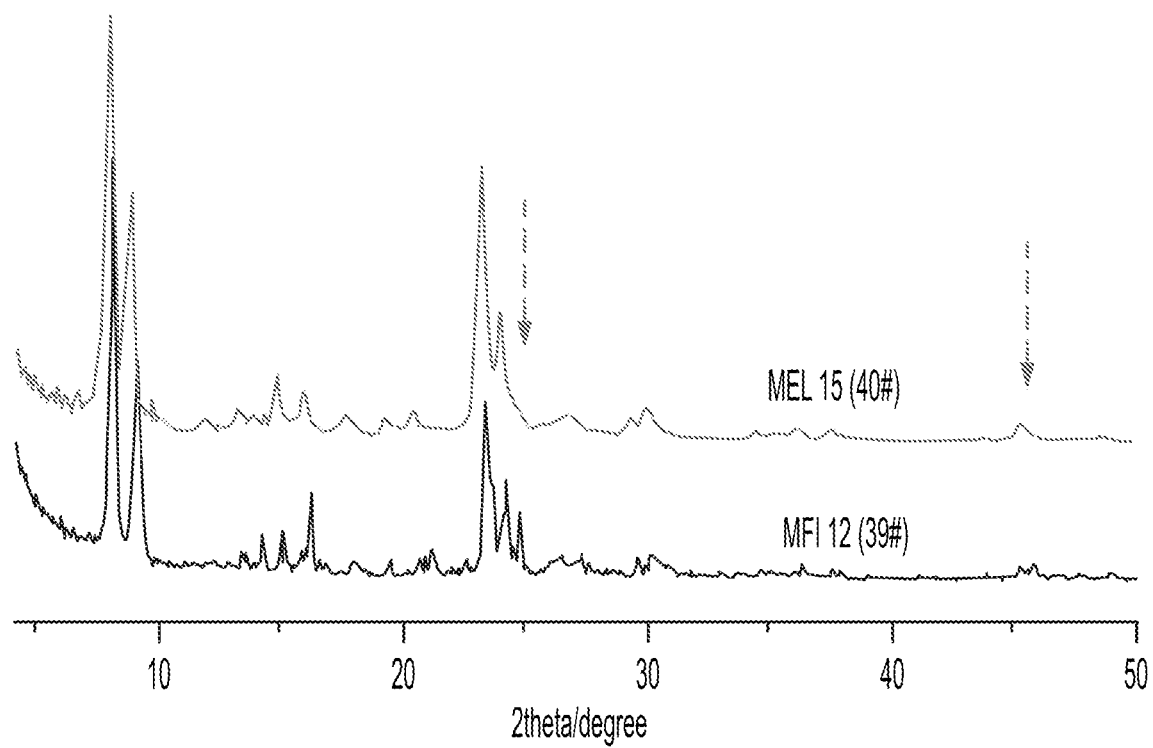

FIG. 28 shows X-ray diffraction patterns of the ZSM-5 (MFI) and ZSM-11 (MEL) zeolites. The MEL and MFI phases were identified by the arrows based on the MEL and MFI reference peaks from the International Zeolite Structure Database. (8)

Figure 29:
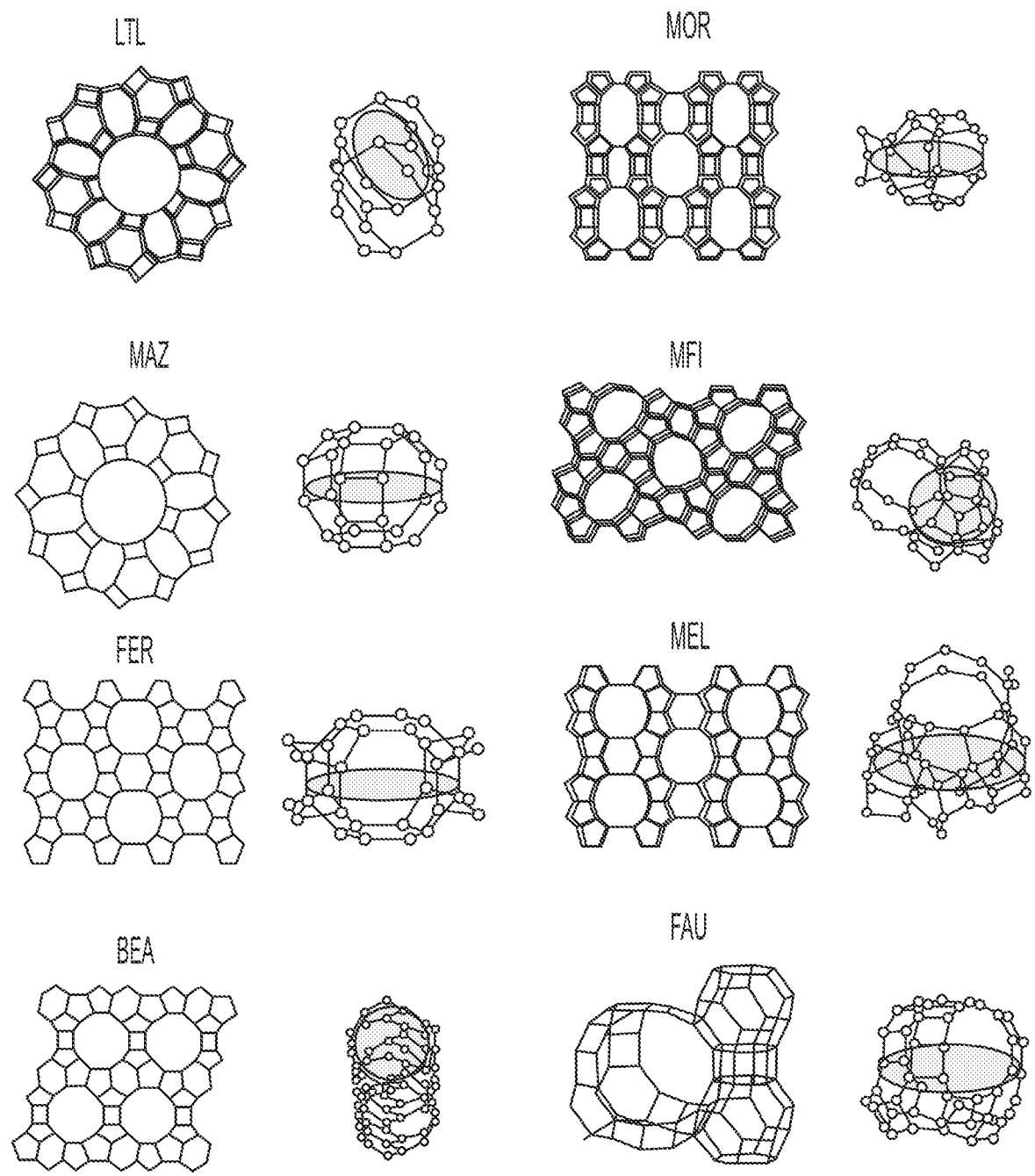

FIG. 29 shows visualization of the confined space in zeolites with different frameworks. The sizes of the side pocket in LEL-, MOR-, MAZ-, FER-type zeolites were measured via VESTA. The sizes of the confined space are intersections in MFI, MEL, BEA and FAU, which are indicated by the maximum sphere that can be included shown in the IZA website (www.iza-structure.org/databases/).

Figure 30:
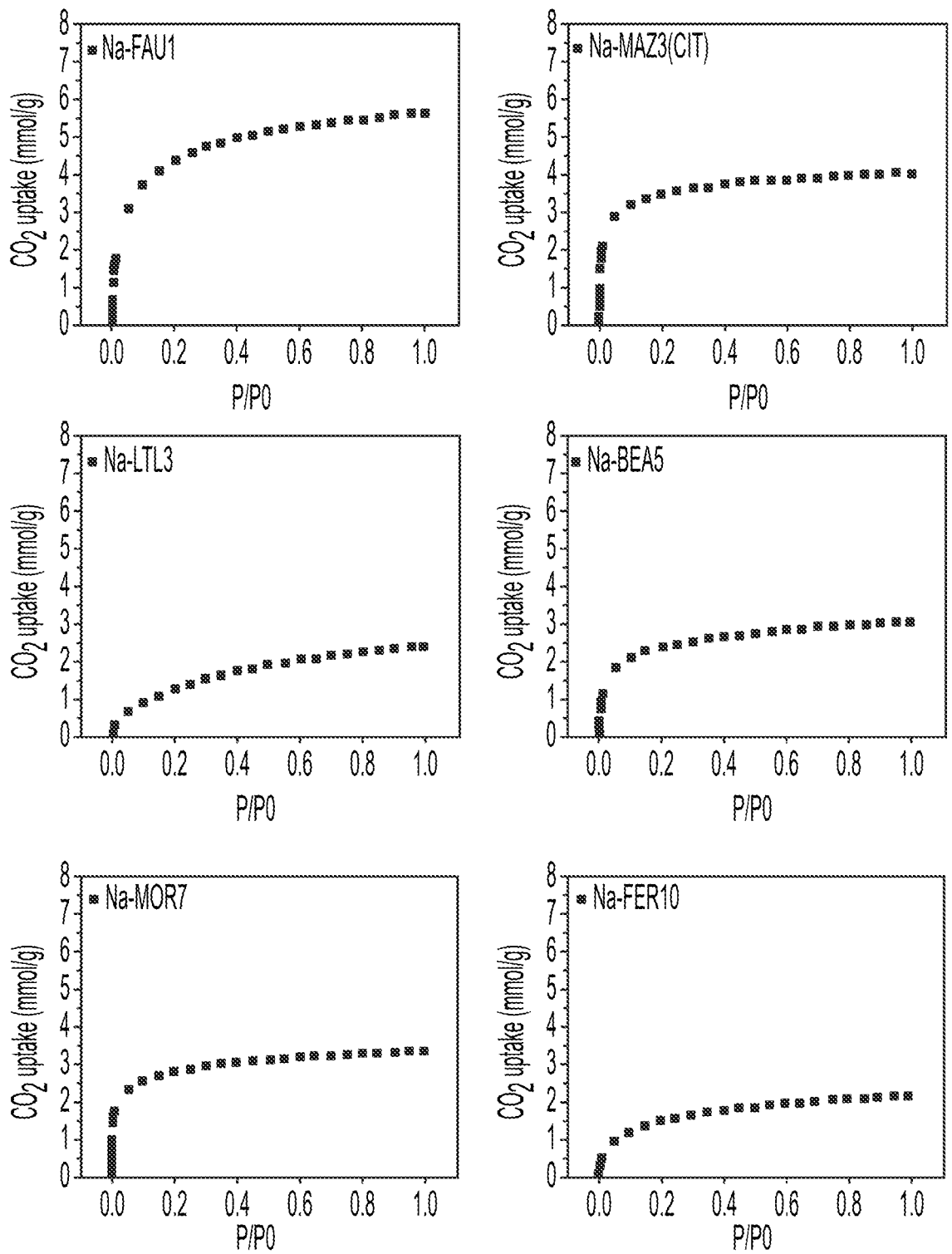
Figure 30:
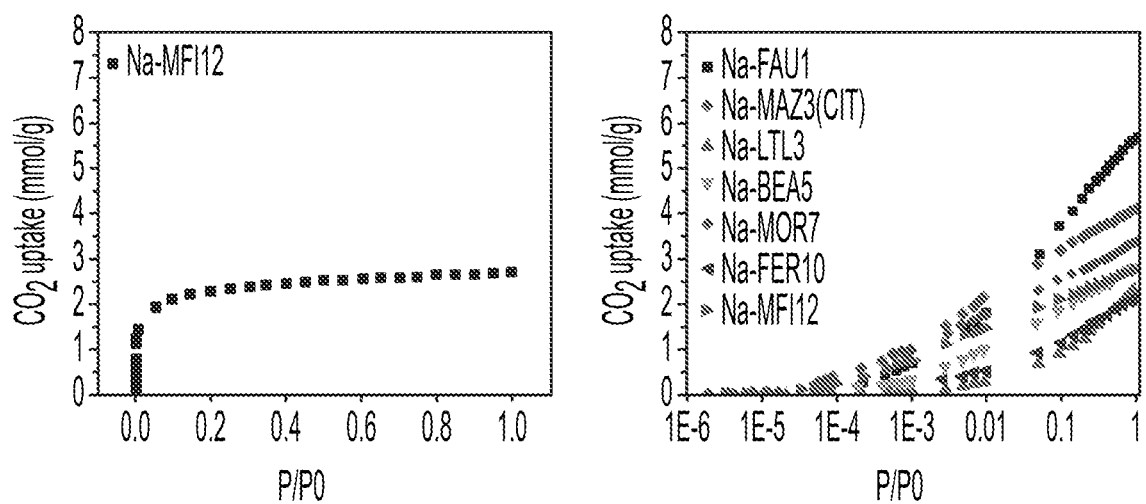

FIG. 30 show $CO_2$ isotherms of zeolites with different framework topologies measured at 25° C.

Figure 31:
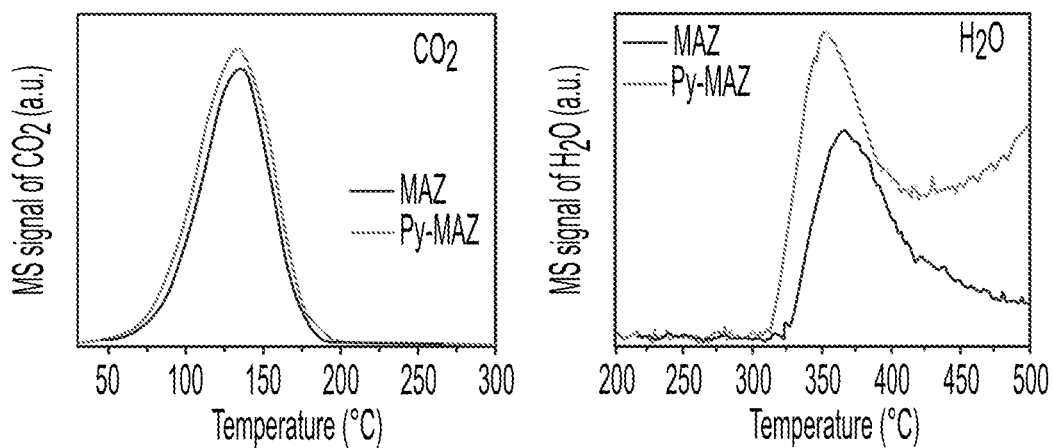

FIG. 31 show mass spectra profiles from temperature programmed desorption of a) $CO_2$ and b) $H_2O$ from pyridine dosed (py-MAZ, red) and parent (MAZ, black) MAZ zeolites after being saturated with 400 ppm $CO_2$ at 30° C. Both materials were activated at 280° C.

Figure 32:
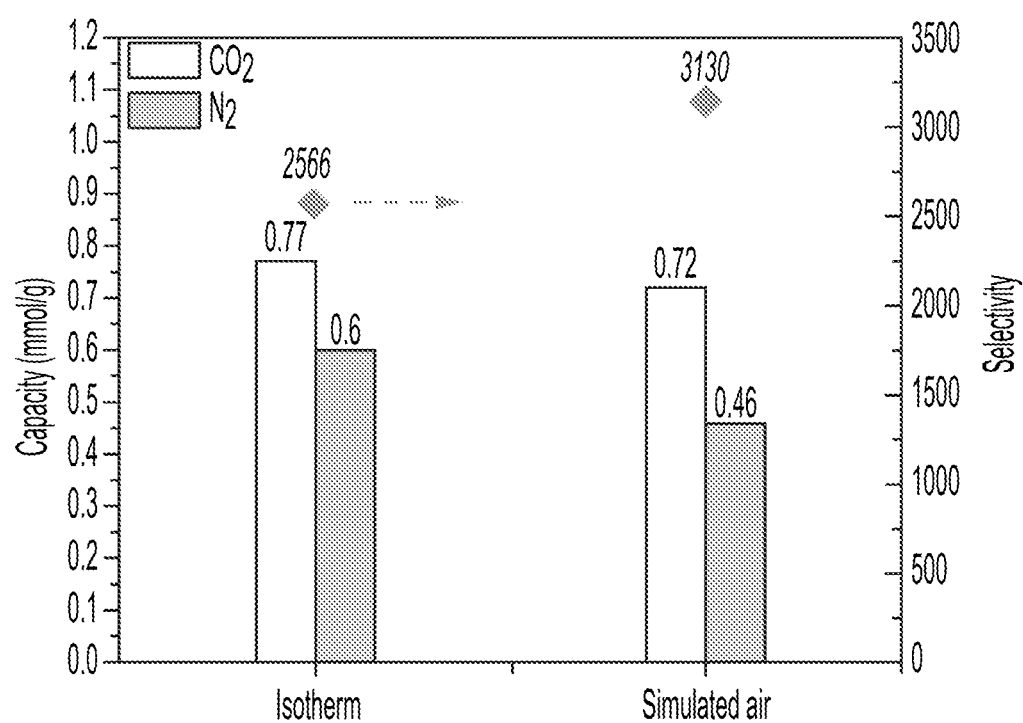

FIG. 32 shows comparison of the capacities for $CO_2$ and $N_2$ measured from single-component isotherms and simulated air real time breakthrough experiments. The simulated air is 400 ppm $CO_2$/1Ar % (internal standard)/20% $O_2/N_2$. The results show that the capacities for $CO_2$ and $N_2$ decreased for simulated air measurements compared those from the single-component isotherms. This suggests the competitive adsorption of $CO_2$ and $N_2$. The higher $CO_2/N_2$ molar selectivity for the breakthrough experiments than that from the isotherms demonstrated the preferential adsorption of $CO_2$ compared to $N_2$.

Figures 33A, 33B:
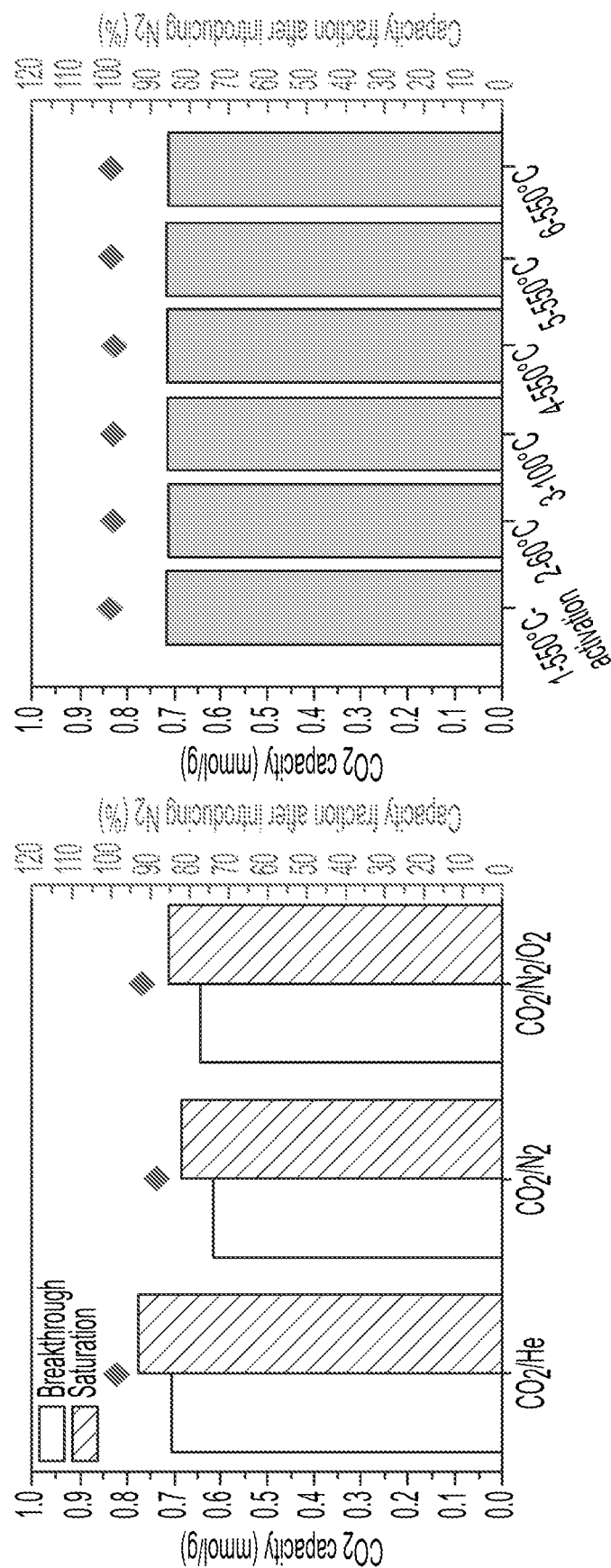

FIGS. 33A-33B show the performance of commercially available MOR-type zeolites (4 #, CBV10A) obtained from real time breakthrough experiments under simulated conditions for direct air capture. 33A) Comparison of the breakthrough and saturation capacities of MOR zeolites (4 #, CBV10A) with different gas mixtures at 30° C. $CO_2$/He indicates 400 ppm $CO_2$/400 ppm Ar (internal standard)/He, $CO_2/N_2$ indicates 400 ppm $CO_2$/20% Ar (internal standard)/$N_2$, $CO_2/N_2/O_2$ indicates 400 ppm $CO_2$/1% Ar (internal standard)/20% $O_2/N_2$. 33B) The adsorption-desorption recyclability over MOR-type zeolites (4 #, CBV10A) with a gas flow of $CO_2/N_2/O_2$. The first cycle was obtained after activation of the material at 550° C. for 20 h. Then the material was regenerated at 60° C. and 100° C. for 2 h for each cycle before a 2 h deep regeneration at 550° C. for three cycles. The results show that the material exhibit high recyclability even at temperature as low as 60° C.

Figure 34:
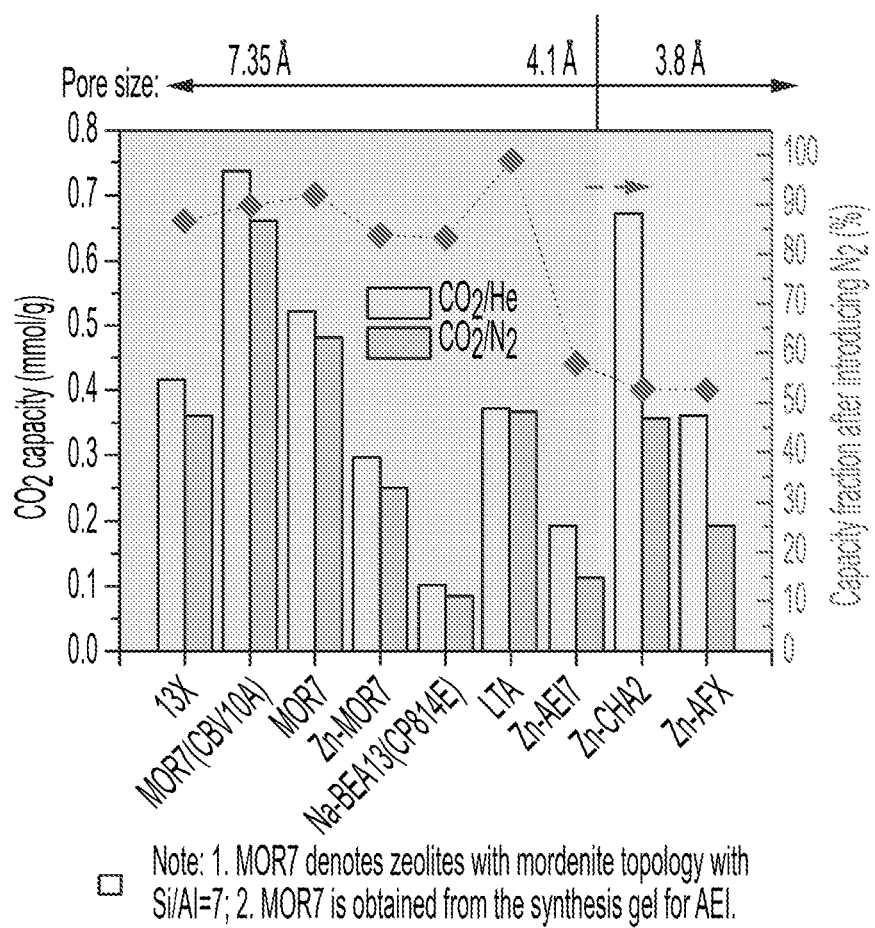

FIG. 34 shows zeolites with pore size larger than 4.1 Å maintained over 80% of $CO_2$ capacity when introducing $N_2$ to the adsorption gas stream. While $CO_2$ capacities of zeolites with pore size smaller than 4.1 Å decline dramatically to ca. 50% under $CO_2/N_2$ gas mixtures. MOR7 zeolites show the highest $CO_2$ capacity of 0.74 and 0.66 mmol/g for $CO_2$/He and $CO_2/N_2$ gas mixtures, respectively. (Although this material has very high Si/Al=6.5).

Figure 35:
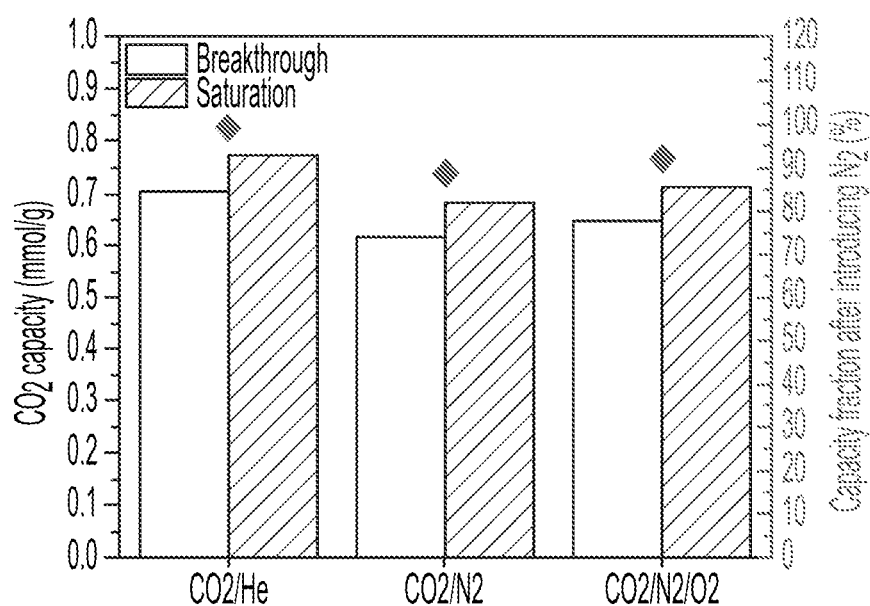

FIG. 35 shows the capacity of MOR7 is negligibly affected by $N_2$, and no further decline was observed with $CO_2/N_2/O_2$ gas streams.

Figure 36:
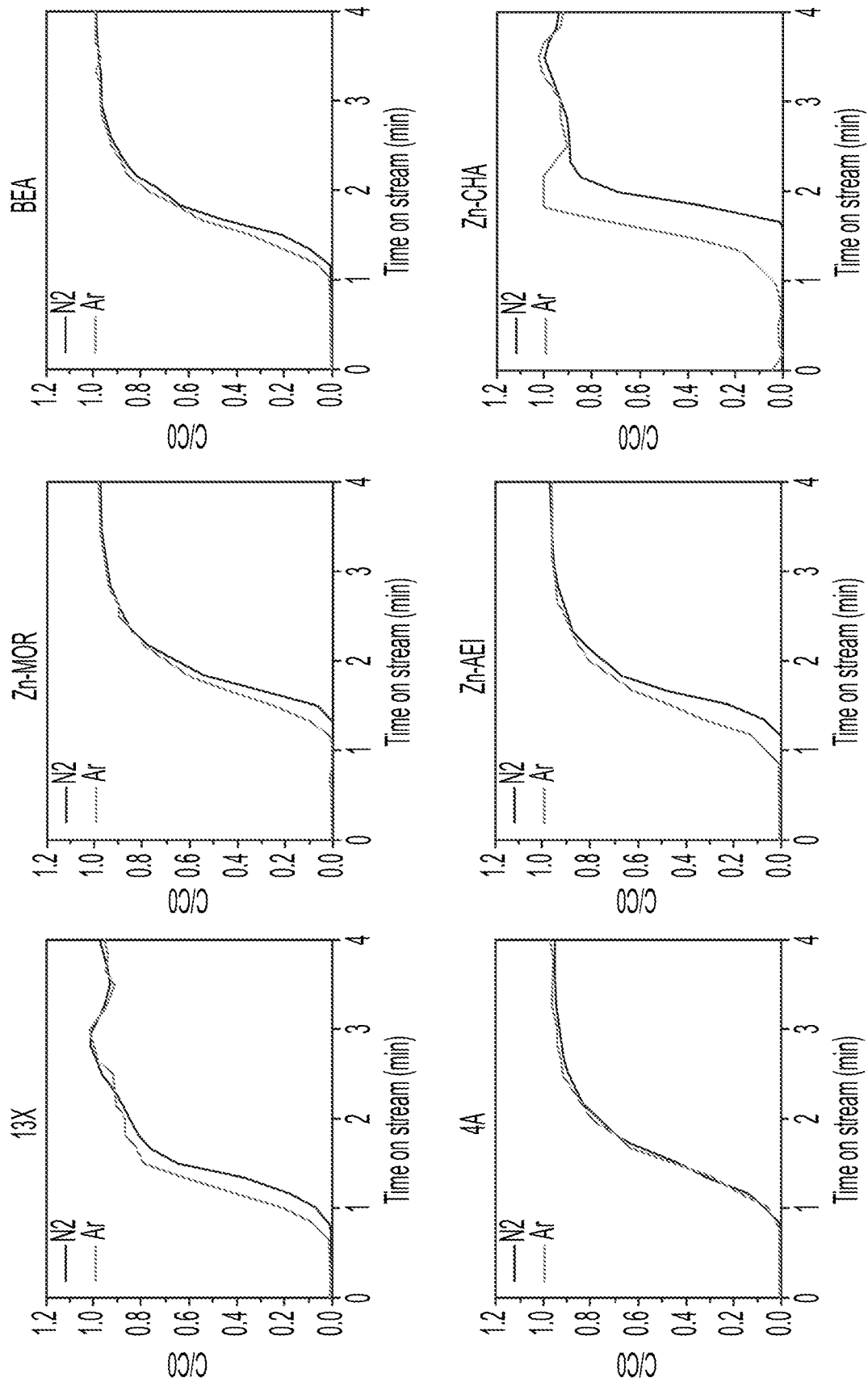

FIG. 36 shows representative breakthrough profiles for $N_2$ show high $N_2$ capacity for Zn-AEI and Zn-CHA, suggested by the larger difference of breakthrough profiles between Ar and $N_2$.

Figure 37:
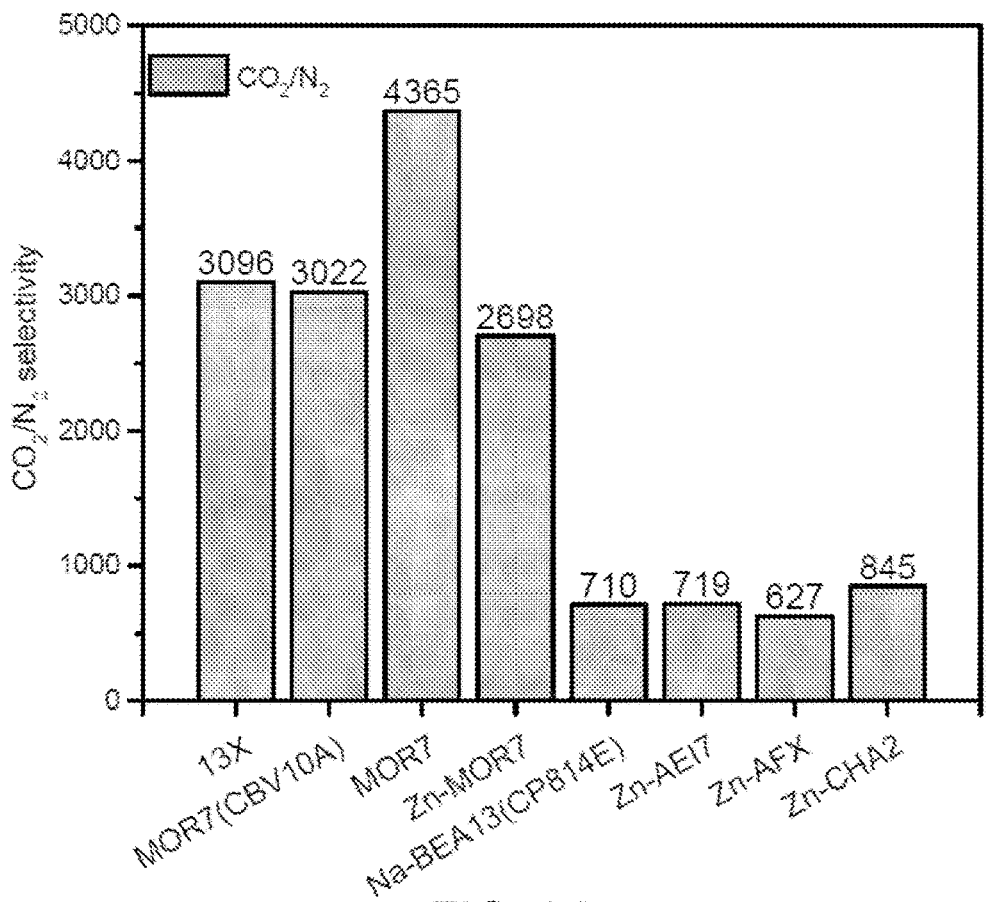

FIG. 37 shows MOR-type zeolites show $CO_2/N_2$ selectivity as high as 4365 when adsorb $CO_2$ from a gas stream of 400 ppm$CO_2$/1% Ar (internal standard)/20% He/$N_2$.

Figure 38:
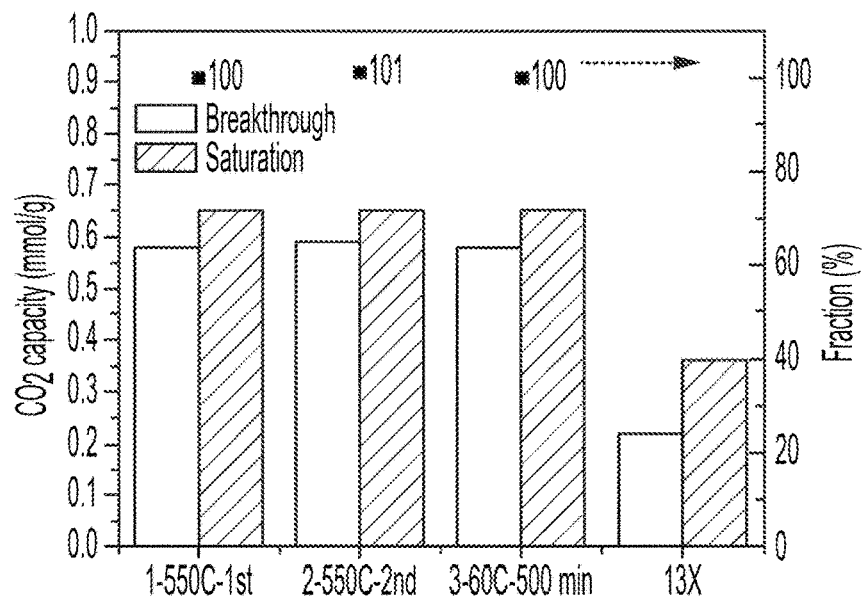

FIG. 38 shows that MOR7 shows almost doubled $CO_2$ capacity, compared to 13X. MOR7 can be regenerated at 60° C.

Figure 39:
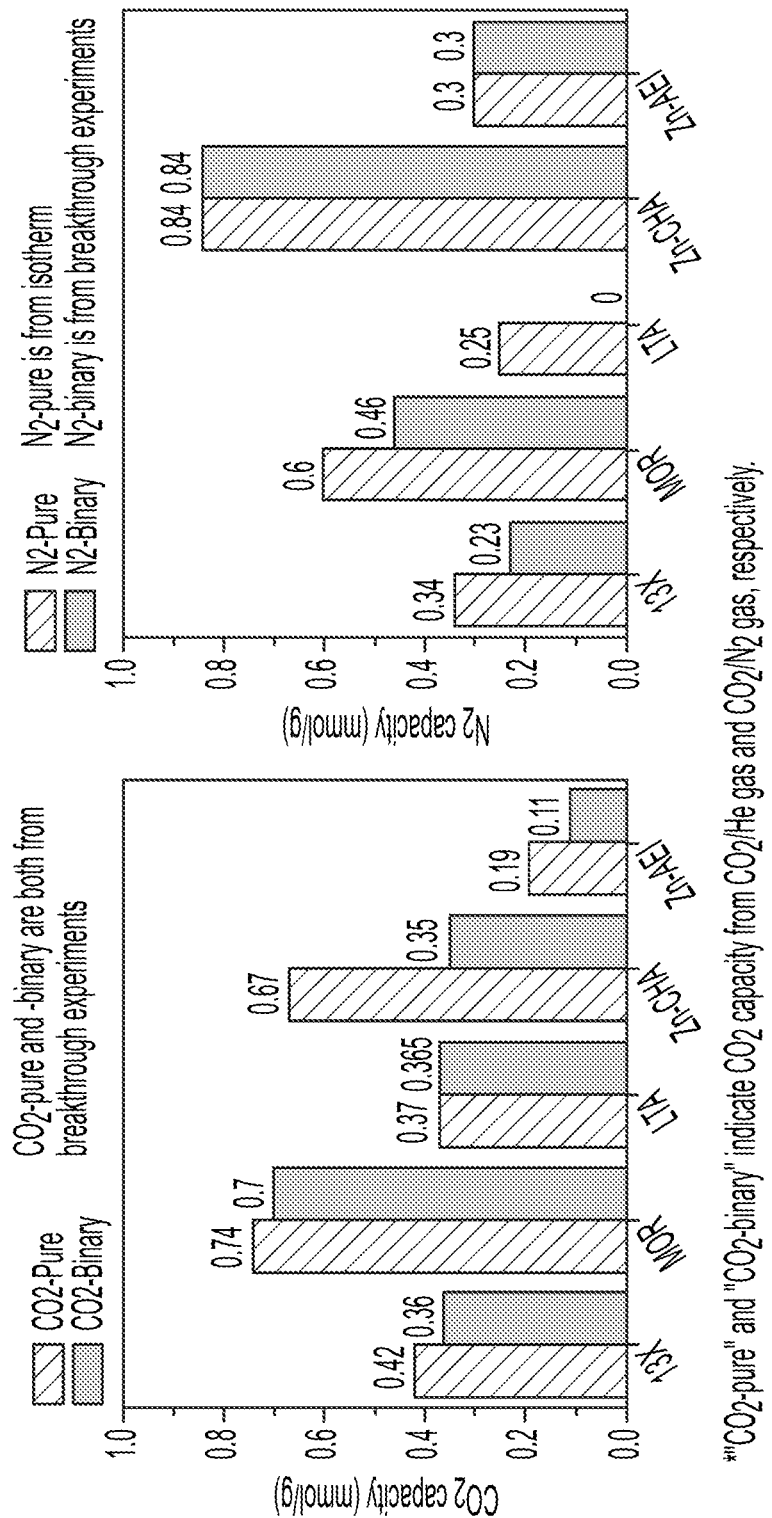

FIG. 39 shows Zeolites with larger pore size (>4.1 Å): $N_2$ capacities greatly dropped, $CO_2$ capacities slightly dropped in the $CO_2/N_2$ gas. Zeolites with smaller pore size (<4.1 Å): $N_2$ capacities did not change, $CO_2$ capacities greatly dropped in the $CO_2/N_2$ gas.

FIG. 40 shows a Table of MOR-type zeolites.

Figure 41:
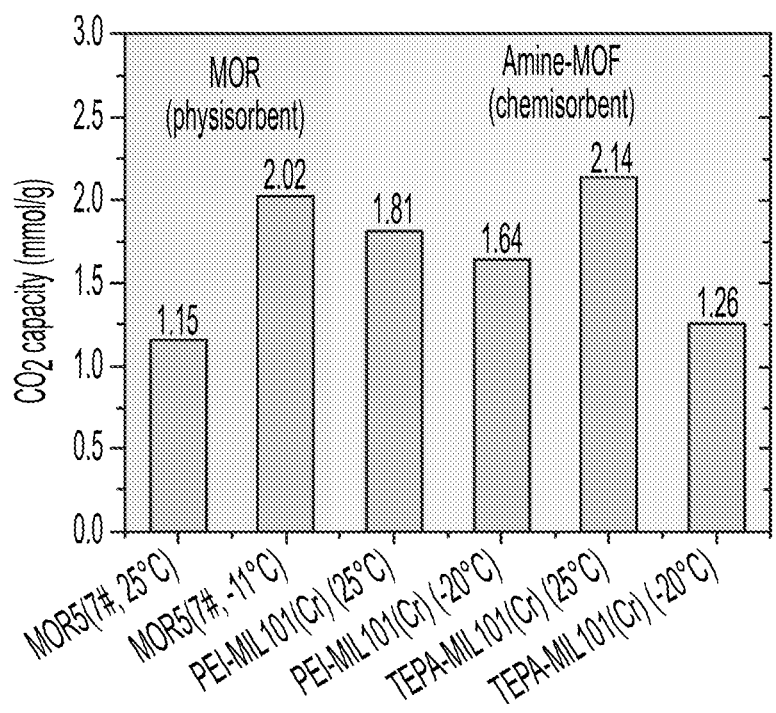

FIG. 41 shows fast increase of capacity of physisorbent at lower temperatures to 2 mmol/g, while the capacity of chemisorbent drops upon the decline of temperature. MOR5(7 #) zeolites shows higher capacity at low temperature (e.g., −11° C.) than the state-of-the-art chemisorbents at lower temperature (e.g., −20° C.).

Figure 42:
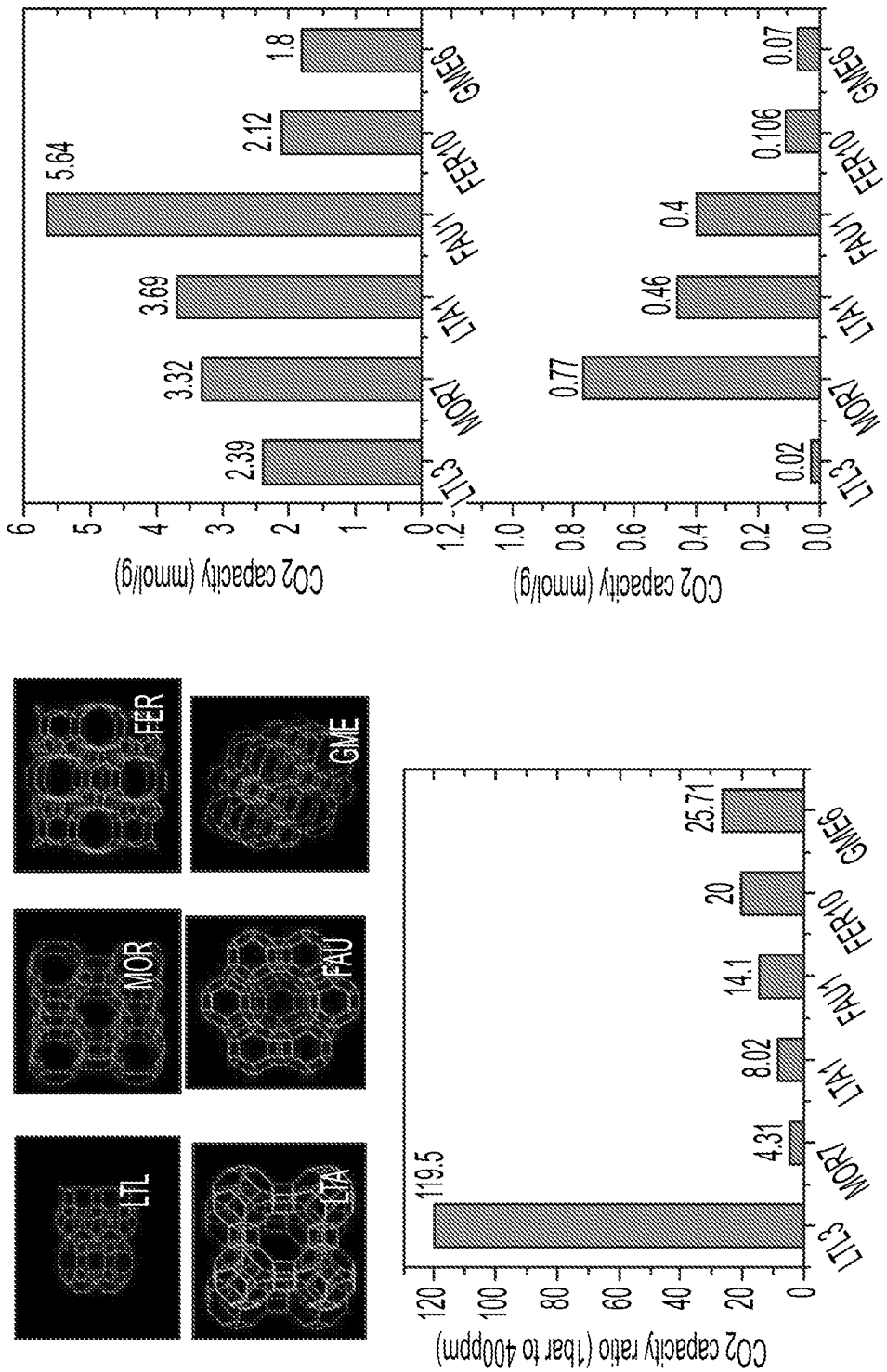

FIG. 42 shows that MOR-type shows the highest capacity for 400 ppm $CO_2$, and the smallest difference in capacities for $CO_2$ between 1 bar and 400 ppm.

Figure 43:
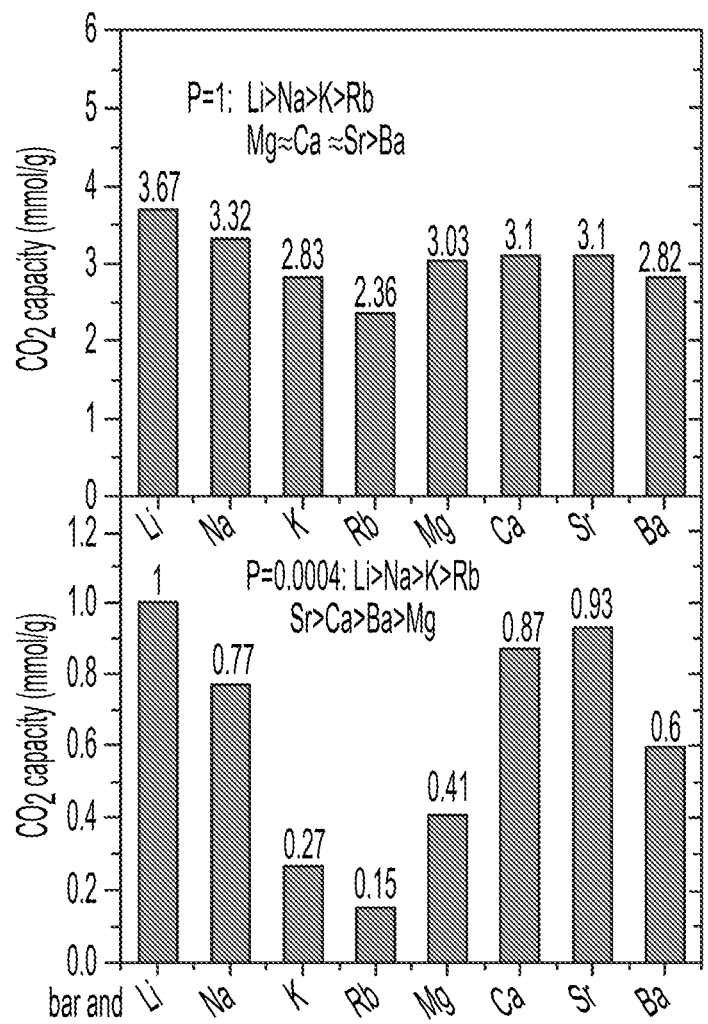
Figure 43:
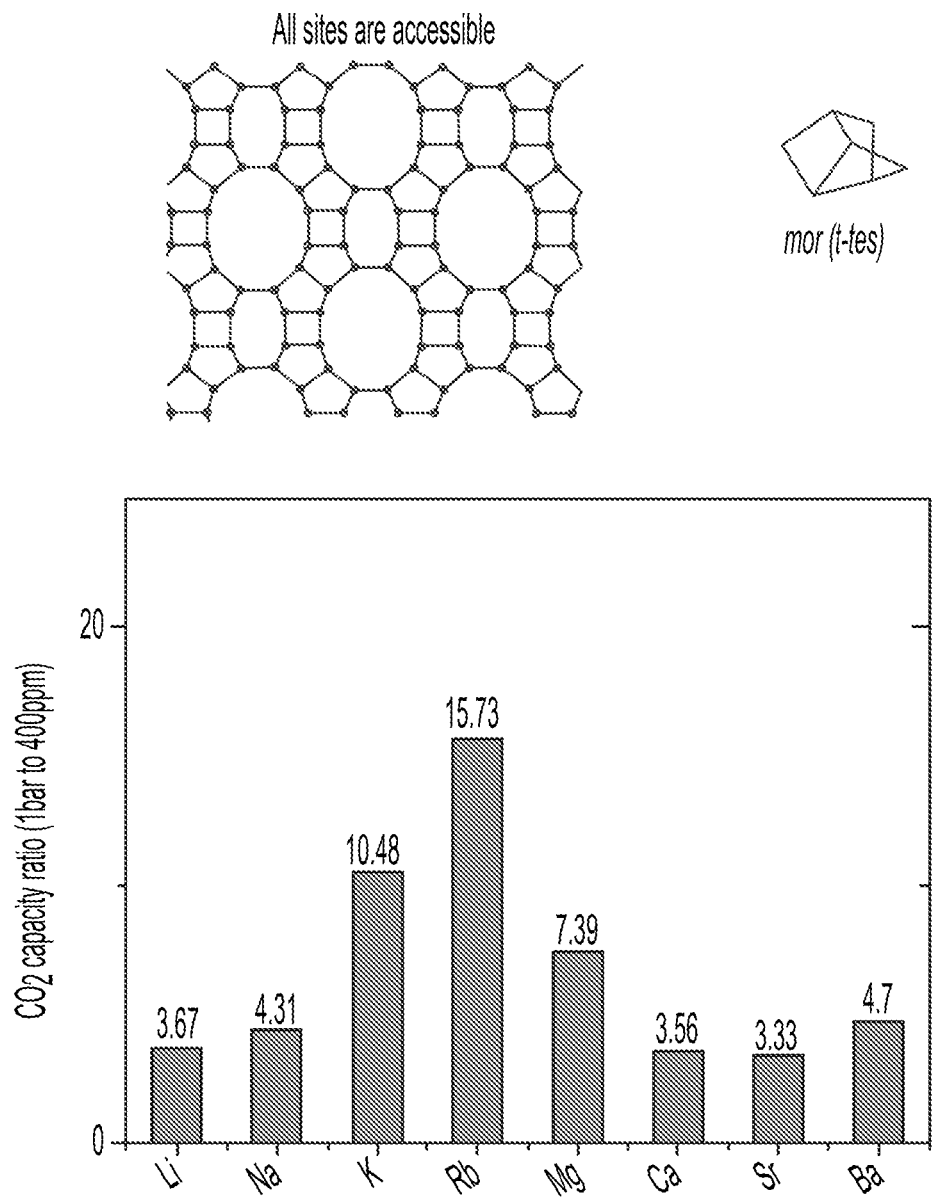

FIG. 43 show that Li$^+$ cation (Li-MOR7) or Sr$^{2+}$ cation (Sr-MOR7) exchange increases the capacity from 0.77 mmol/g (Na-MOR7) to 1 and 0.9 mmol/g for 400 ppm $CO_2$, respectively. Alkali metals: increasing polarity increases the $CO_2$ capacity (both 1 bar and 400 ppm $CO_2$). Alkaline earth: increasing basicity (from Mg to Sr) does not change capacity for 1 bar, while it enhances the capacity for 400 ppm. This indicates the significance of basicity for the adsorption of low concentration $CO_2$.

Figure 44:
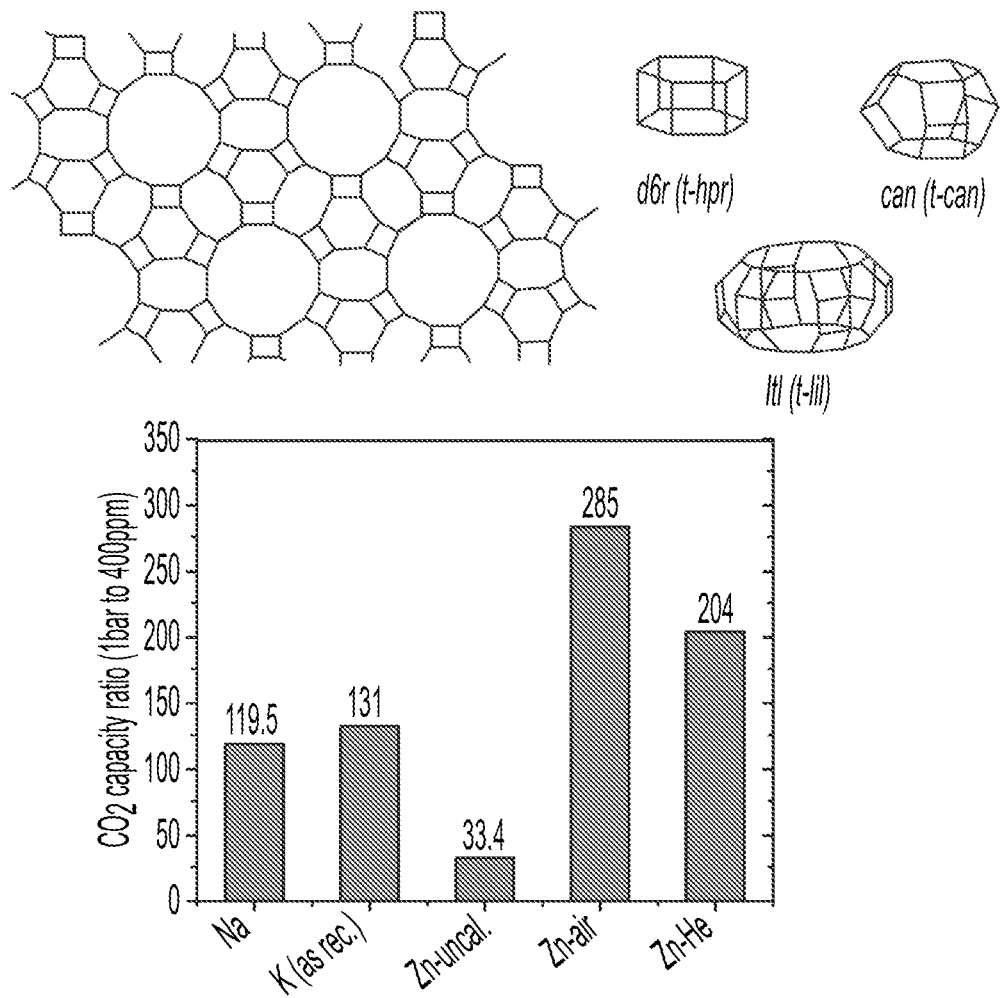
Figure 44:
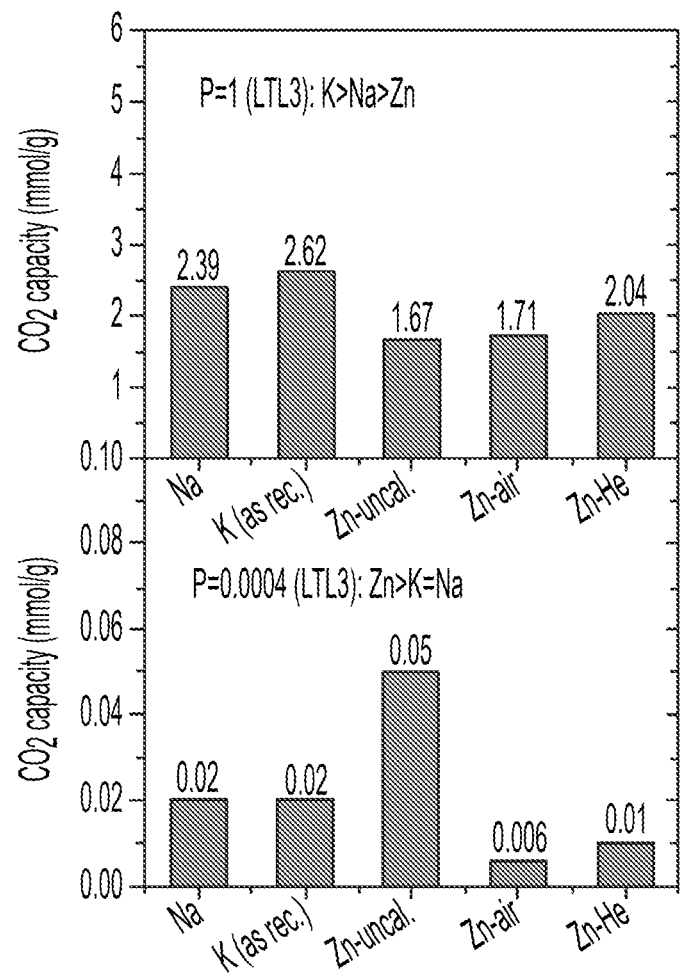

FIG. 44 show that all cation exchanged LTL show very low capacity.

Figure 45:
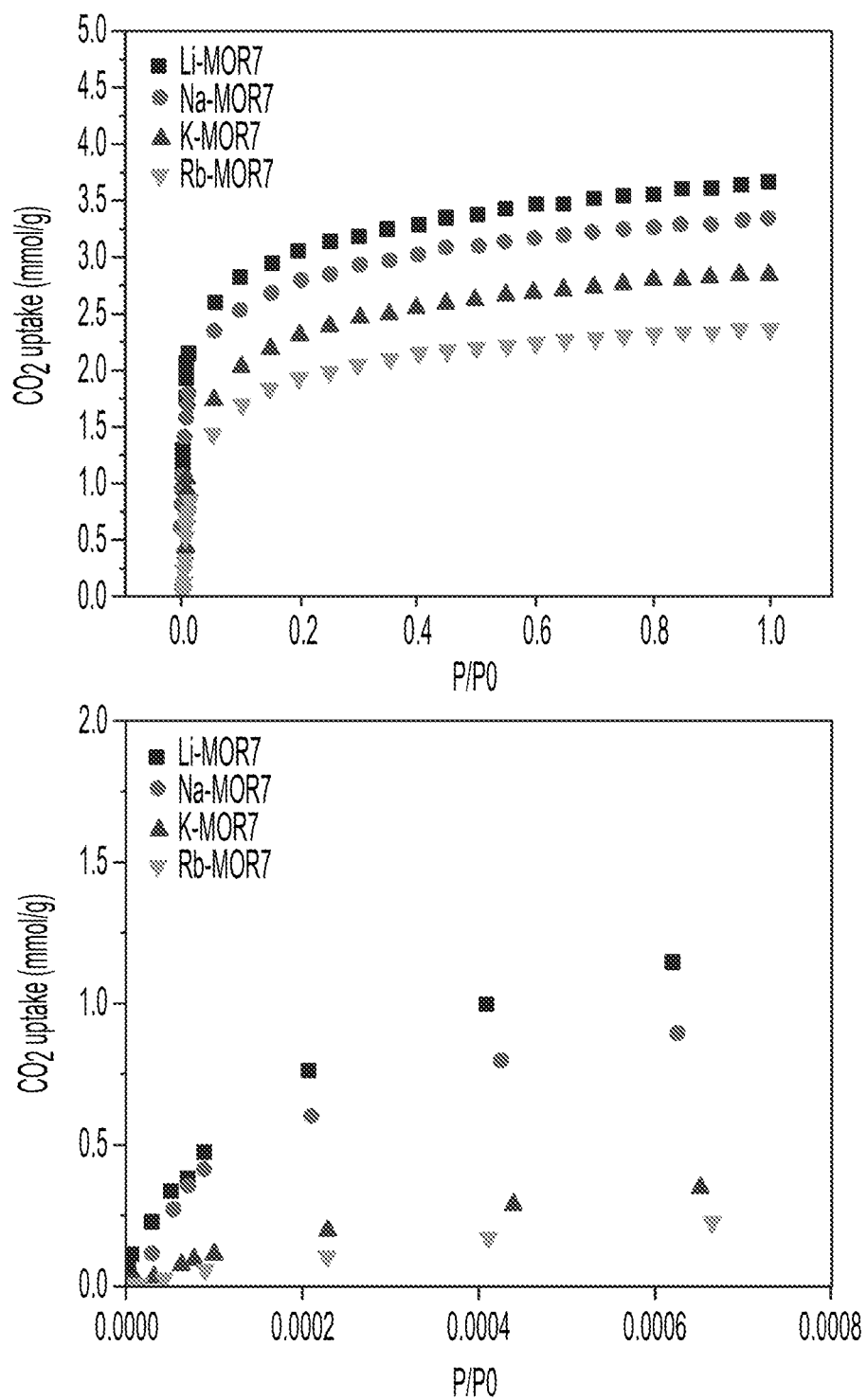

FIG. 45 show $CO_2$ isotherms of Alkali-MOR7 zeolites.

Figure 46:
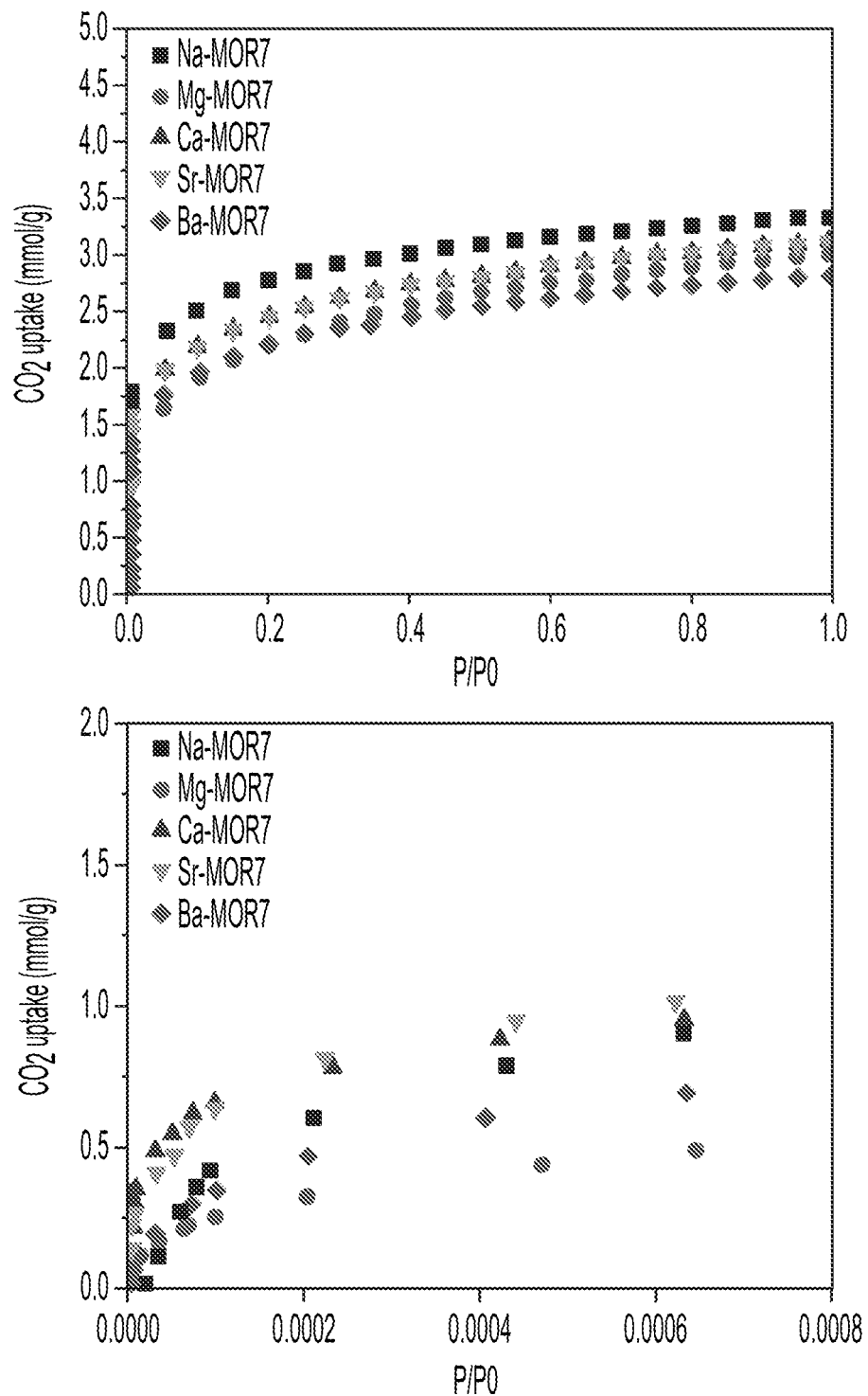

FIG. 46 show $CO_2$ isotherms of Alkaline earth-MOR7 zeolites.

FIG. 47 show $CO_2$ isotherms of cation exchanged LTL3 (HSZ500, Tosoh) zeolite.

Figure 48:
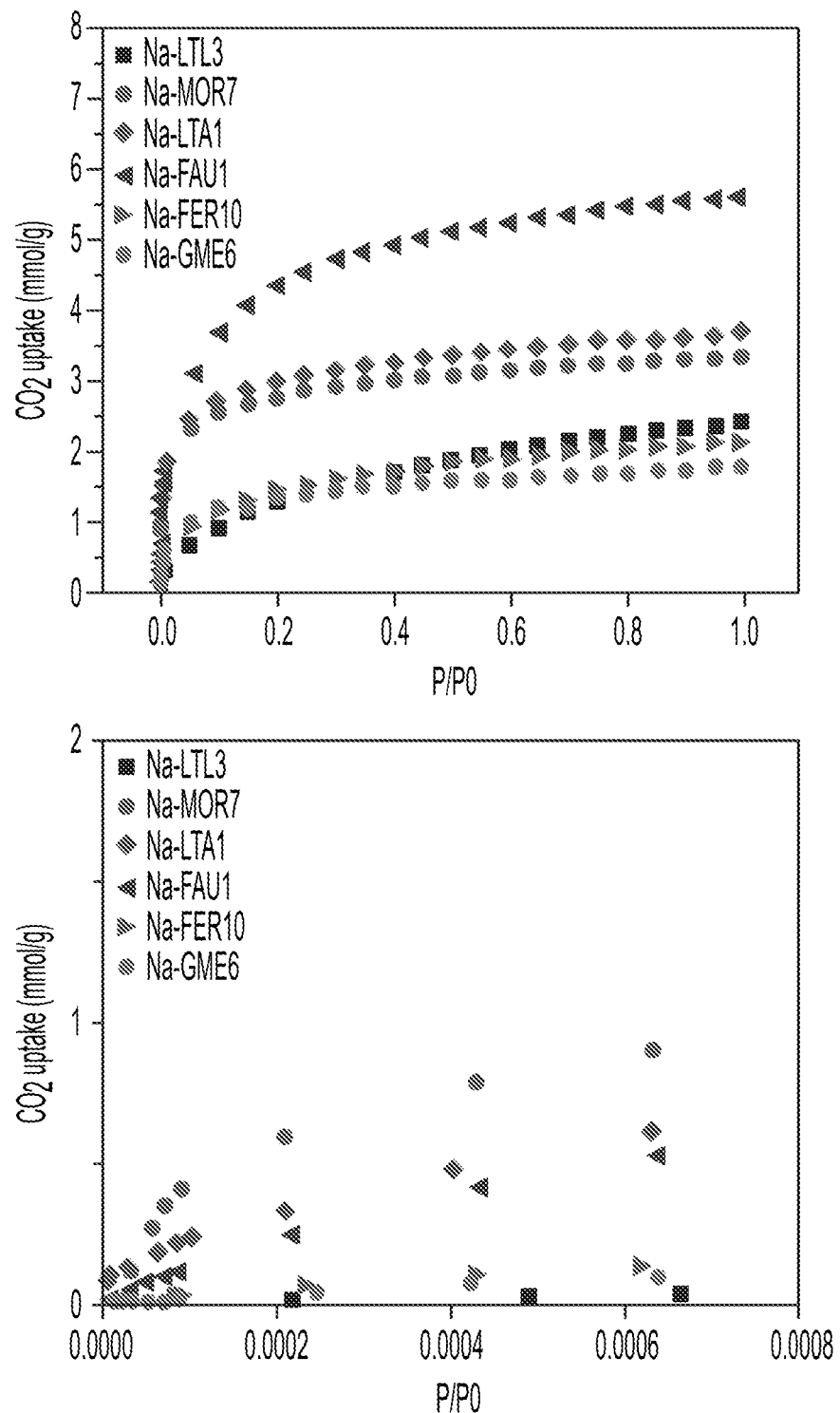

FIG. 48 show $CO_2$ isotherms of Na-form zeolites as a function of framework topologies.

Figure 49:
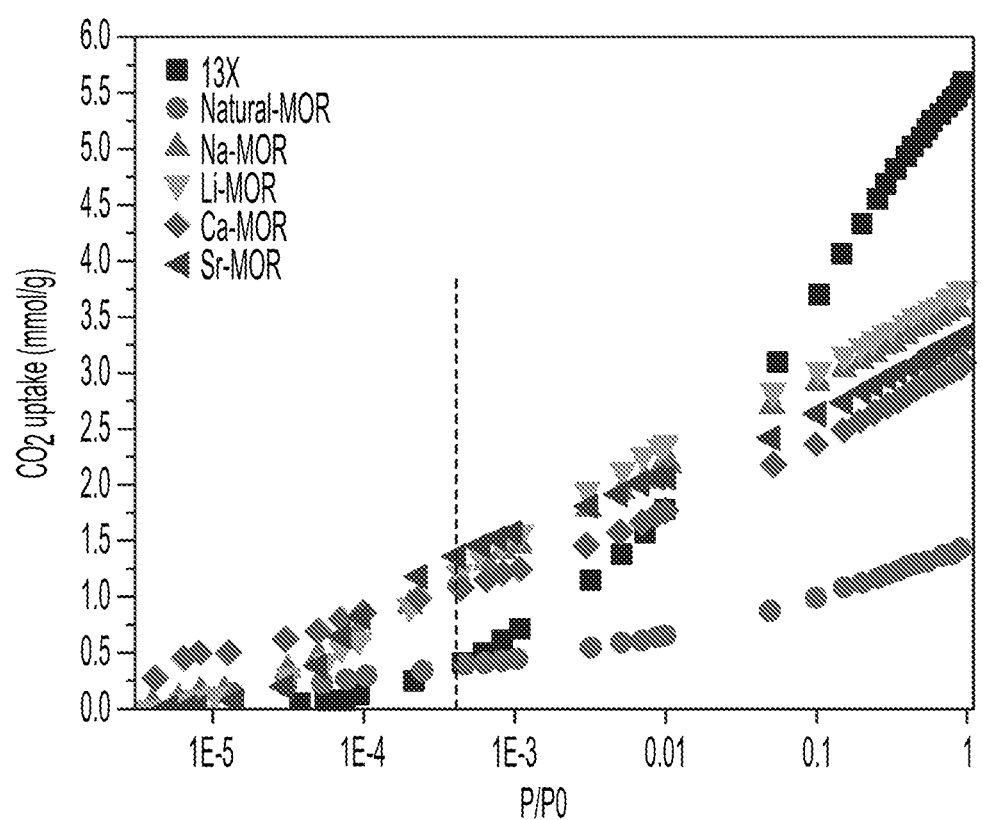
Figure 49:
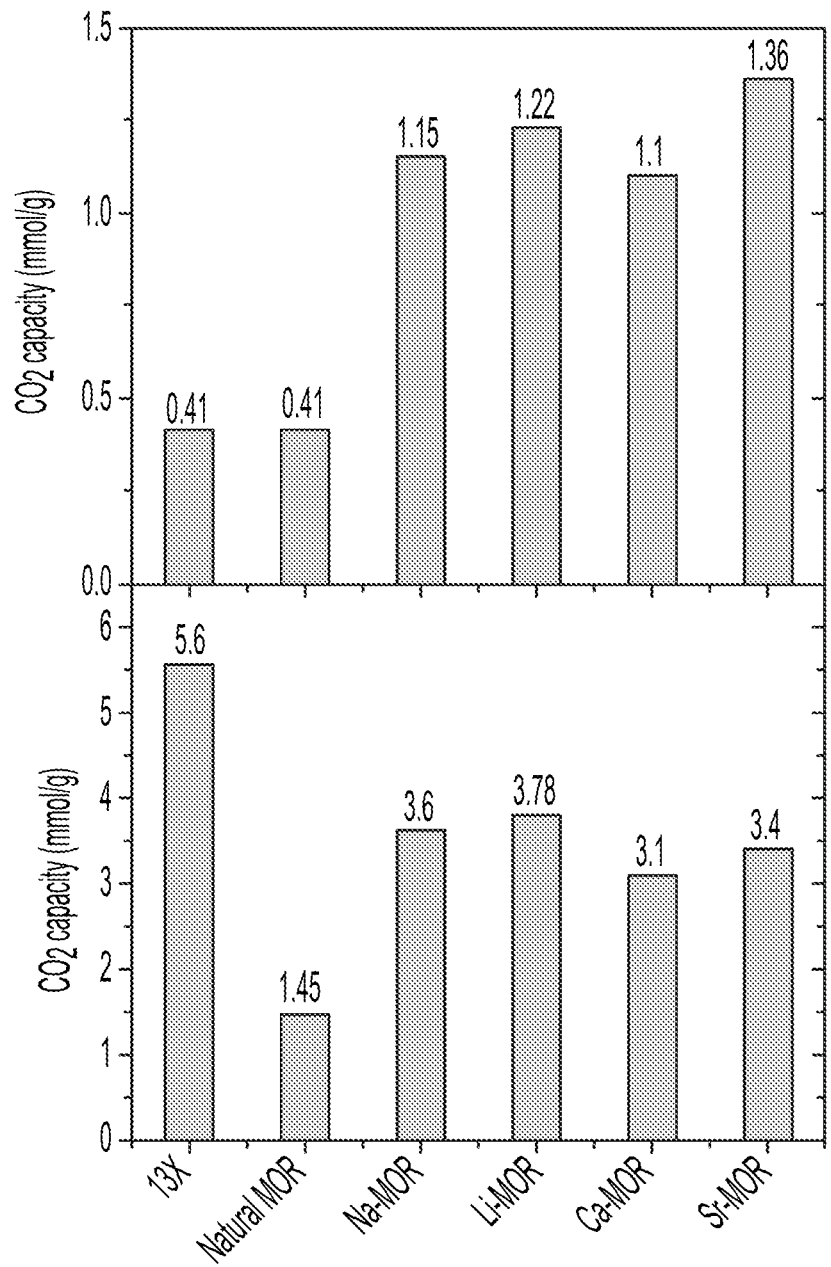

FIG. 49 show Li$^+$ exchange improves the capacities for both the low and high concentration $CO_2$ adsorption. Sr$^{2+}$ exchange improves the capacity for low concentration $CO_2$ adsorption, but it slightly suppresses high concentration $CO_2$ adsorption. Sr-MOR4(14 #) shows the highest capacity of 1.36 mmol/g for 400 ppm $CO_2$ adsorption. Natural MOR and 13X adsorb similar amount of $CO_2$ for 400 ppm $CO_2$ adsorption, although the $CO_2$ capacity for MOR at 1 bar is 26% of that for 13X.

Figure 50:
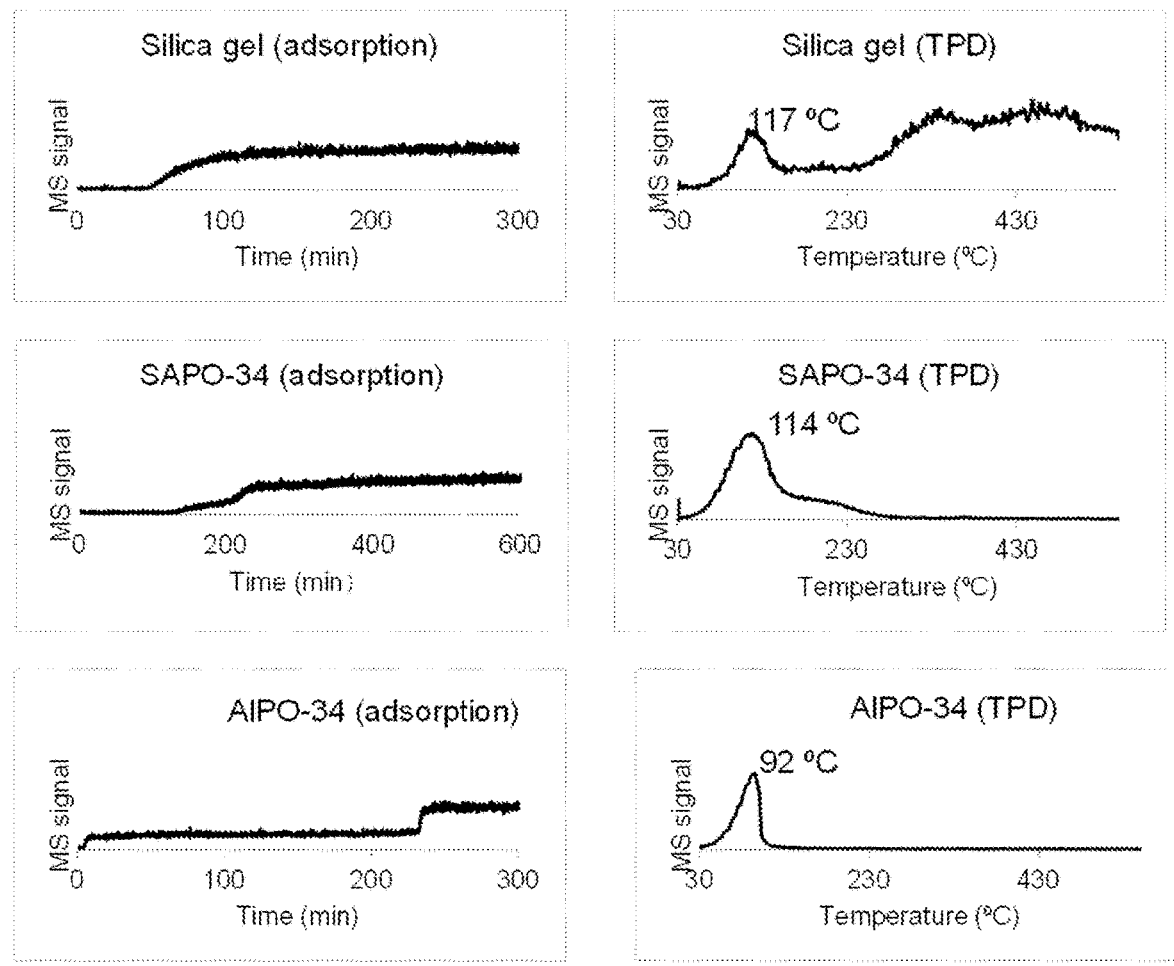

FIG. 50 shows adsorption and desorption properties of some desiccants that may be used in methods of the disclosure. Adsorption conditions: 5% Ar/Helium 20 mL/min @ 30° C., $H_2O$@5° C. Desorption conditions: 5% Ar/Helium purge 7 h: 20 mL/min @ 550° C. with ramp rate of 10° C./min.

Figure 51:
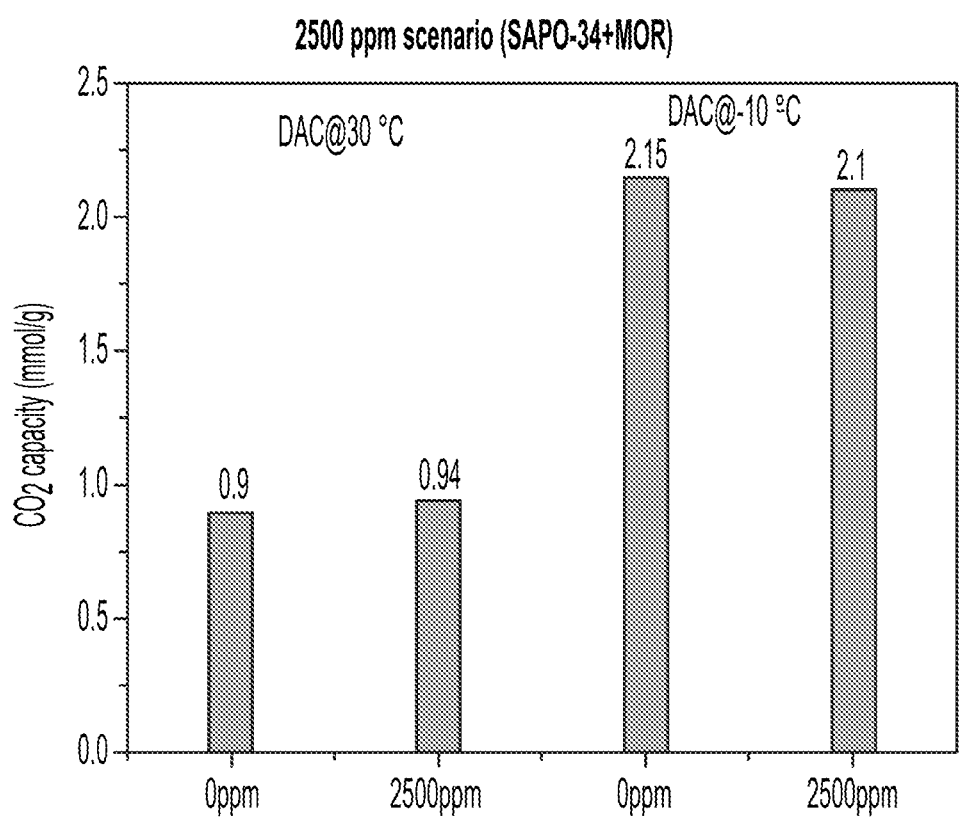

FIG. 51 shows the $CO_2$ capacities of MOR zeolites as a function of source gas humidity and temperature. The $CO_2$ capacities of MOR zeolites is maintained under humid conditions with the presence of upstream SAPO-34 for both cold and room temperature DAC.

Figure 52:
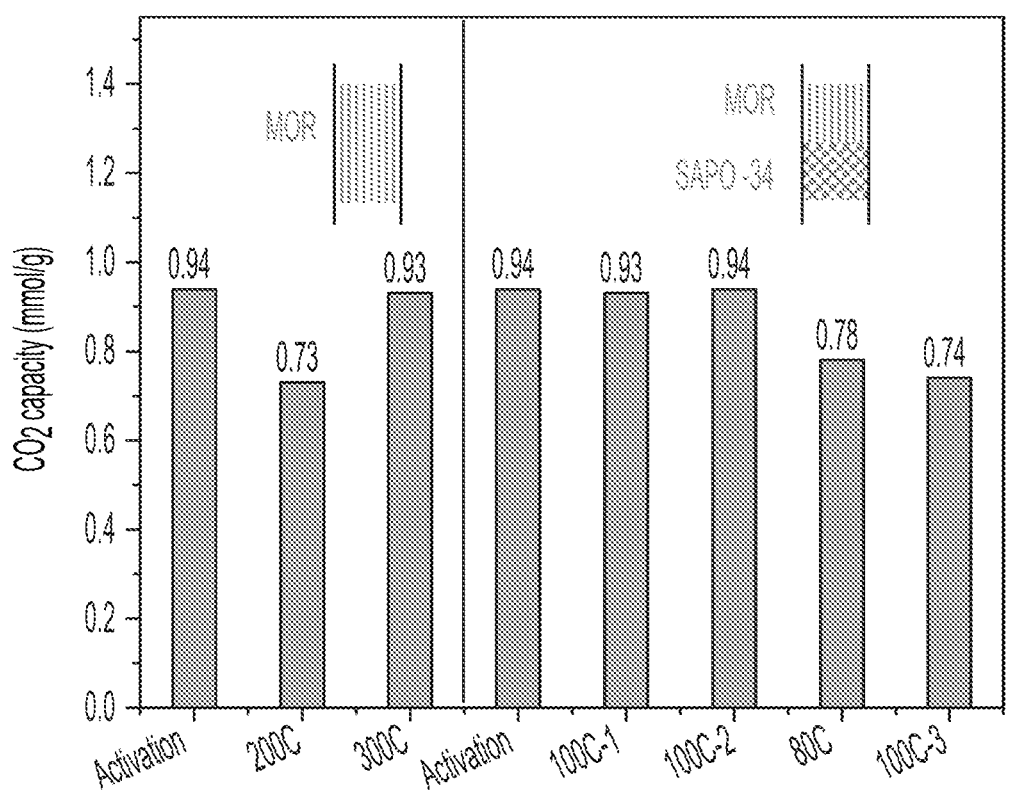

FIG. 52 shows the $CO_2$ capacities of MOR zeolites in multicycle adsorption-desorption using SAPO-34 upstream of MOR for DAC from simulated air containing 2500 ppm $H_2O$ as a function of regeneration temperatures. MOR with upstream SAPO-34 required is 100° C. to regenerate; MOR alone required 200-300° C. Adsorption: simulated air with 2500 ppm $H_2O$, 30° C. 100 C-1: first cycle of regeneration at 100° C. for 300 min with He, then adsorption of simulated air with 2500 ppm $H_2O$. 300 mg SAPO-34 breakthrough time is 400 min, 250 mg MOR requires 300 min.

Figure 53:
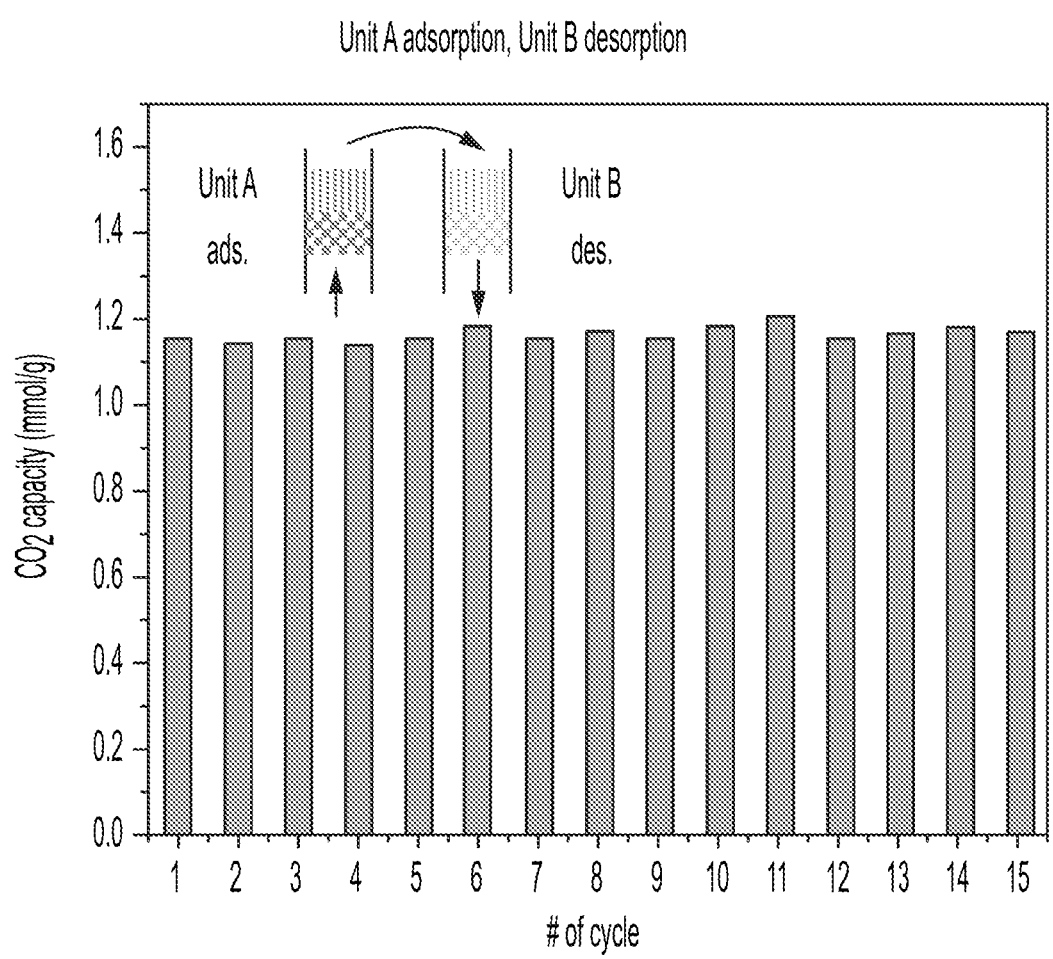
Figure 54:
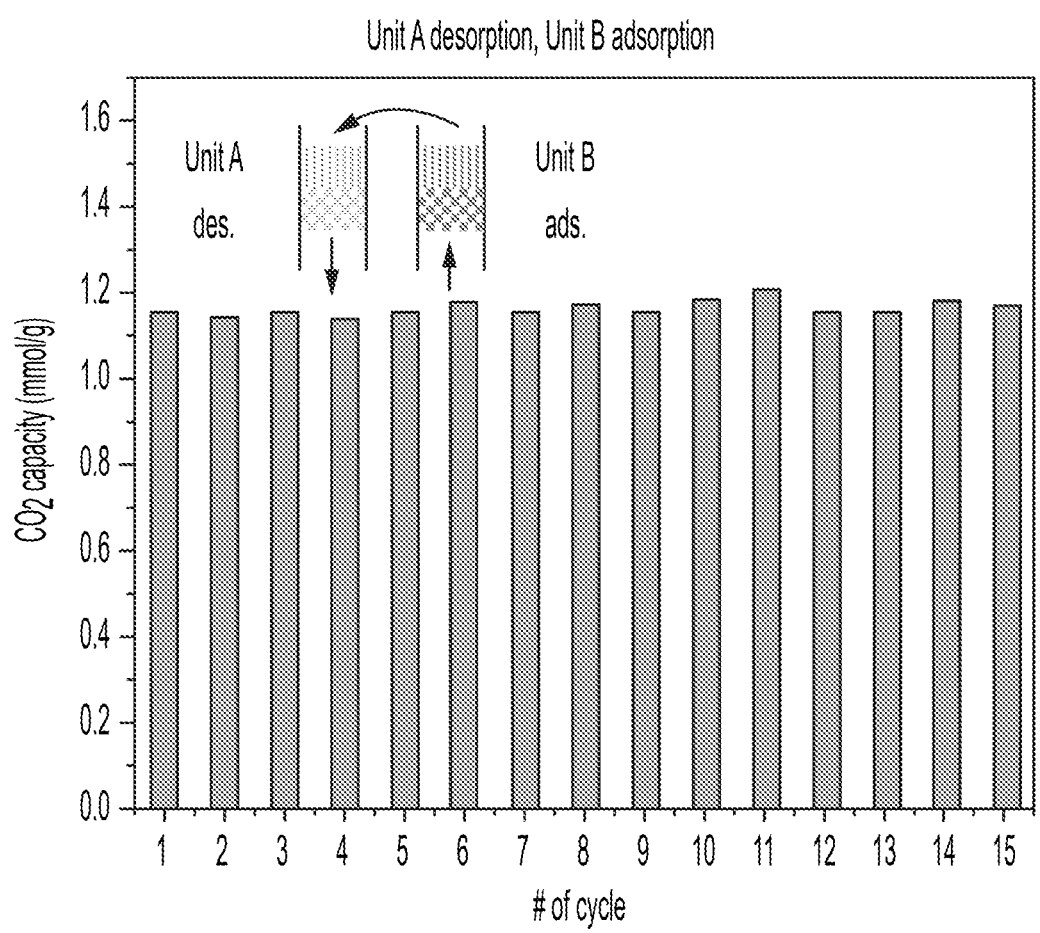

FIGS. 53 and 54 show multicycle adsorption-desorption of two parallel adsorption units with dual-layer beds comprising SAPO-34 upstream of MOR. For adsorption, humid air gas mixtures flow through SAPO-34 followed by MOR; while $CO_2$- and $H_2O$-free air gas mixtures flow through MOR followed by SAPO-34 for desorption. Schematics showing adsorption units have gas entering from the bottom, while schematics showing desorption units have gas exiting from the bottom. Gas flow direction was switched for adsorption with unit B and desorption with unit A.

Figure 55:
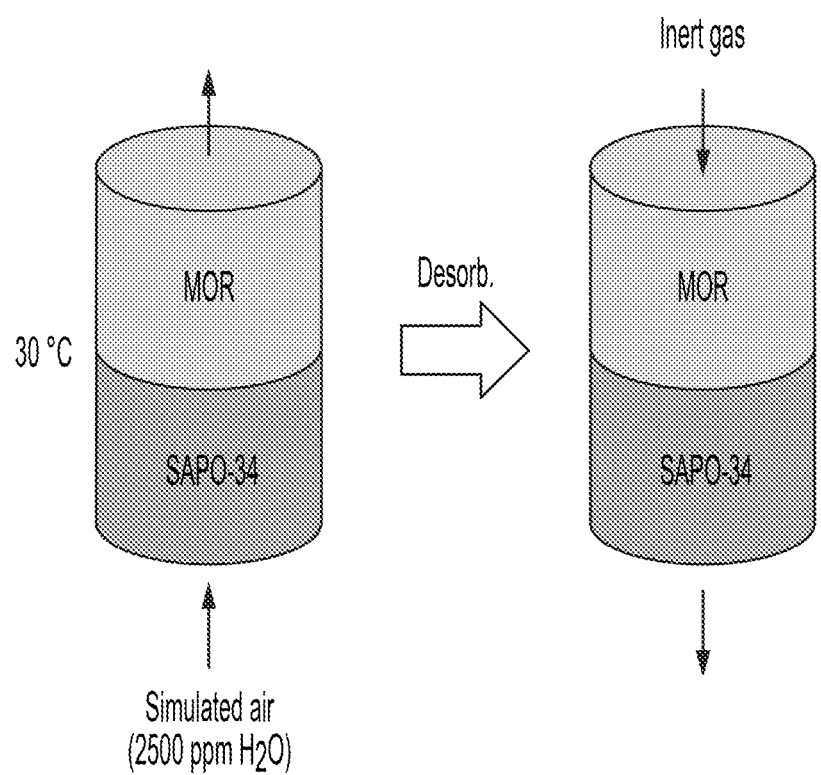

FIG. 55 shows schematic illustrations of the SAPO-34+ MOR system with SAPO-34 upstream of MOR layer. Reverse flow was used for regeneration of the system to avoid water adsorption in MOR layer.

DETAILED DESCRIPTION OF ILLUSTRATIVE EMBODIMENTS

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range. For example, a range defined as from 400 to 450 ppm includes 400 ppm and 450 ppm as independent embodiments.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of" and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of" For those embodiments provided in terms of "consisting essentially of," the basic and novel characteristic(s) is the facile operability of the methods or compositions/systems to provide the aluminosilicate compositions at meaningful yields (or the ability of the systems using only those ingredients listed. Other components or steps may be included, as long as these additional components or steps do not materially affect the basic and novel characteristic(s) of the claimed invention.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C," as separate embodiments, as well as C1-3.

Throughout this specification, words are to be afforded their normal meaning, as would be understood by those skilled in the relevant art. However, to avoid misunderstanding, the meanings of certain terms will be specifically defined or clarified.

The terms "method(s)" and "process(es)" are considered interchangeable within this disclosure.

The terms "separating" or "separated" carry their ordinary meaning as would be understood by the skilled artisan, insofar as they connote physically partitioning or isolating of one material from another or the selective capture of one component from a broader mixture. For example, in the case where the terms are used in the context of gas processing, the terms "separating" or "separated" connote a partitioning of the gases by adsorption or by permeation based on size or physical or chemical properties, as would be understood by those skilled in the art.

In the context of $CO_2$ content in a gaseous source mixture, the terms "low concentration" or "low-$CO_2$-content" refers to embodiments where the $CO_2$ content of is in a range of from 100 ppm to 1000 ppm, or more preferably in an amount approximating the content of $CO_2$ in our atmosphere (i.e., ca. 400 ppm), but also the higher levels found in, e.g., buildings of process streams. In some specific embodiments, the $CO_2$ content in a gaseous source mixture may range from 300 to 350 ppm, 350 to 400 ppm, 400 to 450 ppm, 450 to 500 ppm, 500 to 600 ppm, 600 to 700 ppm, 700 to 800 ppm, 800 to 900 ppm, 900 to 1000 ppm, or the $CO_2$ content may be defined in terms of any of the foregoing values or two or more of the foregoing ranges. The term "gaseous source mixture" or the like refers to the gas from which the $CO_2$ is being extracted, typically air or, in the case of testing, helium, optionally in the presence of argon present as an internal standard. The gaseous source mixture is typically present at ambient atmospheric pressure (i.e., 101 kPa) or within 10% or 20% of that pressure, though higher pressures (i.e., up to 350 kPa) or lower pressures (i.e., down to 50 kPa) may also be considered in the present context.

The term "microporous," according to IUPAC notation refers to a material having pore diameters of less than 2 nm. Similarly, the term "macroporous" refers to materials having pore diameters of greater than 50 nm. And the term "mesoporous" refers to materials whose pore sizes are intermediate between microporous and macroporous. Within the context of the present disclosure, the material properties and applications depend on the properties of the framework such as pore size and dimensionality, cage dimensions and material composition.

"Optional" or "optionally" means that the subsequently described circumstance may or may not occur, so that the description includes instances where the circumstance occurs and instances where it does not. For example, the phrase "optionally heated" refers to both embodiments where the material is and is not heated. Similarly, the term "optionally present" refers to both embodiments where the component is and is not present. Each of these embodiments (is and is not heated or is and is not present) represents individual and independent embodiments.

As used herein, the term "crystalline microporous solids" or "crystalline microporous aluminosilicate" are crystalline structures having very regular pore structures of molecular dimensions, i.e., under 2 nm. The maximum size of the species that can enter the pores of a crystalline microporous solid is controlled by the dimensions of the openings. These materials are sometimes referred to as "molecular sieves," having very regular pore structures of molecular dimensions, i.e., under 2 nm. The term "molecular sieve" refers to the ability of the material to selectively sort molecules based primarily on a size exclusion process. The maximum size of the species that can enter the pores of a crystalline microporous solid is controlled by the dimensions of the openings. These are conventionally defined by the ring size of the aperture, where, for example, the term "8-MR" or "8-membered ring" refers to a closed loop that is typically built from eight tetrahedrally coordinated silicon (or aluminum) atoms and 8 oxygen atoms. These rings are not necessarily symmetrical, due to a variety of effects including strain induced by the bonding between units that are needed to produce the overall structure, or coordination of some of the oxygen atoms of the rings to cations within the structure. As used herein, in the context of the invention, the term "8-MR" or 8-MR zeolite" refers only to those aluminosilicate crystalline materials, or optionally substituted derivatives, having frameworks comprising 8-membered rings as the largest ring for entrance of molecules into the intracrystalline void space. Exemplary structures can be identified in Baerlocher, et al., Atlas of Zeolite Framework Types, Sixth Revised Edition (2007), this reference being incorporated by reference herein for this teaching.

The term "metal ion-doped" is intended to confer the same meaning as "metal ion-containing" in the context of the metal ions set forth elsewhere herein.

The term "silicate" refers to any composition including silicate (or silicon oxide) within its framework. It is a general term encompassing, for example, pure-silica (i.e., absent other detectable metal oxides within the framework), aluminosilicate, borosilicate, ferrosilicate, germanosilicate, stannosilicate, titanosilicate, or zincosilicate structures. The term "aluminosilicate" refers to any composition including both silicon and aluminum oxides within its framework. The term "zeolite" refers to an aluminosilicate composition that is a member of this family. For this reason, the terms "metal ion-doped zeolitic composition(s)" and "metal ion-doped crystalline microporous aluminosilicate composition(s)" are considered equivalent and are used interchangeably herein. Such aluminosilicates may be "pure-aluminosilicates (i.e., absent other detectable metal oxides within the framework) or optionally substituted (i.e., containing other metal oxides within the lattice framework). When described as "optionally substituted," the respective framework may contain boron, gallium, germanium, hafnium, iron, tin, titanium, indium, vanadium, zinc, zirconium, or other atoms substituted for one or more of the atoms not already contained in the parent lattice or framework.

In some cases herein, the term "metal ion-doped crystalline microporous aluminosilicate compositions" are referred to as "zeolitic compositions" or "metal-doped zeolitic compositions," and the like.

The present disclosure is directed to new compositions of matter useful for extracting carbon dioxide ($CO_2$) from feed streams, especially feed streams containing low levels of $CO_2$, including air. Such new compositions comprise metal-containing zeolites, including those zeolites having the framework characteristics set forth herein, and preferably those compositions where the metal is an alkali or alkaline earth metal and the zeolites have MOR topologies. The disclosure is also directed to methods of making and using these compositions, including configurations useful for using these compositions to extract the $CO_2$ from gaseous feed streams.

The present invention may be understood more readily by reference to the following description taken in connection with the accompanying Figures and Examples, all of which form a part of this disclosure. It is to be understood that this invention is not limited to the specific products, methods, conditions, or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. For example, though the some of the present disclosure comments on the placement of the metal ions in the zeolitic framework, the present inventions are not constrained by the correctness or incorrectness of these comments as to the placement. Throughout this text, it is recognized that the descriptions refer to compositions and methods of using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

Compositions

In some aspects, the disclosure is directed to metal ion-doped crystalline microporous aluminosilicate composition comprising: a three-dimensional aluminosilicate framework having Mordenite (or MOR-type) topology comprising 12-MR channels and 8-MR side pockets; wherein the crystalline microporous aluminosilicate contains 2.5 to 9 metal ions per unit cell, wherein the ratio of metal ions to aluminum within the unit cell is from 0.3 to 1.4; and wherein the metal ion-doped crystalline microporous aluminosilicate composition adsorbs carbon dioxide when exposed to a gaseous mixture comprising $CO_2$.

In some aspects, the gaseous mixture comprising $CO_2$ further comprises oxygen.

In some aspects, the gaseous mixture comprising $CO_2$ further comprises nitrogen.

In some aspects, the gaseous mixture comprising $CO_2$ further comprises air.

In some aspects, the gaseous mixture comprising $CO_2$ further comprises oxygen and air.

As used herein, "air" refers to a gaseous mixture which comprises carbon dioxide, and nitrogen. In some embodiments, "air" further comprises oxygen, i.e., air comprises carbon dioxide, oxygen, and nitrogen. In some embodiments, air refers to atmospheric air. In other embodiments, air refers to the gaseous effluent from a process.

In some aspects, the metal ion-doped crystalline microporous aluminosilicate compositions of the disclosure have a Si:Al atomic ratio in a range of from 4:1 to 13:1, such as, for example, one of 4:1, 4.1:1, 4.2:1, 4.3:1, 4.4:1, 4.5:1, 4.6:1, 4.7:1, 4.8:1, 4.9:1, 5:1, 5.1:1, 5.2:1, 5.3:1, 5.4:1, 5.5:1, 5.6:1, 5.7:1, 5.8:1, 5.9:1, 6:1, 6.1:1, 6.2:1, 6.3:1, 6.4:1, 6.5:1, 6.6:1, 6.7:1, 6.8:1, 6.9:1, 7:1, 7.1:1, 7.2:1, 7.3:1, 7.4:1, 7.5:1, 7.6:1, 7.7:1, 7.8:1, 7.9:1, 8:1, 8.1:1, 8.2:1, 8.3:1, 8.4:1, 8.5:1, 8.6:1, 8.7:1, 8.8:1, 8.9:1, 9:1, 9.1:1, 9.2:1, 9.3:1, 9.4:1, 9.5:1, 9.6:1, 9.7:1, 9.8:1, 9.9:1, 10:1, 10.1:1, 10.2:1, 10.3:1, 10.4:1, 10.5:1, 10.6:1, 10.7:1, 10.8:1, 10.9:1, 11:1, 11.1:1, 11.2:1, 11.3:1, 11.4:1, 11.5:1, 11.6:1, 11.7:1, 11.8:1, 11.9:1, 12:1, 12.1:1, 12.2:1, 12.3:1, 12.4:1, 12.5:1, 12.6:1, 12.7:1, 12.8:1, 12.9:1, or 13:1.

In some embodiments, the metal ion-doped crystalline microporous aluminosilicate compositions of the disclosure have a Si:Al atomic ratio in a range of from 6:1 to 13:1, such as, for example, one of 6:1, 6.1:1, 6.2:1, 6.3:1, 6.4:1, 6.5:1, 6.6:1, 6.7:1, 6.8:1, 6.9:1, 7:1, 7.1:1, 7.2:1, 7.3:1, 7.4:1, 7.5:1, 7.6:1, 7.7:1, 7.8:1, 7.9:1, 8:1, 8.1:1, 8.2:1, 8.3:1, 8.4:1, 8.5:1, 8.6:1, 8.7:1, 8.8:1, 8.9:1, 9:1, 9.1:1, 9.2:1, 9.3:1, 9.4:1, 9.5:1, 9.6:1, 9.7:1, 9.8:1, 9.9:1, 10:1, 10.1:1, 10.2:1, 10.3:1, 10.4:1, 10.5:1, 10.6:1, 10.7:1, 10.8:1, 10.9:1, 11:1, 11.1:1, 11.2:1, 11.3:1, 11.4:1, 11.5:1, 11.6:1, 11.7:1, 11.8:1, 11.9:1, 12:1, 12.1:1, 12.2:1, 12.3:1, 12.4:1, 12.5:1, 12.6:1, 12.7:1, 12.8:1, 12.9:1, or 13:1.

In other embodiments, the metal ion-doped crystalline microporous aluminosilicate compositions of the disclosure have a Si:Al atomic ratio in a range of from 4:1 to 6:1, such as, for example, one of 4:1, 4.1:1, 4.2:1, 4.3:1, 4.4:1, 4.5:1, 4.6:1, 4.7:1, 4.8:1, 4.9:1, 5:1, 5.1:1, 5.2:1, 5.3:1, 5.4:1, 5.5:1, 5.6:1, 5.7:1, 5.8:1, 5.9:1, or 6:1.

In yet other embodiments, the metal ion-doped crystalline microporous aluminosilicate compositions of the disclosure have a Si:Al atomic ratio in a range of from 4:1 to 5.9:1, such as, for example, one of 4:1, 4.1:1, 4.2:1, 4.3:1, 4.4:1, 4.5:1, 4.6:1, 4.7:1, 4.8:1, 4.9:1, 5:1, 5.1:1, 5.2:1, 5.3:1, 5.4:1, 5.5:1, 5.6:1, 5.7:1, 5.8:1, or 5.9:1.

In some aspects, the metal ion-doped crystalline microporous aluminosilicate compositions of the disclosure contain metal ions. In this aspect, the metal ion-doped crystalline microporous aluminosilicate compositions of the disclosure contain 2.5 to 9 metal ions per unit cell, such as, for example, 2.5, 2.6, 2.7, 2.8, 2.9, 3, 3.1, 3.2, 3.3, 3.4, 3.5, 3.6, 3.7, 3.8, 3.9, 4:1, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, or 9 metal ions per unit cell.

In some embodiments, the metal ion-doped crystalline microporous aluminosilicate compositions of the disclosure contain 6 to 9 metal ions per unit cell, such as, for example, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, or 9 metal ions per unit cell.

In some embodiments, the metal ion-doped crystalline microporous aluminosilicate compositions of the disclosure contain 3 to 4.5 metal ions per unit cell, such as, for example, 3, 3.1, 3.2, 3.3, 3.4, 3.5, 3.6, 3.7, 3.8, 3.9, 4:1, 4.1, 4.2, 4.3, 4.4, or 4.5 metal ions per unit cell.

In some aspects, the ratio of metal ions to aluminum within the unit cell is from 0.3 to 1.4, such as, for example, one of 0.3, 0.4, 0.5, 0.6, 0.7, 0.8, 0.9, 1, 1.1, 1.2, 1.3, or 1.4.

In some embodiments, the metal ions are positioned within the voids or channels of the three-dimensional aluminosilicate framework.

In some embodiments, the metal ion-doped crystalline microporous aluminosilicate compositions of the disclosure contain 2.5 to 5 metal ions, such as for example, 2.5, 2.6, 2.7, 2.8, 2.9, 3, 3.1, 3.2, 3.3, 3.4, 3.5, 3.6, 3.7, 3.8, 3.9, 4:1, 4.1, 4.2, 4.3, 4.4, 4.5, 4.6, 4.7, 4.8, 4.9, or 5 metal ions, in the 8-MR side-pocket per unit cell.

In some embodiments, the metal ion-doped crystalline microporous aluminosilicate compositions of the disclosure contain 1.2 to 2.5 metal ions, such as, for example, 1.2, 1.3, 1.4, 1.5, 1.6, 1.7, 1.8, 1.9, 2, 2.1, 2.2, 2.3, 2.4, or 2.5 metal ions, in the 8-MR side-pocket per unit cell.

In some embodiments, the metal ions are alkali metal cations.

In some embodiments, the alkali metal cations are $Li^+$, $Na^+$, $K^+$, $Rb^+$, or $Cs^+$.

In some embodiments, the alkali metal cations are $Li^+$.

In some embodiments, the alkali metal cations are $Na^+$.

In some embodiments, the alkali metal cations are $K^+$.

In some embodiments, the alkali metal cations are $Rb^+$.

In some embodiments, the alkali metal cations are $Cs^+$.

In other embodiments, the metal ions are alkaline earth metal cations.

In some embodiments, the alkali earth metal cations are $Mg^{2+}$, $Ca^{2+}$, $Sr^{2+}$, or $Ba^{2+}$.

In some embodiments, the alkali earth metal cations are $Mg^{2+}$.

In some embodiments, the alkali earth metal cations are $Ca^{2+}$.

In some embodiments, the alkali earth metal cations are $Sr^{2+}$.

In some embodiments, the alkali earth metal cations are $Ba^{2+}$.

In some aspects, the metal ion-doped crystalline microporous aluminosilicate compositions of the disclosure are characterized by specific performance characteristics. Thus, in some aspects, the metal ion-doped crystalline microporous aluminosilicate compositions of the disclosure are characterized by the carbon dioxide adsorption capacity. In some aspects, the carbon dioxide adsorption capacity is measured in mmol of carbon dioxide per gram of metal ion-doped crystalline microporous aluminosilicate composition under specified conditions of pressure and temperature. Methods for measuring the mmol of carbon dioxide adsorbed per gram of composition under specified conditions of pressure and temperature are known by those of skill in the art, and include those methods set forth herein. The capacity is often measured by volumetric based approaches, e.g., isotherms or fixed-bed column breakthrough experiments, or by gravimetric based methods using instruments with microbalance, e.g., thermogravimetric analysis.

In some embodiments, the metal ion-doped crystalline microporous aluminosilicate compositions of the disclosure adsorb at least 0.1 mmol; or at least 0.2 mmol; or at least 0.3 mmol; or at least 0.4 mmol; or at least 0.5 mmol; or at least 0.6 mmol; or at least 0.7 mmol; or at least 0.8 mmol; or at least 0.9 mmol; or at least 1 mmol; or at least 1.1 mmol; or at least 1.2 mmol; or at least 1.3 mmol; or at least 1.4 mmol of carbon dioxide per gram of metal ion-doped crystalline microporous aluminosilicate composition when exposed to $CO_2$ at a pressure of 0.0004 bar and a temperature of 25° C.

In other embodiments, the metal ion-doped crystalline microporous aluminosilicate compositions of the disclosure adsorb at least 2.0 mmol of carbon dioxide per gram of metal ion-doped crystalline microporous aluminosilicate composition when exposed to $CO_2$ at a pressure of 0.0004 bar and a temperature of −11° C.

In other aspects, the carbon dioxide adsorption capacity is measured in molecules of adsorbed carbon dioxide per unit cell of metal ion-doped crystalline microporous aluminosilicate composition under specified conditions of pressure and temperature. Methods for measuring the number of molecules of carbon dioxide adsorbed per unit cell of composition under specified conditions of pressure and temperature are known by those of skill in the art, and include those methods set forth herein. The number of carbon dioxide molecules adsorbed per unit cell was calculated using the molar weight of unit cell based on compositions measured by elemental analysis, e.g., EDX, and the carbon dioxide capacity measured by volumetric or gravimetric methods.

In some embodiments, the metal ion-doped crystalline microporous aluminosilicate compositions of the disclosure adsorb from 0.3 to 4.4 molecules, such as, for example, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, or 4.4, molecules of $CO_2$ per unit cell when exposed to $CO_2$ at a pressure of 0.0004 bar and a temperature of 25° C.

In some embodiments, the metal ion-doped crystalline microporous aluminosilicate compositions of the disclosure adsorb from 0.3 to 3.5 molecules, such as, for example, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, or 3.5, molecules of $CO_2$ per unit cell when exposed to $CO_2$ at a pressure of 0.0004 bar and a temperature of 25° C.

In other embodiments, the metal ion-doped crystalline microporous aluminosilicate compositions of the disclosure adsorb from 0.3 to 2.4 molecules, such as, for example, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, or 2.4, molecules of $CO_2$ per unit cell when exposed to $CO_2$ at a pressure of 0.0004 bar and a temperature of 25° C.

In other embodiments, the metal ion-doped crystalline microporous aluminosilicate compositions of the disclosure adsorb from 2.5 to 3.4 molecules, such as, for example, 2.5, 2.6, 2.7, 2.8, 2.9, 3, 3.1, 3.2, 3.3, 3.4, or 3.5, molecules of $CO_2$ per unit cell when exposed to $CO_2$ at a pressure of 0.0004 bar and a temperature of 25° C.

In other embodiments, the metal ion-doped crystalline microporous aluminosilicate compositions of the disclosure adsorb from 3.5 to 4.4 molecules, such as, for example, 3.5, 3.6, 3.7, 3.8, 3.9, 4, 4.1, 4.2, 4.3, or 4.4, molecules of $CO_2$ per unit cell when exposed to $CO_2$ at a pressure of 0.0004 bar and a temperature of 25° C.

In other embodiments, the metal ion-doped crystalline microporous aluminosilicate compositions of the disclosure adsorb from 5.8 to 6.2 molecules, such as, for example, 5.8, 5.9, 6, 6.1, or 6.2, molecules of $CO_2$ per unit cell when exposed to $CO_2$ at a pressure of 0.0004 bar and a temperature of −11° C.

In some aspects, the metal ion-doped crystalline microporous aluminosilicate compositions are those wherein passage of a gaseous mixture having (a) a total pressure in a range of from 50 kPa to 350 kPa, and (b) a $CO_2$ content in a range of from 350 to 1000 ppm, through a tube containing a fixed bed of the metal ion-doped crystalline microporous aluminosilicate composition results in complete breakthrough of $CO_2$ after adsorption of an amount of $CO_2$ (on a mmol/g basis) that is 1.5-2 times greater than the amount of $CO_2$ adsorbed by an equal weight of zeolite 13X before complete saturation of $CO_2$ occurs under the same conditions.

In some aspects, the metal ion-doped crystalline microporous aluminosilicate compositions are those wherein passage of a gaseous mixture having (a) a total pressure in a range of from 50 kPa to 350 kPa, and (b) a $CO_2$ content in a range of from 350 to 1000 ppm, through a tube containing powders of the metal ion-doped crystalline microporous aluminosilicate composition results in equilibrium of $CO_2$ after adsorption of an amount of $CO_2$ (on a mmol/g basis) that is 1.5-2 times greater than the amount of $CO_2$ adsorbed by an equal weight of zeolite 13X before complete equilibrium of $CO_2$ occurs under the same conditions.

In some aspects, the gaseous mixture has a total pressure in a range of from 50 kPa to 350 kPa, such as, for example, 50 kPa, 75 kPa, 100 kPa, 125 kPa, 150 kPa, 175 kPa, 200 kPa, 225 kPa, 250 kPa, 275 kPa, 300 kPa, 325 kPa, or 350 kPa.

In other aspects, the gaseous mixture has a $CO_2$ content in a range of from 350 to 1000 ppm, such as, for example, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, or 1000 ppm.

In some aspects, passage of the gaseous mixture through the fixed bed of the metal ion-doped crystalline microporous aluminosilicate composition results in complete breakthrough of $CO_2$ after adsorption of an amount of $CO_2$ (on a mmol/g basis) that is 1.5-2, such as, for example, 1.5 times, 1.6 times, 1.7 times, 1.8 time, 1.9 times, or 2, times greater than the amount of $CO_2$ adsorbed by an equal weight of zeolite 13X before complete saturation of $CO_2$ occurs under the same conditions. As used herein, "complete breakthrough" means that the amount or concentration of $CO_2$ exiting the fixed bed of the metal ion-doped crystalline microporous aluminosilicate composition is the same as the amount or concentration of $CO_2$ entering the fixed bed. Methods for measuring "complete breakthrough" are known by those of skill in the art, and include those methods set forth herein.

In some embodiments, the gaseous mixture is 400 ppm $CO_2$/1% Ar/He at a flow rate of 20 mL·min$^{-1}$ at 30° C.

In other embodiments, the gaseous mixture is 400 ppm $CO_2$/1% Ar/20% He/balance $N_2$, at a flow rate of 20 mL·min$^{-1}$ at 30° C.

In yet other embodiments, the gaseous mixture is 400 ppm $CO_2$/1% Ar/20% $O_2$/balance $N_2$, at a flow rate of 20 mL·min$^{-1}$ at 30° C.

In some embodiments, the gaseous mixture is 400 ppm $CO_2$/1% Ar/He at a flow rate of 20 mL·min$^{-1}$ at −11° C.

In other embodiments, the gaseous mixture is 400 ppm $CO_2$/1% Ar/20% He/balance $N_2$ at a flow rate of 20 mL·min$^{-1}$ at −11° C.

In yet other embodiments, the gaseous mixture is 400 ppm $CO_2$/1% Ar/20% $O_2$/balance $N_2$, at a flow rate of 20 mL·min$^{-1}$ at −11° C.

In some aspects, the metal ion-doped crystalline microporous aluminosilicate compositions of the disclosure which have adsorbed carbon dioxide, have the adsorbed carbon dioxide desorbed at a temperature of less than 150° C. In such embodiments, the carbon dioxide may be desorbed by heating the metal ion-doped crystalline microporous aluminosilicate compositions while passing a stream of inert gas through the composition.

In other embodiments of the metal ion-doped crystalline microporous aluminosilicate compositions of the disclosure, the adsorbed carbon dioxide is desorbed at a temperature of less than 125° C.

In other embodiments of the metal ion-doped crystalline microporous aluminosilicate compositions of the disclosure, the adsorbed carbon dioxide is desorbed at a temperature of less than 100° C.

In other embodiments of the metal ion-doped crystalline microporous aluminosilicate compositions of the disclosure, the adsorbed carbon dioxide is desorbed at a temperature of less than 75° C.

In other embodiments of the metal ion-doped crystalline microporous aluminosilicate compositions of the disclosure, the adsorbed carbon dioxide is desorbed at a temperature of less than 60° C.

In other embodiments of the metal ion-doped crystalline microporous aluminosilicate compositions of the disclosure, the adsorbed carbon dioxide is desorbed at a temperature of less than 50° C.

In some aspects, the metal ion-doped crystalline microporous aluminosilicate compositions of the disclosure are those wherein the metal ion-doped crystalline microporous aluminosilicate composition has a selectivity for $CO_2$ over $N_2$. As used herein, "selectivity" means that the metal ion-doped crystalline microporous aluminosilicate composition adsorbs one species of molecule in preference to another species of molecule. Selectivity is expressed as a ratio of one molecule to another molecule against the ratio of the molar fraction of one molecule to another molecule. The $CO_2/N_2$ selectivity is defined as $$\text{Selectivity} = \frac{q_1/q_2}{p_1/p_2},$$

where $q_i$ and $p_i$ denote the capacity and partial pressure, respectively, of component i.

In some embodiments, the metal ion-doped crystalline microporous aluminosilicate compositions of the disclosure have a selectivity for $CO_2$ over $N_2$ of at least 4000:1.

In other embodiments, the metal ion-doped crystalline microporous aluminosilicate compositions of the disclosure have a selectivity for $CO_2$ over $N_2$ of at least 3000:1.

Methods of Use

In some aspects, the disclosure is directed to methods of capturing carbon dioxide from a gaseous source mixture that comprises carbon dioxide, wherein the methods comprise contacting the gaseous source mixture with the metal ion-doped crystalline microporous aluminosilicate as described in the disclosure such that carbon dioxide in the gaseous source mixture is adsorbed by the metal ion-doped crystalline microporous aluminosilicate.

In some embodiments, the gaseous mixture further comprises oxygen.

In other embodiments, the gaseous mixture further comprises nitrogen.

In other embodiments, the gaseous mixture further comprises air.

In some aspects, the methods of the disclosure further comprise desorbing the adsorbed carbon dioxide from the carbon-dioxide laden metal ion-doped crystalline microporous aluminosilicate.

In some embodiments of the methods of the disclosure, the contacting of the metal ion-doped crystalline microporous aluminosilicate compositions with the gaseous source mixture is done in the absence of, or without the use of, an added desiccant.

In other embodiments of the methods of the disclosure, the contacting of the metal ion-doped crystalline microporous aluminosilicate with the gaseous source mixture is done in the presence of, or with the use of, an added desiccant.

In some embodiments of the methods of the disclosure, contacting the gaseous source mixture with the metal ion-doped crystalline microporous aluminosilicate comprises passing the gaseous source mixture through a fixed-bed of adsorbent comprising the metal ion-doped crystalline microporous aluminosilicate.

In some embodiments of the methods of the disclosure, contacting the gaseous source mixture with the metal ion-doped crystalline microporous aluminosilicate occurs at a temperature of less than 50° C.

In some embodiments of the methods of the disclosure, contacting the gaseous source mixture with the metal ion-doped crystalline microporous aluminosilicate occurs at a temperature of less than 30° C.

In other embodiments of the methods of the disclosure, contacting the gaseous source mixture with the metal ion-doped crystalline microporous aluminosilicate occurs at a temperature of less than 10° C.

In some embodiments of the methods of the disclosure, contacting the gaseous source mixture with the metal ion-doped crystalline microporous aluminosilicate occurs at a temperature of less than 0° C.

In other embodiments of the methods of the disclosure, contacting the gaseous source mixture with the metal ion-doped crystalline microporous aluminosilicate occurs at a temperature of less than −10° C.

In some embodiments of the methods of the disclosure, desorbing the carbon dioxide from the carbon-dioxide laden metal ion-doped crystalline microporous aluminosilicate occurs at a temperature less than 150° C.

In other embodiments of the methods of the disclosure, desorbing the carbon dioxide from the carbon-dioxide laden metal ion-doped crystalline microporous aluminosilicate occurs at a temperature less than 125° C.

In other embodiments of the methods of the disclosure, desorbing the carbon dioxide from the carbon-dioxide laden metal ion-doped crystalline microporous aluminosilicate occurs at a temperature less than 100° C.

In other embodiments of the methods of the disclosure, desorbing the carbon dioxide from the carbon-dioxide laden metal ion-doped crystalline microporous aluminosilicate occurs at a temperature less than 75° C.

In other embodiments of the methods of the disclosure, desorbing the carbon dioxide from the carbon-dioxide laden metal ion-doped crystalline microporous aluminosilicate occurs at a temperature less than 60° C.

In some aspects of the methods of the disclosure, the gaseous source mixture has (a) a total pressure in a range of from 50 kPa to 350 kPa, and (b) a $CO_2$ content in a range of from 350 to 1000 ppm.

In some embodiments of the disclosed methods, the gaseous source mixture has a total pressure in a range of from 50 kPa to 350 kPa, such as, for example, 50 kPa, 75 kPa, 100 kPa, 125 kPa, 150 kPa, 175 kPa, 200 kPa, 225 kPa, 250 kPa, 275 kPa, 300 kPa, 325 kPa, or 350 kPa.

In some embodiments of the disclosed methods, the gaseous source mixture has a total pressure in a range of from 50 kPa to 350 kPa, such as, for example, 50 kPa, 75 kPa, 100 kPa, 125 kPa, 150 kPa, 175 kPa, 200 kPa, 225 kPa, 250 kPa, 275 kPa, 300 kPa, 325 kPa, or 350 kPa.

In some embodiments of the disclosed methods, the gaseous source mixture has a total pressure in a range of from 50 kPa to 300 kPa.

In some embodiments of the disclosed methods, the gaseous source mixture has a total pressure in a range of from 50 kPa to 250 kPa.

In some embodiments of the disclosed methods, the gaseous source mixture has a total pressure in a range of from 50 kPa to 200 kPa.

In some embodiments of the disclosed methods, the gaseous source mixture has a total pressure in a range of from 50 kPa to 150 kPa.

In some embodiments of the disclosed methods, the gaseous source mixture has a total pressure in a range of from 50 kPa to 125 kPa.

The method wherein the gaseous source mixture has a total pressure in a range of from 50 kPa to 100 kPa.

In some aspects of the methods of the disclosure, the gaseous source mixture has a $CO_2$ content in a range of from 350 to 1000 ppm, such as, for example, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, or 1000 ppm.

In some embodiments of the disclosed methods, the gaseous source mixture has a $CO_2$ content in a range of from 350 to 750 ppm.

In some embodiments of the disclosed methods, the gaseous source mixture has a $CO_2$ content in a range of from 350 to 600 ppm.

In some embodiments of the disclosed methods, the gaseous source mixture has a $CO_2$ content in a range of from 350 to 500 ppm.

In some embodiments of the disclosed methods, the gaseous source mixture has a $CO_2$ content in a range of from 350 to 425 ppm.

In some embodiments of the methods of the disclosure, the gaseous source mixture is humid, i.e., contains water vapor.

In some embodiments, the gaseous source mixture contains 30,000 ppm or less of water, such as, for example, 30,000 ppm or less, 20,000 ppm or less, 17,500 ppm or less, 15,000 ppm or less, 12,500 ppm or less, 10,000 ppm or less, 7500 ppm or less, 5000 ppm or less, or 2500 ppm or less.

In some embodiments, the gaseous source mixture contains 2500 ppm or less water.

In some embodiments of the methods of the disclosure, the humid gaseous source mixture passes through a desiccant before passing through the metal ion-doped crystalline microporous aluminosilicate. Without intending to be bound by theory, it is believed that the desiccant removes water from the gaseous source mixture. Water in the gaseous source mixture can reduce the $CO_2$ adsorption capacity of the metal ion-doped crystalline microporous aluminosilicate; thus, by removing the water in the gaseous source mixture, the $CO_2$ adsorption capacity of the metal ion-doped crystalline microporous aluminosilicate is maximized. Moreover, the temperature required to desorb water from the metal ion-doped crystalline microporous aluminosilicates of the disclosure is significantly higher than the temperature required to desorp $CO_2$ from the metal ion-doped crystalline microporous aluminosilicate.

In some embodiments, the desiccant is selected by matching the temperature at which water is desorbed from the desiccant to the temperature at which $CO_2$ is desorbed from the metal ion-doped crystalline microporous aluminosilicate. Selecting the desiccant in this manner allows regeneration of both the desiccant and the metal ion-doped crystalline microporous aluminosilicate simultaneously, and at the same temperature.

In some embodiments, the desiccant desorbs water at a temperature of 150° C. or less, such as, for example, 150° C. or less, 140° C. or less, 130° C. or less, 120° C. or less, 110° C. or less, 100° C. or less, 90° C. or less, or 80° C. or less.

In some embodiments, the desiccant desorbs water at a temperature of 120° C. or less.

In some embodiments, the desiccant desorbs water at a temperature of 110° C. or less.

In some embodiments, the desiccant desorbs water at a temperature of 100° C. or less.

In some aspects, the disclosure is directed to methods of capturing carbon dioxide from a humid gaseous source mixture that comprises water and carbon dioxide, wherein the methods comprise contacting the gaseous source mixture first with a desiccant, the with the metal ion-doped crystalline microporous aluminosilicate as described in the disclosure, such that such that water in the gaseous source mixture is adsorbed by the desiccant and carbon dioxide in the gaseous source mixture is adsorbed by the metal ion-doped crystalline microporous aluminosilicate.

In some embodiments, the desiccant is SAPO-34.

In other embodiments, the desiccant is ALPO-34.

In some embodiments, the humid gaseous source mixture is contacted with the desiccant at a temperature of 120° C. or less, 110° C. or less, 100° C. or less, 90° C. or less, or 80° C. or less, 70° C. or less, 60° C. or less, 50° C. or less, 40° C. or less, 30° C. or less, 20° C. or less, 10° C. or less, 0° C. or less, −10° C. or less, or −20° C. or less.

In some embodiments, the humid gaseous source mixture is contacted with the desiccant at a temperature of 30° C. or less.

In other embodiments, the humid gaseous source mixture is contacted with the desiccant at a temperature of 10° C. or less.

In other embodiments, the humid gaseous source mixture is contacted with the desiccant at a temperature of 0° C. or less.

In other embodiments, the humid gaseous source mixture is contacted with the desiccant at a temperature of −10° C. or less.

In some embodiments, after the humid gaseous source mixture is contacted with the desiccant, it is contacted with the metal ion-doped crystalline microporous aluminosilicate at a temperature of 120° C. or less, 110° C. or less, 100° C. or less, 90° C. or less, or 80° C. or less, 70° C. or less, 60° C. or less, 50° C. or less, 40° C. or less, 30° C. or less, 20° C. or less, 10° C. or less, 0° C. or less, −10° C. or less, or −20° C. or less.

In some embodiments, after the humid gaseous source mixture is contacted with the desiccant, it is contacted with the metal ion-doped crystalline microporous aluminosilicate at a temperature of 30° C. or less.

In some embodiments, after the humid gaseous source mixture is contacted with the desiccant, it is contacted with the metal ion-doped crystalline microporous aluminosilicate at a temperature of 10° C. or less.

In some embodiments, after the humid gaseous source mixture is contacted with the desiccant, it is contacted with the metal ion-doped crystalline microporous aluminosilicate at a temperature of 0° C. or less.

In some embodiments, after the humid gaseous source mixture is contacted with the desiccant, it is contacted with the metal ion-doped crystalline microporous aluminosilicate at a temperature of −10° C. or less.

In some embodiments, the desiccant and the metal ion-doped crystalline microporous aluminosilicate are arranged in sequential layers in a single vessel (such as, for example, a column). In these embodiments, the humid gaseous source mixture passes first through the desiccant layer and then through the metal ion-doped crystalline microporous aluminosilicate layer.

In other embodiments, the desiccant and the metal ion-doped crystalline microporous aluminosilicate are contained in separate vessels. In these embodiments, the humid gaseous source mixture passes first through the desiccant in a first vessel, and then through the metal ion-doped crystalline microporous aluminosilicate in a second vessel.

In some embodiments, the methods of capturing carbon dioxide from a humid gaseous source mixture using a desiccant and metal ion-doped crystalline microporous aluminosilicate further comprise regenerating the desiccant and the metal ion-doped crystalline microporous aluminosilicate by passing a gas through the metal ion-doped crystalline microporous aluminosilicate and through the desiccant at a temperature of 150° C. or less, such as, for example, 150° C. or less, 140° C. or less, 130° C. or less, 120° C. or less, 110° C. or less, 100° C. or less, 90° C. or less, or 80° C. or less.

In some embodiments, regenerating the desiccant and metal ion-doped crystalline microporous aluminosilicate by passing a gas through the metal ion-doped crystalline microporous aluminosilicate and through the desiccant is conducted at a temperature of 110° C. or less, 100° C. or less, 90° C. or less, or 80° C. or less.

In some embodiments, regenerating the metal ion-doped crystalline microporous aluminosilicate and the desiccant by passing a gas through the desiccant and metal ion-doped crystalline microporous aluminosilicate is conducted at a temperature of 100° C. or less.

In some embodiments, the metal ion-doped crystalline microporous aluminosilicate is regenerated by passing a gas through the metal ion-doped crystalline microporous aluminosilicate and through the desiccant at a temperature of 150° C. or less, such as, for example, 150° C. or less, 140° C. or less, 130° C. or less, 120° C. or less, 110° C. or less, 100° C. or less, 90° C. or less, or 80° C. or less.

In some embodiments, the metal ion-doped crystalline microporous aluminosilicate is regenerated by passing a gas through the metal ion-doped crystalline microporous aluminosilicate at a temperature of 110° C. or less, 100° C. or less, 90° C. or less, or 80° C. or less.

In some embodiments, the metal ion-doped crystalline microporous aluminosilicate is regenerated by passing a gas through the metal ion-doped crystalline microporous aluminosilicate at a temperature of 100° C. or less.

In some embodiments, the desiccant is regenerated by passing a gas through the desiccant at a temperature of 150° C. or less, such as, for example, 150° C. or less, 140° C. or less, 130° C. or less, 120° C. or less, 110° C. or less, 100° C. or less, 90° C. or less, or 80° C. or less.

In some embodiments, the desiccant is regenerated by passing a gas through the desiccant at a temperature of 110° C. or less, 100° C. or less, 90° C. or less, or 80° C. or less.

In some embodiments, the desiccant is regenerated by passing a gas through the desiccant at a temperature of 100° C. or less.

In some embodiments, regeneration of the desiccant and the metal ion-doped crystalline microporous aluminosilicate, water desorbed from the desiccant during regeneration is not passed through the metal ion-doped crystalline microporous aluminosilicate.

In some embodiments, the regeneration gas is an inert gas such as, nitrogen, argon, helium, or mixtures thereof. In other embodiments, the regeneration gas is air.

In embodiments in which the desiccant and the metal ion-doped crystalline microporous aluminosilicate are contained in separate vessels, water may be collected for beneficial use from the regeneration gas after regenerating the desiccant.

In some aspects, the disclosure is directed to a multi-unit system comprising two or more parallel adsorption units, wherein each unit comprises a bed of desiccant and a bed of a metal ion-doped crystalline microporous aluminosilicate. In these aspects, humid gaseous source mixture is passed through a first adsorption unit, passing first through the desiccant bed and then through the metal ion-doped crystalline microporous aluminosilicate bed. The effluent from that first adsorption unit is then passed through a second, parallel adsorption unit in the opposite orientation (i.e., the effluent from the first adsorption unit is passed first through the metal ion-doped crystalline microporous aluminosilicate bed of the second unit and then through the desiccant bed of the second adsorption unit.

In some embodiments, the adsorption and desorption processes are conducted at the same temperature.

In other embodiments, the adsorption and desorption processes are conducted at the different temperatures.

In some embodiments, the adsorption process is conducted at about 30° C. or less.

In some embodiments, the desorption process is conducted at about 150° C. or less.

In some embodiments, the desorption process is conducted at about 100° C.

EXAMPLES

Synthesis of Materials

MOR-type zeolites were synthesized from mixtures with or without organic structure directing agents. Large MOR crystals (ca. 40 µm) were synthesized for the single-crystal X-ray diffraction (XRD) analysis. The synthesis procedures for MOR-type as well as MAZ-, *BEA-, MFI-, MEL-type zeolites are given below.

MOR-type zeolites. MOR-type zeolites with Si/Al=6.5 (CBV10A, Zeolyst) were used as received. MOR-type zeolites with Si/Al=5 were synthesized by modifying the recipe reported in M. Wang, et al., Modifying the acidity of H-MOR and its catalytic carbonylation of dimethyl ether. *Chin. J. Catal.* 37, 1530-1537 (2016) using different OSDAs. Typically, sodium hydroxide (50 wt % aqueous solution, Sigma-Aldrich), silica (Ludox-40, Sigma-Aldrich), sodium aluminate and water were mixed in a Teflon liner. After 30 min stirring, the OSDA (pyrrolidine, piperidine, azepane, piperazine, DABCO, 4-Methylpiperidine) was added, and the mixture was stirred for 60 min. Then ca. 5 wt % (silica based) seeds (CBV10A) were added before charging into Teflon lined Parr autoclaves. The molar composition of the synthesize gel was: 1 Sift: 0.067 $Al_2O_3$: 0.23 OSDA: 0.75 $Na_2O$: 11 $H_2O$. The autoclaves were loaded into a preheated static convection oven at 170° C. for 3 days.

The procedure for the synthesis of OSDA-free MOR with Si/Al=4 zeolites followed J. Zhu, et al., Ultrafast, OSDA-free synthesis of mordenite zeolite. *CrystEngComm* 19, 632-640 (2017). Silica, sodium aluminate, sodium hydroxide and water were mixed and stirred for 30 min. Then ca. 5 wt % (silica based) seeds (CBV10A) were added before charging into Teflon-lined Parr autoclaves. The molar composition of the synthesize gel was: 1 Sift: 0.1 $Al_2O_3$: 0.2 $Na_2O$: 26 $H_2O$. The autoclaves were loaded into a preheated rotatory convection oven at 170° C. for 7 days.

Large MOR-type zeolite crystals were synthesized following L. Zhang, A. N. C. van Laak, P. E. de Jongh, K. P. de Jong, Synthesis of large mordenite crystals with different aspect ratios. *Microporous Mesoporous Mater.* 126, 115-124 (2009). Silica (Ludox-40, Sigma-Aldrich), sodium aluminate, sodium hydroxide (50 wt % aqueous solution, Sigma-Aldrich) and water were mixed and stirred for 30 min. Then ca. 5 wt % (silica based) seeds (CBV10A, Zeolyst) were added before charging into Teflon-lined Parr autoclaves. The molar composition of the synthesize gel was: 1 $SiO_2$: 0.052 $Al_2O_3$: 0.23 $Na_2O$: 3.42 $H_2O$. The autoclaves were loaded into a preheated rotatory convection oven at 170° C. for 7 days.

Omega-1 (MAZ). Omega-1 zeolites were synthesized following A. J. Perrotta, C. Kibby, B. R. Mitchell, E. R. Tucci, The synthesis, characterization, and catalytic activity of omega and ZSM-4 zeolites. *J. Catal.* 55, 240-249 (1978). The OSDA (TMAOH, Sigma-Aldrich) was first mixed with water. Then sodium hydroxide and sodium aluminate were added. To the solution silica (Ludox-40, Sigma-Aldrich) was added and stirred for 30 min. The molar composition of the resulting solution was: 10 $SiO_2$: 1.0 $Al_2O_3$: 1.6 TMAOH: 3.2 $Na_2O$: 160 $H_2O$. The solution was charged into a polypropylene bottle and heated to 95° C. for 10 days.

*BEA. *BEA-type zeolites were synthesized following S.-T. Yang, J. Kim, W.-S. Ahn, $CO_2$ adsorption over ion-exchanged zeolite beta with alkali and alkaline earth metal ions. *Microporous Mesoporous Mater.* 135, 90-94 (2010). Sodium aluminate, the OSDA (TEAOH, Sigma-Aldrich) and water were mixed. Then silica (Carbosil M5) was added and stirred for 120 min. The molar composition of the resulting gel was: 1 $SiO_2$: 0.1 $Al_2O_3$: 1.0 TEAOH: 0.1 $Na_2O$: 6.2 $H_2O$. The thick gel was charged into Teflon-lined Parr autoclaves and put in a preheated static convection oven at 170° C. for 3 days. MEL(ZSM-11). ZSM-11 zeolites with Si/Al=15 were synthesized following L. Zhang, et al., Differences between ZSM-5 and ZSM-11 zeolite catalysts in 1-hexene aromatization and isomerization. *Fuel Process. Technol.* 91, 449-455 (2010). Silica (TEOS) and the OSDA (TBABr) were mixed. Then aluminum sulfate and sodium hydroxide were added and stirred for 60 min to obtain a solution. The molar composition of the resulting solution was: 1 $SiO_2$: 0.025 $Al_2O_3$: 0.18 TBABr: 0.14 $Na_2O$: 42.35 $H_2O$. The solution was charged into Teflon-lined Parr autoclaves and put in a rotatory convection oven at 150° C. for 3 days.

MFI, FER and LTL. FER-type (CP914C, $NH_4$-form) with Si/Al=10 and MFI-type (CBV2314, $NH_4$-form ZSM-5) with Si/Al=12 zeolites were obtained from Zeolyst. LTL-type zeolite (HSZ500, K-form) with Si/Al=3 was obtained from Tosoh. The LTL-type zeolite was converted to $NH_4$-form by ion exchange with 1M $NH_4NO_3$ for three times (72 h in total) at 80° C.

Calcination of zeolites. After the synthesis was completed, the resulting solids were washed three times with distilled water. The materials synthesized with OSDAs were further washed by acetone. To remove the OSDAs from zeolites, the obtained solids were then dried at 80° C. before calcining in a flow air furnace at 580° C. for 8 h, with a ramp rate of 1.0° C./min. Crystallinity of the materials was examined using lab-based X-ray diffraction (XRD).

Aqueous-phase Ion-Exchange of Zeolites. Na-type zeolites were prepared by ion exchange of calcined or as received zeolites with 1M aqueous $NaNO_3$ solution. Typically, 600 mg of zeolites were added to 30 mL of salt solutions, which were then stirred at 80° C. for 24 h. The exchanged crystals were dried at 100° C. in ambient air in a free convention oven overnight. A similar ion exchange procedure was used to prepare samples for the preparation of MOR-type zeolites with varying $Na^+$ loading. The MOR6 zeolites (CBV10A, Zeolyst, 4 #in Table 1) were first fully converted to ammonium form after two times (48 h in total) ion exchange using 1 M $NH_4NO_3$ aqueous solution at 80° C. Depending on the targeting Na exchange level, 30 mL of 0.002 M to 5 M aqueous $NaNO_3$ solution were used as the precursor. The materials were recovered by centrifugation and washed 6 times with copious amount of distilled water. The exchanged crystals were dried at 100° C. overnight. The Na- and H-density were measured using energy-dispersive X-ray spectroscopy (EDS) and solid state $^1H$ nuclear magnetic resonance (NMR) spectroscopy, respectively.

Pyridine-modification of zeolites. A previously reported method was followed for pyridine modification of the MOR-type zeolites, denoted as py-MOR. Briefly, Na-MOR was dehydrated at 170° C. under vacuum (0.1 mbar) overnight. The sample was cooled to room temperature and flushed with ultra-high purity Ar before dosing pyridine into MOR zeolites with an amount of ca. 0.5 mL pyridine/mg zeolites. The py-MOR zeolites were heated to 300° C. and kept for 19 h to remove the water and excess pyridine prior to the $CO_2$ adsorption measurements at 30° C. in the dynamic column fixed bed system.

Characterizations

The crystallinity, morphology, chemical compositions, and porosity of zeolites were analyzed by powder XRD, scanning electron microscope, electron dispersive spectroscopy, and $N_2$ physisorption, respectively. The distribution and density of Bronsted acid sites were analyzed using Fourier transform infrared spectroscopy (FTIR) and 1H solid state magic-angle spinning nuclear magnetic resonance (MAS NMR) spectroscopy, respectively. The coordination environment of Al species in MOR-type zeolites was examined using $^{27}Al$ NMR spectroscopy. The locations of $Na^+$ cations in the MOR-type zeolites were characterized using X-ray crystallography, i.e. single crystal XRD analysis. The detailed methods are given below.

X-ray diffraction. The crystallinity of the materials was examined using powder X-ray diffraction (XRD). The XRD patterns were collected using a Rigaku Miniflex II desktop instrument with a Cu radiation source, $K\alpha=1.5418$ A.

Scanning electron microscopy. The morphology of the materials was measured using scanning electron microscopy (SEM, ZEISS 1550 VP FESEM). The SEM was equipped with an Oxford X-Max SDD. Energy dispersive X-ray spectroscopy (EDS) used for determining the element contents of each sample.

Solid-state, magic-angle spinning nuclear magnetic resonance. Solid-state, magic-angle spinning nuclear magnetic resonance (MAS NMR) spectra were obtained on a Bruker AVANCE 500 MHz (11.2 T) spectrometer using a 4 mm zirconia rotor with a Kel-F cap. $^1$H MAS NMR spectroscopy was measured to quantify the residue H-density of Na$^+$ exchanged MOR-type zeolites as a function of Na$^+$ loading. NH$_4$-form materials were used to avoid the dealumination through ion exchange and dehydration. The samples were loaded in the rotor and dehydrated under vacuum (10-2 Torr) at 400° C. for 12 h in a Schlenk manifold. The spectra were acquired at 500.1 MHz with a 90° pulse length of 4 µs and a spinning rate of 12 kHz, and then were deconvoluted using DMFit software. The number of framework NH4 site (mmol/g) was measured by referencing the signal intensities to hexamethyl benzene and normalizing by the sample mass, followed by dividing by 4, that is the number of protons per NH$_4$+. The residual NH$_4$ site density of Na-exchanged MOR zeolites was then quantified with the same procedure as a function of Na loading. To examine the state of aluminum in Na-exchanged MOR zeolites, the $^{27}$Al MAS NMR spectra were also recorded on the same samples without undergoing dehydration at 130.2 MHz with a 10" pulse length of 0.5 µs, a cycle delay time of 0.5 s, and a spin rate of 12 kHz.

Fourier transform infrared spectroscopy. Fourier transform infrared (FTIR) spectra were collected on zeolite samples using a Nexus 470 FTIR spectrometer equipped with a deuterated, L-alanine doped triglycine sulfate (DTGS) detector. Catalyst samples (ca. 10-12 mg) were pressed into a self-supporting wafer (ca. 1.2 cm in diameter) and placed in a custom-built FTIR cell. The wafers were treated in flowing dry air at 723 K for 120 min, and then cooled to RT for CO$_2$ adsorption under flowing dry air for 30 min. Spectra were collected with a resolution of 4 cm-1 and averaged over 64 scans.

Single-crystal X-ray diffraction. Single-crystal X-ray diffraction was performed at 100 K on a Bruker D8Venture CCD diffractometer using Cu Kα radiation (λ=1.5406 Å). Crystal was mounted on Mitegen MicroMount. A multi-scan absorption correction was applied to the collected reflections. The structure was solved with the ShelXS structure solution program using Direct Methods and refined with the ShelXL refinement package using Least Squares minimization. All non-hydrogen atoms were refined anisotropically. The figures were exported using Olex2.

Adsorption performance testing. The adsorption performance of zeolites for CO$_2$ was tested using both single component static adsorption and dynamic column breakthrough methods. For the single component experiments, UHP-grade (99.999% purity) carbon dioxide was used for all adsorption measurements. CO$_2$ isotherms were measured on a Quantachrome Autosorb iQ adsorption. For each measurement, ca. 100 mg adsorbent was placed in a sample holder that was immersed into a liquid bath connected to a recirculating chiller with a precise temperature controller. Prior to adsorption measurements, all samples were outgassed at 60° C. for 0.5 h, followed by holds of 0.5 h at 120° C. and 6 h at 350° C. with all the ramp rates of 1.0° C./min. The zeolite performance for CO$_2$ adsorption was also tested using fixed bed column breakthrough experiments. (30) Typically, ca. 500 mg of materials were placed in a quartz tubing (6.74 mm I.D.) to form a fixed bed. First, the adsorbent bed was purged under a 20 mL/min-1 flow of 5% Ar/He gas at 550° C. for 24 h before a breakthrough experiment to completely remove the water and CO$_2$.

Upon cooling to 30° C., the gas flow was switched to the desired gas mixture (ca. 400 ppm CO$_2$/400 ppm Ar (internal standard)/He or 400 ppm CO$_2$/1Ar % (internal standard)/ 20% O$_2$/N$_2$) at a flow rate of 20 mL/min. The outlet composition was continuously monitored using a Ametek Dymaxion Dycor mass spectrometer until a complete breakthrough was achieved. After each breakthrough experiment, the packed column bed was regenerated at 550° C. for 2 h, or 100° C. or 60° C. for 240 min with a constant 5% Ar/He flow (20 mL/min) to test the recyclability of the materials. The CO$_2$/N$_2$ selectivity is defined as $$\text{Selectivity} = \frac{q_1/q_2}{p_1/p_2},$$

where qi and pi denote the capacity and partial pressure of component i.

CO$_2$ adsorption kinetics. The adsorption kinetics of MOR-type zeolites for CO$_2$ adsorption was examined using TGA (Perkin Elmer STA6000). Typically, ca. 35-50 mg zeolites were loaded into an alumina sample pan. The loaded sample was activated at 600° C. for 20 h with a 70 mL/min He flow. After the temperature was cooled to 30° C., the gas was switched to a 70 mL/min 400 ppm CO$_2$/He flow. Desorption was performed with a ramp rate of 10° C./min to 600° C. with a 70 mL/min He flow. The weight of the sample was recorded as a function of time on stream.

Isosteric heat of adsorption. The isotherms measured at different temperatures were first fitted using the Langmuir-Freundlich (LF) isotherm model:

$$q = \frac{a*b*p^n}{1+b*p^n} \quad (1)$$

where "a" is the saturation uptake (mmol/g), "b" is the corresponding adsorption equilibrium constant showing the affinity coefficient, "n" is the deviation from the ideal homogeneous surface, "p" is the equilibrium pressure.

The heat of adsorption was calculated from the Clausius-Clapeyron equation:

$$\ln \frac{p_2}{p_1} = -\frac{\Delta H}{R}\left(\frac{1}{T_2} - \frac{1}{T_1}\right) \quad (2)$$

where "p" is the pressure (bar), "ΔH" is the changing in enthalpy (kJ/mol), "R" is the universal gas constant (8.314 J/K/mol), and "T" is the temperature (K). The function can be simplified to:

$$\ln p = -\frac{\Delta H}{R}\left(\frac{1}{T}\right) + c \quad (3)$$

for the calculation of ΔH (isosteric heat of adsorption).

Results

MOR-type zeolites for capture of low concentration CO$_2$. The MOR-type zeolite framework (FIG. 1a) possesses unidirectional 12-membered ring (12-MR, 7.0×6.5 Å$^2$) channels. The smaller 8-MR channels with elliptical openings (5.7×2.6 Å$^2$) run in parallel and are interconnected to the 12-MR to create a side-pocket with 8-MR windows (4.8×3.4 Å$^2$). Shown below, the side-pocket of MOR-type zeolites can provide sites that are able to capture low concentrations of CO$_2$.

Figure 5:
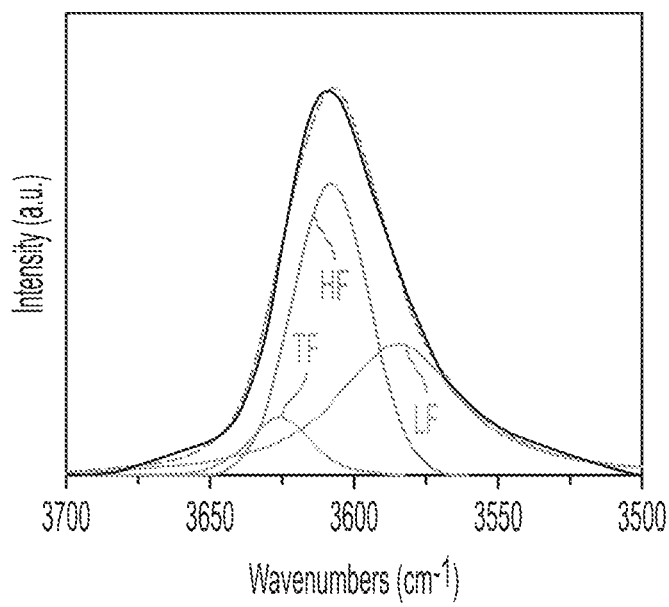
FIG. 5 shows a schematic of the deconvolution of the OH stretching region of MOR-type zeolites. The spectra were deconvoluted using a Voigt function, with contributions from Gaussian and Lorentz functions.
Figure 6:
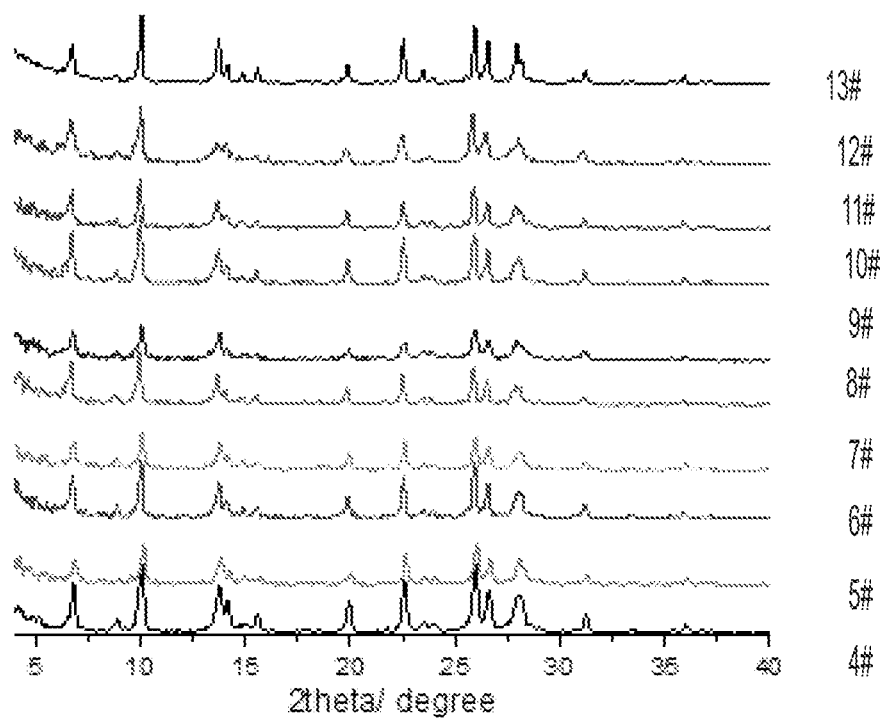
FIG. 6 shows an X-ray diffraction patterns of the MOR-type zeolites synthesized (5 #-13 #) with the pattern from the commercial zeolite (4 #, CBV10A) as the reference. Sample codes are listed in Table S1.
Figure 7:
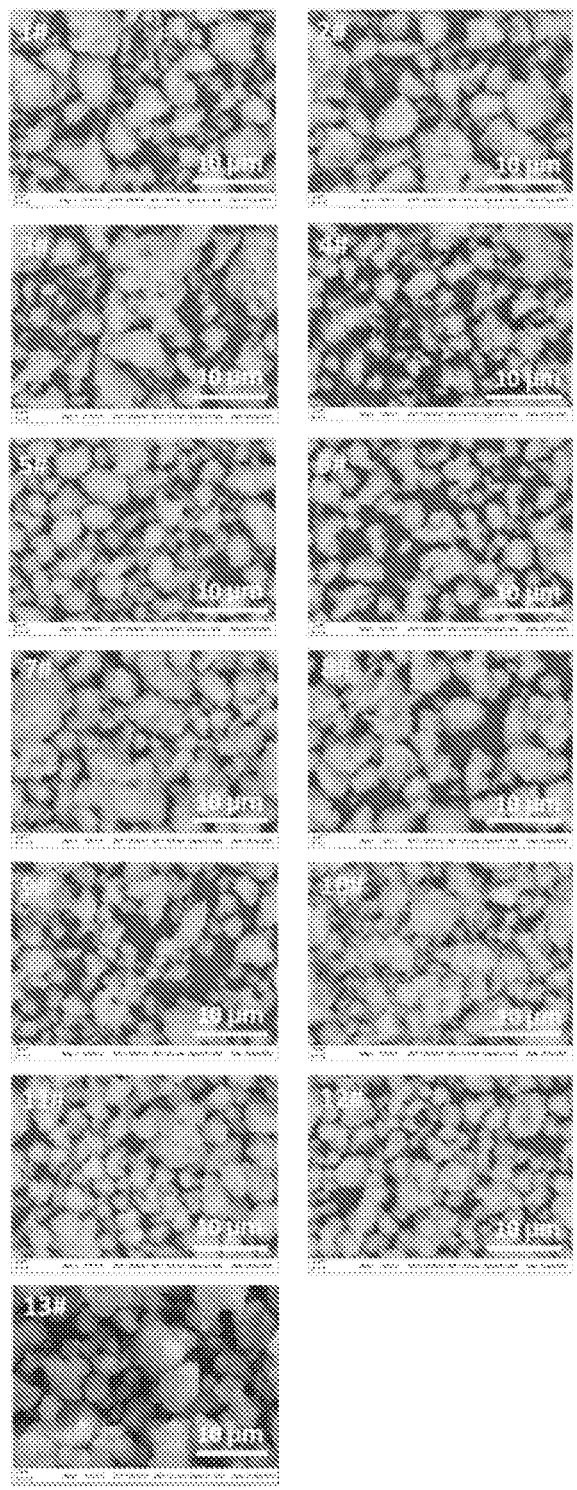
FIG. 7 shows SEM images of commercial MOR-type zeolites (1-4 #) and the samples synthesized with organic directing agents (5-13 #). Sample codes are listed in Table S1.

Na$^+$ cations are active sites for the adsorption of CO$_2$ in zeolites, and their distributions in the two channels of the MOR framework locations can be determined by deconvoluting the OH stretching region of the Fourier transform infrared spectra (FTIR, FIG. 5). F. Jiao, et al., Shape-selective zeolites promote ethylene formation from syngas via a ketene intermediate. *Angew. Chem. Int. Ed.* 57, 4692-4696 (2018). A series of MOR-type zeolites with 49-67% of the total $Na^+$ cations located in the 8-MR side-pockets (Table S1) was prepared from commercially available samples and those that were synthesized (FIGS. 6 and 7

TABLE S1

Physicochemical properties of MOR-type zeolite samples.

| Sample code | Sample source | Adsorbent | Si/Al ratio[a] | Na/Al |
|---|---|---|---|---|
| 1 | Commercial | Na-HSZ620 | 7.36 | 0.93 |
| 2 | | Na-HSZ640 | 9.19 | 0.67 |
| 3 | | Na-HSZ660 | 12.79 | 0.83 |
| 4 | | CBV10A | 5.81 | 1.03 |
| 5 | OSDA-directed synthesis | | 5.30 | 0.91 |
| 6 | | | 5.67 | 0.95 |
| 7 | | | 5.04 | 0.89 |
| 8 | | | 5.35 | 0.86 |
| 9 | | | 5.37 | 0.83 |
| 10 | | | 5.51 | 0.82 |
| 11 | | | 5.10 | 0.81 |
| 12 | | | 5.72 | 0.90 |
| 13 | | | 4.89 | 0.98 |
| 14 | OSDA-free synthesis | | 4.38 | 0.75 |
| 15 | | | 9.46 | 1.03 |
| 16 | | | 13.47 | 0.94 |

[a]Elemental analysis was performed using EDS.

Figure 8:
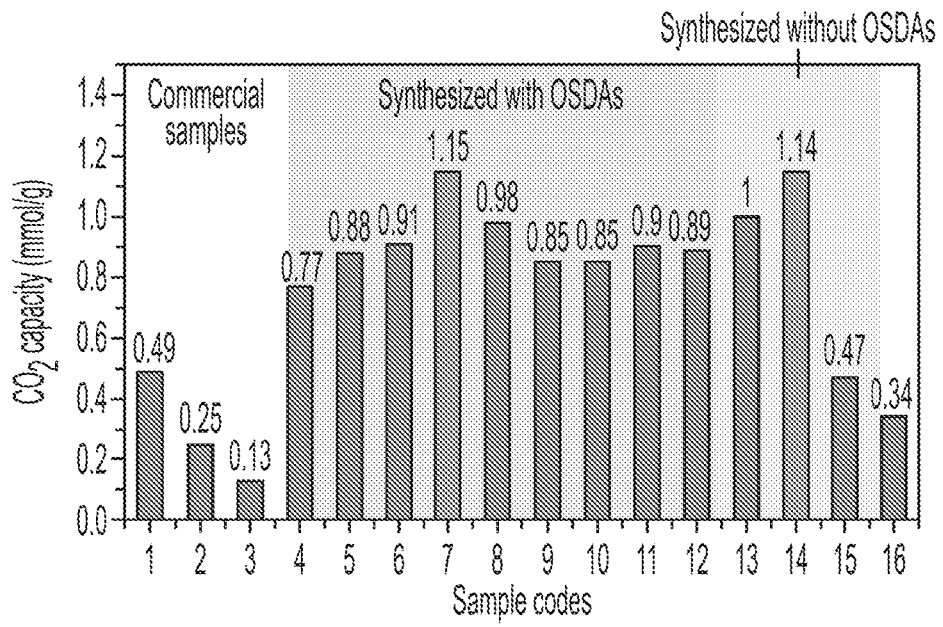
FIG. 8 Bar graphs comparison of the capacity for 400 ppm $CO_2$ over MOR-type zeolites, including commercial samples, zeolites synthesized with and without organic-structure directing agents (OSDAs). The data are obtained from 0.0004 bar from isotherms measured up to 1 bar at 25° C. Sample codes are listed in Table S1.
Figure 9:
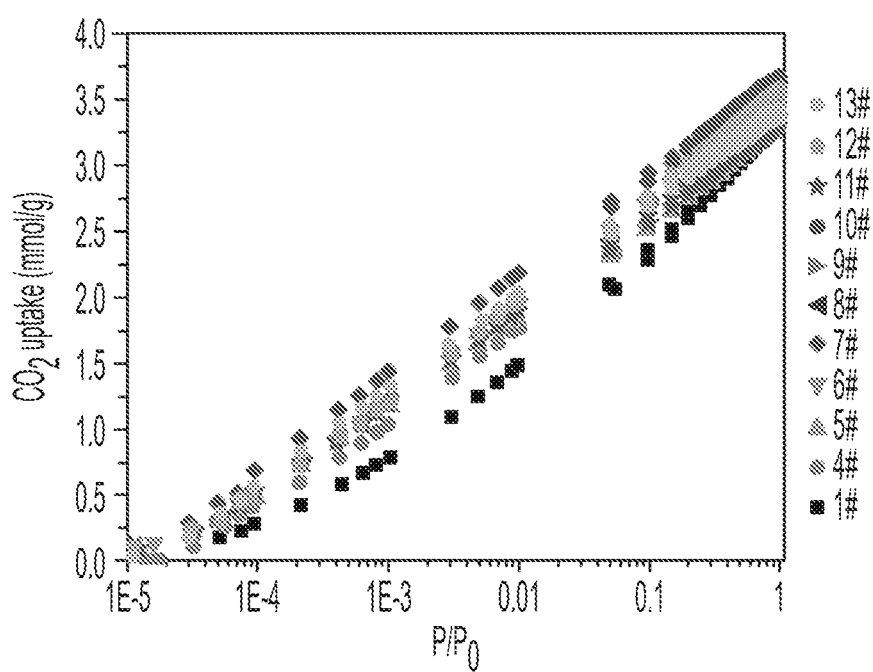
FIG. 9 shows $CO_2$ adsorption isotherms up to 1 bar at 25° C. for MOR-type zeolites synthesized with different organic structure-directing agents (5 #-13 #) as well as commercial zeolites, i.e., HSZ620 (1 #) and CBV10A (4 #). Sample codes are listed in Table S1.
Figure 10:
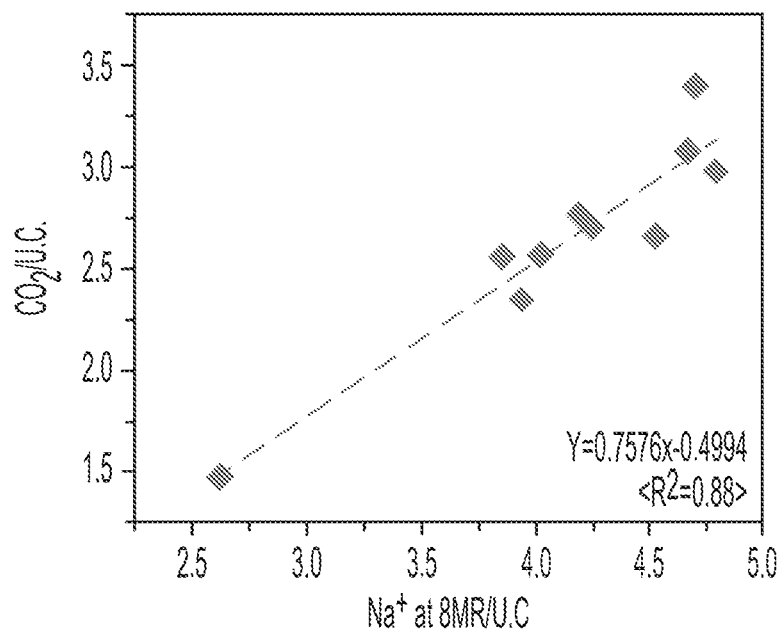
FIG. 10 shows the correlation of $Na^+$ at the 8-MR side-pocket of MOR-type zeolites (Si/Al=5-7) synthesized with different OSDAs (5 #-13 #) as well as commercial zeolites, i.e., HSZ620 (1 #) and CBV10A (4 #). Details of the data are summarized in Table S2.

The equilibrium capacities were obtained from $CO_2$ isotherms (FIGS. 8 and 9) measured at 25° C. The $CO_2$ capacity increases with the number of $Na^+$ cations in the 8-MR side-pockets (FIG. 10). The highest $CO_2$ capacity (FIG. 1B, Table S2 and FIG. 8) obtained is 1.15 mmol/g for MOR (7 #) that has a Si/Al ratio of 5, with an improvement in adsorption efficiency (0.48 $CO_2/Na^+$) compared to 13X zeolite (0.06 $CO_2/Na^+$).

TABLE S2

The capacities of MOR-type zeolites for 400 ppm $CO_2$ as well as the number of $Na^+$ cations in the 8MR side-pocket for each MOR unit cell.

| Sample code | $CO_2$ capacity (mmol/g)[a] | $Na^+$ in 8MR side-pocket per unit cell[b] |
|---|---|---|
| 1 | 0.49 | 2.62 |
| 4 | 0.77 | 3.94 |
| 5 | 0.88 | 4.53 |
| 6 | 0.91 | 4.19 |
| 7 | 1.15 | 4.70 |
| 8 | 0.98 | 4.79 |
| 9 | 0.85 | 4.02 |
| 10 | 0.85 | 3.86 |
| 11 | 0.90 | 3.83 |
| 12 | 0.89 | 4.24 |
| 13 | 1.00 | 4.66 |

Note:
[a]The $CO_2$ capacity obtained at 0.0004 bar from the isotherms measured at 30° C.
[b]The number of $Na^+$ cations in the 8MR side-pocket for each MOR unit cell was calculated from the FTIR results in the OH stretching region and the elemental analysis from EDS.

Figure 11:
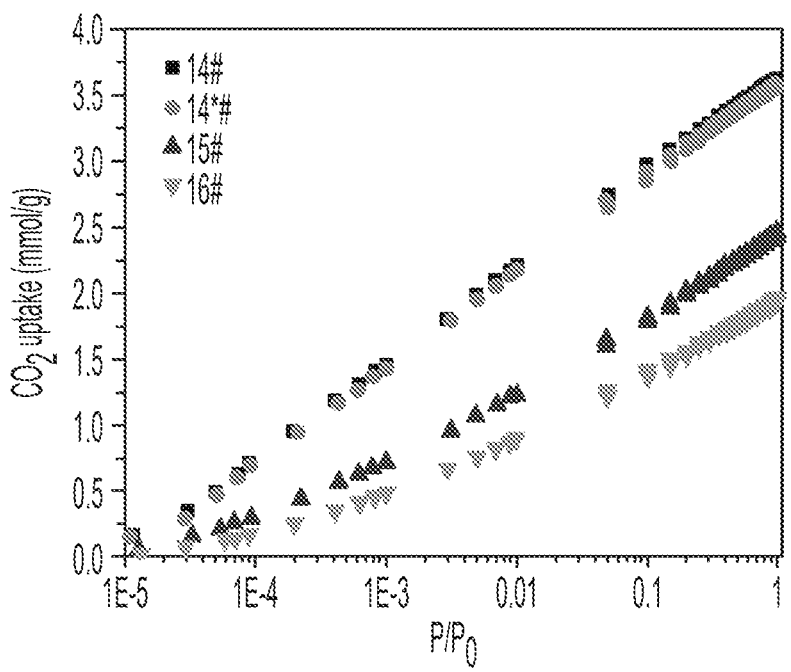
FIG. 11 shows $CO_2$ isotherms of the organic structure-directing agents free MOR-type zeolites measured at 25° C. 14* #is the MOR-type zeolites (14 #) after $Na^+$ ion exchange. The results show that high $CO_2$ adsorption capacity can be obtained directly from the as-prepared MOR-type zeolites without further ion exchange. Moreover, the $CO_2$ adsorption capacity can be adjusted by varying the Al content through OSDA-free synthesis. The OSDA-free MOR-type zeolites (14 #) shows a capacity of 1.14 mmol/g, comparable to that of OSDA-directed material (7 #). This would lead to a cost-efficient, environmentally friendly preparation of MOR-type zeolites with high capacity in large industrial scale, offering opportunities for lowering the cost of the DAC technique.
Figure 12:
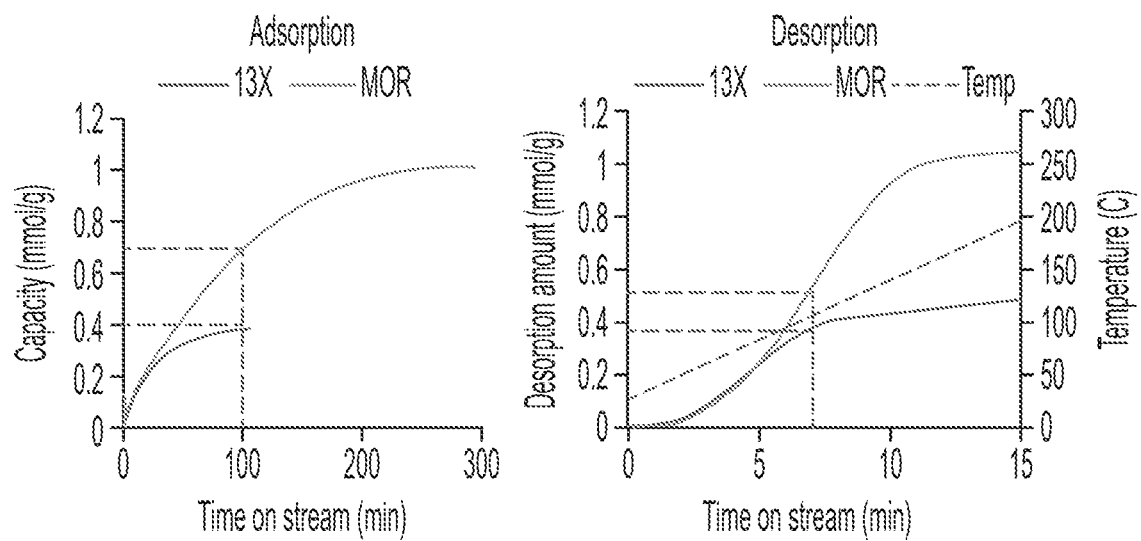
FIG. 12 shows the adsorption and desorption kinetics of MOR-type zeolites (7 #) measured by TGA: a) Uptake profiles during adsorption at 30° C. with a gas flow of 70 mL/min 400 ppm $CO_2$/He. b) Desorption profiles with a gas flow of 70 mL/min pure He with a ramp rate of 10° C./min.
Figure 13:
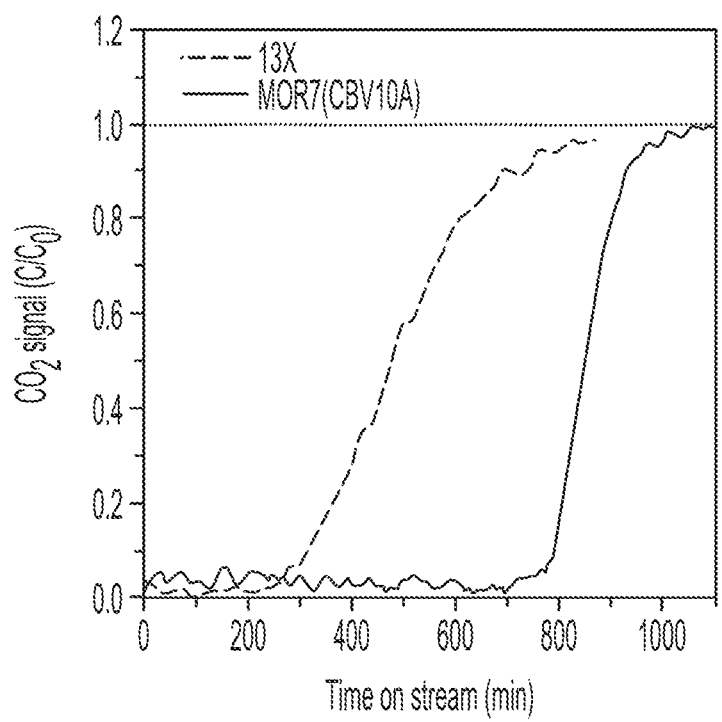
FIG. 13 shows a comparison of adsorption behavior of 13X and MOR-type (4 #) zeolites. Column breakthrough profiles of 13X and MOR7(4 #) zeolites for the adsorption of dry $CO_2$ at 30° C. The composition of the $CO_2$ gas for adsorption under is ca. 400 ppm $CO_2$/400 ppm Ar (internal standard)/He.
Figures 14A, 14B:
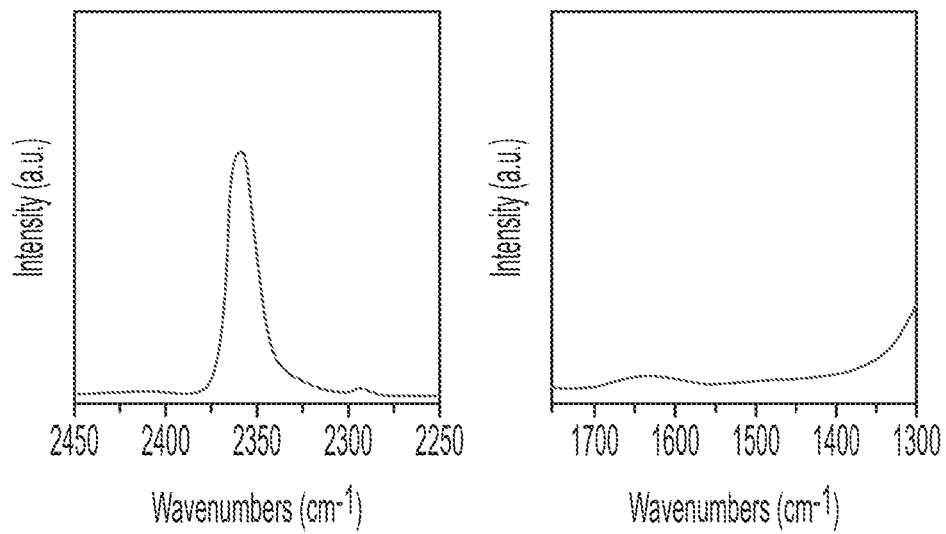
FIGS. 14A-14B show the FTIR spectra of MOR-type (4 #) zeolites. $CO_2$ physisorption (14A) and chemisorption (14B) regions. The results show that $CO_2$ adsorbed in MOR-type zeolites exclusively in the form of physisorption as no apparent absorption peaks were observed in the chemisorption region.
Figure 15:
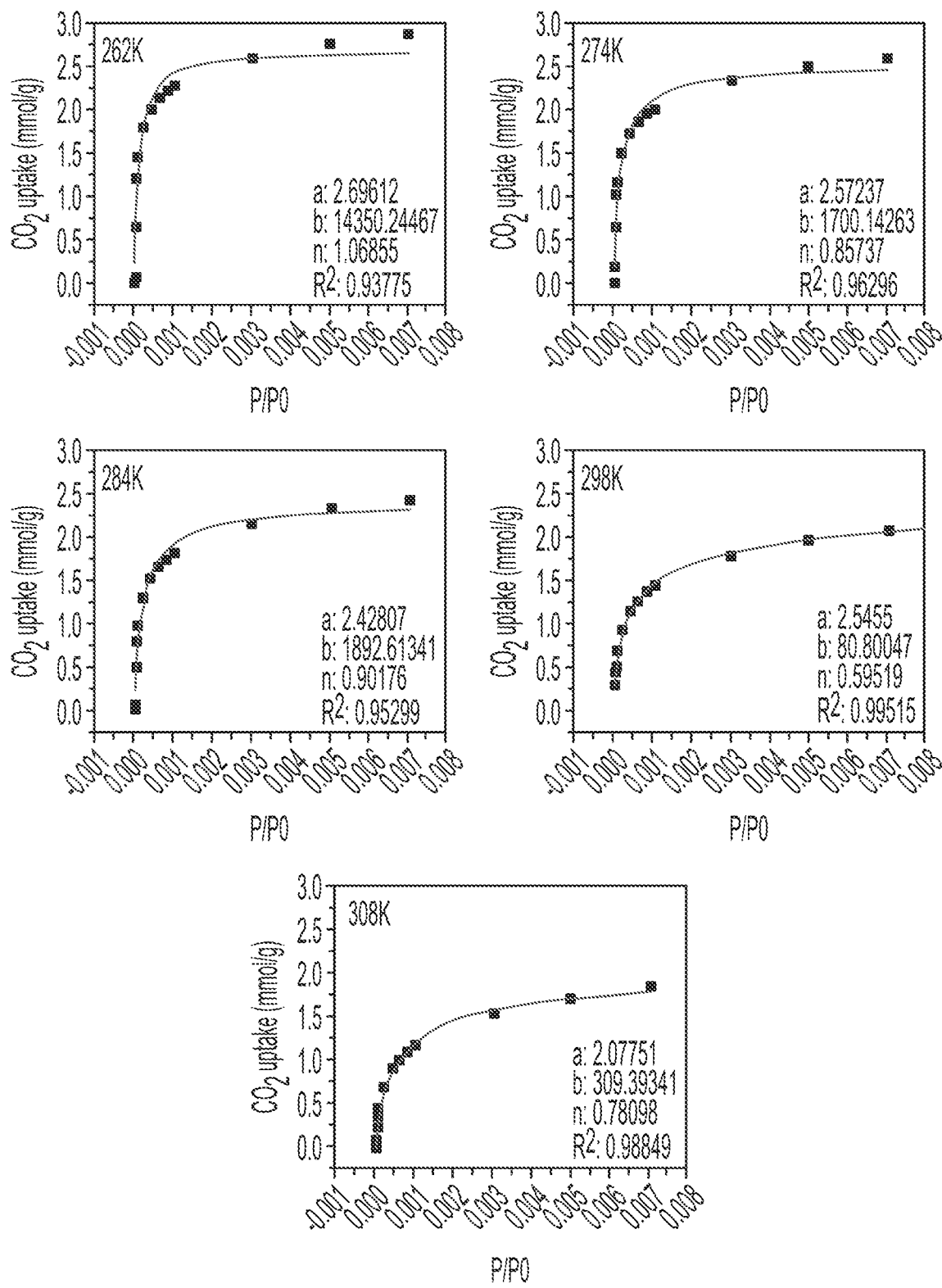
FIG. 15 shows non-linear curve fits for the $CO_2$ sorption of MOR-type zeolite (14 #) at different temperatures in the low-pressure range of 0-0.008 bar.

The capacity of MOR (7 #) is also about 2-fold of the recently developed Zn-CHA adsorbent. D. Fu, Y. Park, M. E. Davis, Zinc containing small-pore zeolites for capture of low concentration carbon dioxide. *Angew. Chem. Int. Ed.* 61, e202112916 (2022). We successfully synthesized an OSDA-free MOR-type zeolite (14 #) with slightly increased Al content (Si/Al=4) that gave a capacity of 1.14 mmol/g (FIG. 1B, and FIGS. 8 and 11), comparable to the value obtained from the OSDA directed material (7 #). The kinetics of $CO_2$ adsorption as monitored by gravimetric measurements (FIG. 12) indicates faster adsorption and desorption kinetics for MOR-type zeolites than those for 13X. Additionally, the sharper breakthrough curve (FIG. 13) observed for MOR-type zeolites compared to that of 13X further confirm the faster kinetics of the former material. FTIR results (FIGS. 14A-14B) demonstrated that $CO_2$ molecules are exclusively physiosorbed in the MOR-type zeolites from 400 ppm $CO_2$. Consistent with the FTIR results, the calculated isosteric heat of adsorption (FIGS. 15 and 12) of the MOR-type (14 #) zeolite is ca. 30 kJ/mol, thus providing a nice compromise between 400 ppm $CO_2$ capture capacity and the required heat for regeneration (FIG. 1C).

Figure 17A:
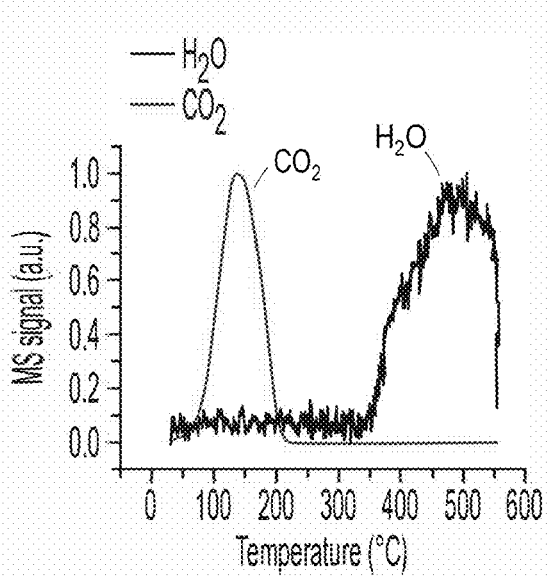
FIGS. 17A-17B show mass spectra profiles from temperature programmed desorption of: 17A) patent and 17B) pyridine modified MOR-type (4 #) zeolites after being saturated with 400 ppm $CO_2$ at 30° C. The gas was 400 ppm $CO_2$/400 ppm Ar (internal standard)/He. The components detected are $CO_2$, $H_2O$ and pyridine. Both materials were activated at 300° C. The data show that the strongly adsorbed pyridine remained in the MOR-type zeolites after activation at 300° C.
Figure 17B:
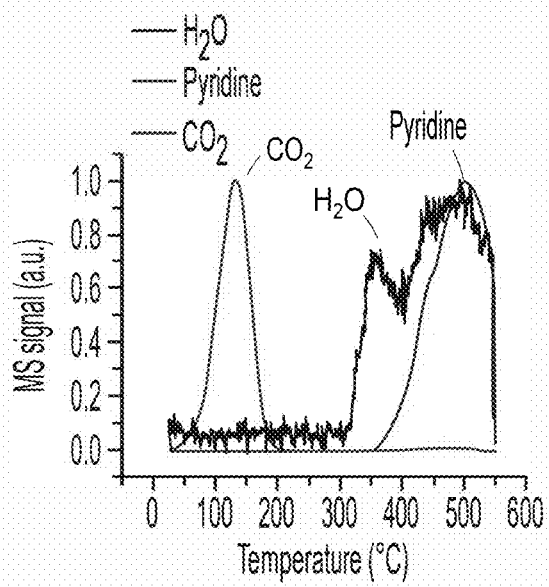
Figure 18:
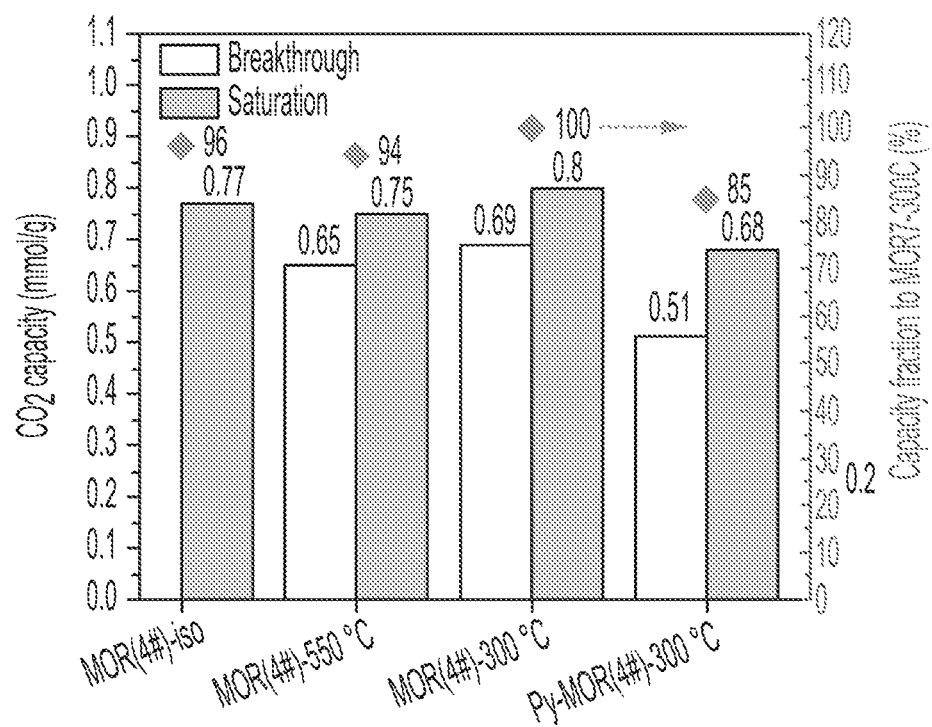
FIG. 18 shows bar graphs of breakthrough and saturation capacities from pyridine adsorbed and parent MOR zeolites after activation at 300° C. The capacities are compared to the values obtained from isotherms at 400 ppm $CO_2$ as well as parent MOR-type (4 #) zeolites activated at 550° C. The results show that ca. 85% of the capacity maintained with pyridine adsorption in the 12-MR main channel of the MOR framework, compared to the parent material. The results suggest that the adsorption sites in the 8-MR side-pocket are responsible for the high capacity of MOR-type zeolites. It should be noted that the slight increase of $CO_2$ uptake of MOR-type zeolites after 300° C. compared to that after 550° C. can be attributed to the trace amount of water in the former. It has been previously shown that the presence of trace amount of water can enhance the $CO_2$ adsorption. (7)
Figure 19:
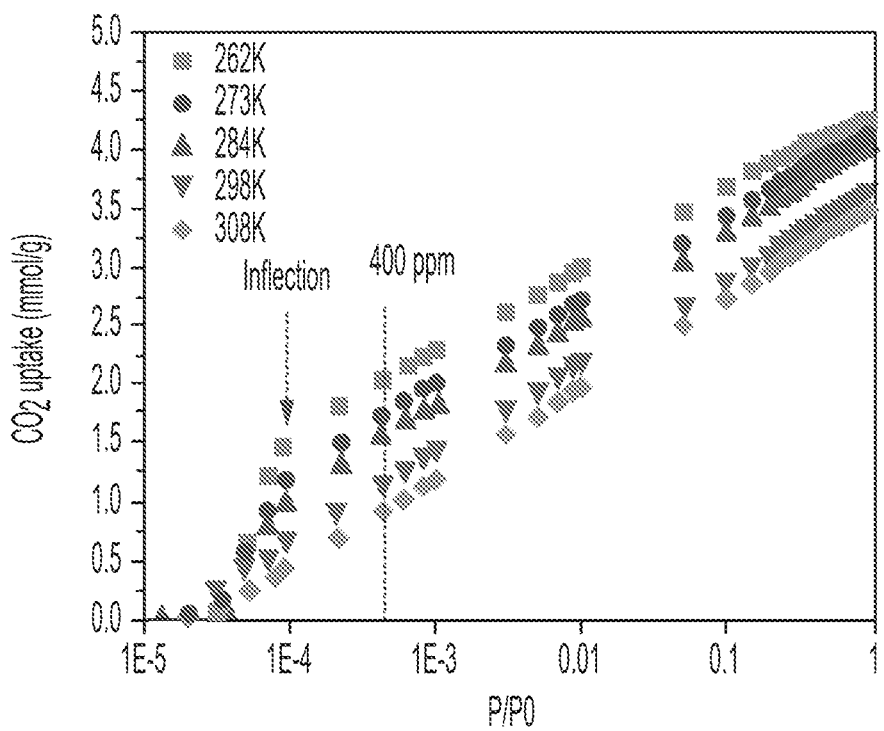
FIG. 19 shows $CO_2$ isotherms up to 1 bar of MOR-type (14 #) measured at different temperatures. The results show that the inflection pressures are independent on the measurement temperatures. Moreover, the $CO_2$ capacity increases with the decrease of temperatures.
Figure 20:
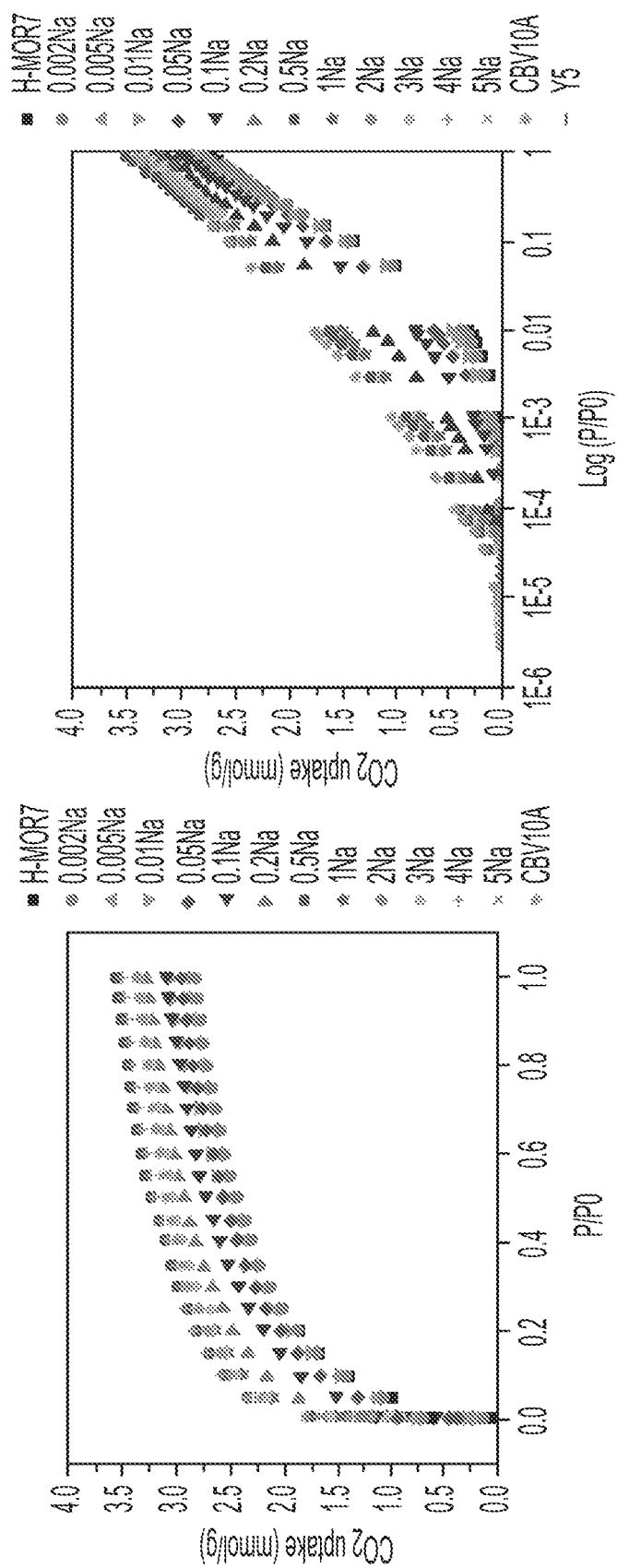
FIG. 20 shows $CO_2$ adsorption isotherms up to 1 bar at 25° C. in linear scale (left) and logarithm scale (right) for the MOR-type (4 #in $NH_4^+$ form) as a function of $Na^+$ loading.
Figure 21:
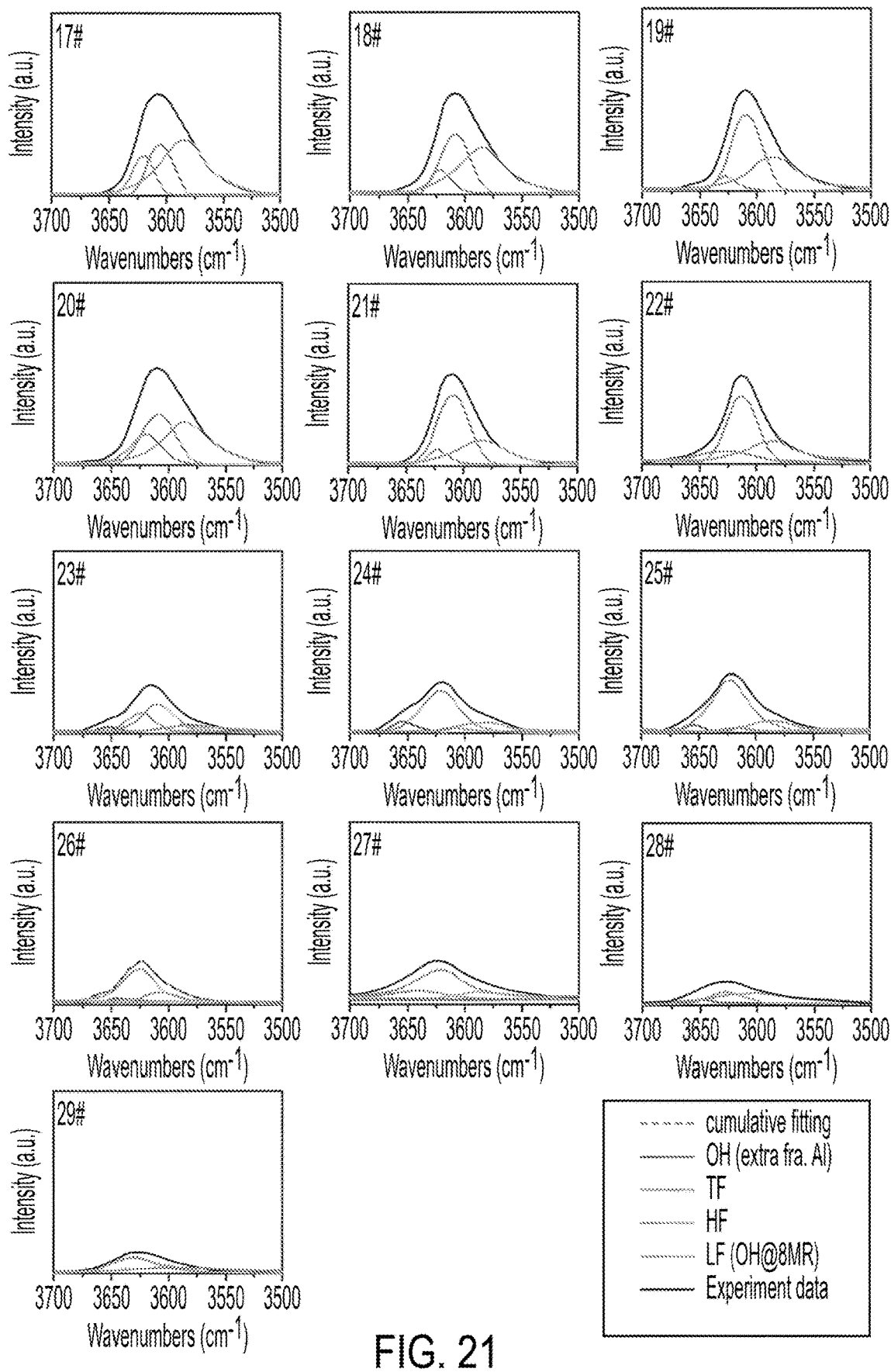
FIG. 21 shows FTIR spectra of the OH stretching region for the MOR-type (4 #in $NH_4^+$ form) samples with various $Na^+$ loading. The spectra were deconvoluted using a Voigt function, with contributions from Gaussian and Lorentz functions. Note that the spectra were not normalized based on weight, thus the area only qualitatively reflect the consumption of BAS with the loading of Na cations.

Adsorption sites in MOR-type zeolites. Studies were performed to identify the active sites responsible for the adsorption of low concentration $CO_2$ in MOR-type zeolites. MOR-type (4 #) zeolites were modified with pyridine, denoted as py-MOR, to selectively block the adsorption sites in the 12-MR channel as well as the intersection between the 12-MR channel and 8-MR side-pocket (FIGS. 17A-17B). The pyridine molecule is too large to enter the 8-MR(39), and it does not show $CO_2$ adsorption under ambient conditions. Interestingly, ca. 85% capacity was obtained for py-MOR-type zeolites compared to the fresh MOR-type zeolites (FIG. 2A, and FIG. 18). These data demonstrate that $CO_2$ molecules in the low concentration range primarily adsorbed in the 8-MR side-pocket of the MOR framework. Isotherms (FIG. 2B) show a 2-step uptake for $CO_2$ in Na-MOR-type zeolites with an inflection at 0.0001 bar, while no apparent change is observed in 13X zeolite. This behavior is likely due to the switch of adsorption cages in the MOR framework. Similar results have been reported for argon (Ar) adsorption in zeolites with multiple accessible cages. Although the structural changes in structure-flexible zeolites can cause 2-step uptake in isotherms, the inflection pressure is highly temperature dependent. The MOR-type zeolite (FIG. 19) shows constant inflection pressure at different temperatures. Furthermore, the ratio of the capacity at 0.0001 bar to that at 0.0004 bar (corresponding to 400 ppm, FIG. 2B) is ca. 80%, comparable to the 85% obtained from pyridine shielding experiments (FIG. 2A). This result is consistent with the interpretation that the inflection is as a result of the switch of adsorption cages. The data when taken together demonstrate that $CO_2$ molecules preferentially adsorb in the 8-MR side-pocket of the MOR framework when the $CO_2$ is in the low-pressure range.

To better understand the structural features and the active adsorption sites that provide the adsorption performance of MOR-type zeolites, a series of Na-MOR-type samples (FIGS. 20-23B, and Tables S3-S4) was prepared with fixed Al composition and $Na^+$/U.C. ranging from 0 to 5.81, where $Na^+$/U.C. denotes the number of $Na^+$ cations per MOR unit cell.

TABLE S3

$CO_2$ adsorption results from the MOR-type (4# in $NH_4^+$ form) zeolites as a function of $Na^+$ loadings.

| Sample code | Samples | Capacity (mmol/g) | | $CO_2$/U.C. |
|---|---|---|---|---|
| | | 400 ppm | 1 bar | |
| 17 | H-MOR7 | 0.02 | 2.92 | 0.06 |
| 18 | 0.002Na | 0.03 | 2.82 | 0.09 |
| 19 | 0.005Na | 0.04 | 2.90 | 0.12 |
| 20 | 0.01Na | 0.05 | 2.89 | 0.15 |
| 21 | 0.05Na | 0.09 | 2.93 | 0.27 |

TABLE S3-continued

CO$_2$ adsorption results from the MOR-type (4# in NH$_4^+$ form) zeolites as a function of Na$^+$ loadings.

| Sample code | Samples | Capacity (mmol/g) 400 ppm | 1 bar | CO$_2$/U.C. |
|---|---|---|---|---|
| 22 | 0.1Na | 0.16 | 3.07 | 0.46 |
| 23 | 0.2Na | 0.33 | 3.26 | 0.97 |
| 24 | 0.5Na | 0.49 | 3.38 | 1.47 |
| 25 | 1Na | 0.62 | 3.36 | 1.84 |
| 26 | 2Na | 0.60 | 3.33 | 1.81 |

Figure 24:
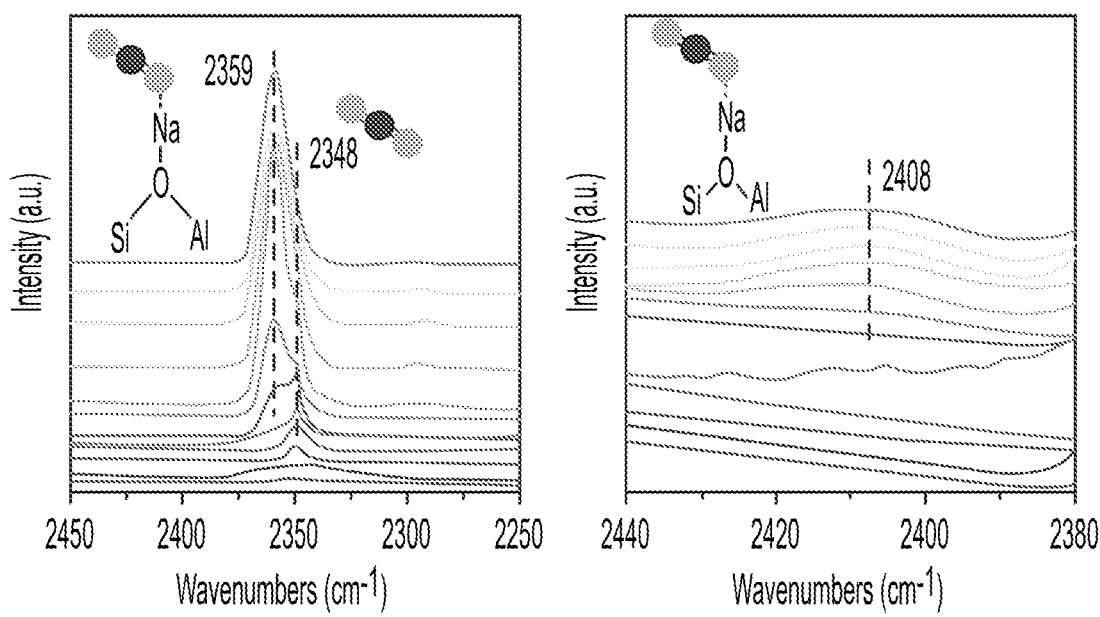
FIG. 24 shows FTIR spectra of the asymmetric stretching of $CO_2$ for the MOR-type (4 #in $NH_4^+$ form) samples with various $Na^+$ loading. Right panel shows the zoom in spectra of the 2380-2440 cm-1 region in those in the left panel. The bands at 2348, 2359, and the band between 2400-2430 $cm^{-1}$ indicates the gas phase, the C—O stretching and Na—O stretching of linearly adsorbed $CO_2$ molecules, respectively.

As shown in FIG. 2C, three stages are observed. CO$_2$ capacity slightly increases before a sharp increase occurs starting at ca. 1.0 Na$^+$/U.C., followed by a constant value from 4.8 Na$^+$/U.C. Generally, monovalent Na species is the only form of cation for Na$^+$ exchanged zeolites. Therefore, the distinct stages observed in these samples result from the microenvironment of the Na$^+$ cations, i.e., dependent on their positions in the MOR-type framework. FTIR spectra (FIG. 24 and Table S5) were recorded to track the adsorption state of CO$_2$ as a function of Na$^+$ loadings. Only gas phase CO$_2$ with vibrations at 2348 cm$^{-1}$ was found for stage I, consistent with the observed low capacity.

TABLE S5

Assignments of IR Bands of CO$_2$ in Na-form zeolites.

| Wavenumbers/cm$^{-1}$ | Vibration Mode | Physical Meaning | ref |
|---|---|---|---|
| 656 | $v_2$ | Deformation mode | (9) |
| 1382 | $v_1$ | Symmetric stretching | (9) |
| 1365 and 1700 pair | | Carbonate-like | (10) |
| 1425 and 1485 pair | | Carbonate-like | (10) |
| 2290 | $v_3$ of $^{13}CO_2$ | Asymmetric stretching of isotope $^{13}CO_2$ | (11) |
| 2349 | $v_3$ | Asymmetric stretching of gas phase CO$_2$ in zeolites | (10) |
| 2350-2360 | $v_3$ | Asymmetric stretching of linearly adsorbed, end on form of CO$_2$ | (9, 10, 12) |
| 2360-2370 | Unssigned | | (10) |
| 2422 | $v_2 + v_{lib}$ | Asymmetric stretching with hindered rotation mode; $v_{lib}$ is from the Na—O intermolecular stretching | (13) |
| 3598-3725 | $v_3 + v_1$ and $v_3 + 2v_2$ | | (10) |

TABLE S3-continued

CO$_2$ adsorption results from the MOR-type (4# in NH$_4^+$ form) zeolites as a function of Na$^+$ loadings.

| Sample code | Samples | Capacity (mmol/g) 400 ppm | 1 bar | CO$_2$/U.C. |
|---|---|---|---|---|
| 27 | 3Na | 0.65 | 3.30 | 1.98 |
| 28 | 4Na | 0.68 | 3.48 | 2.20 |
| 29 | 5Na | 0.75 | 3.30 | 2.26 |

TABLE S4

Proton densities and Na$^+$ distributions in the MOR-type (4# in NH$_4^+$ form) zeolites as a function of Na$^+$ loadings.

| Sample code | Proton density[a] | Na/U.C.[b] | Na @ 8MR[c] | Na @ 12 MR[c] |
|---|---|---|---|---|
| 17 | 5.82 | 0.00 | 0.00 | 0.00 |
| 18 | 5.64 | 0.18 | 0.17 | 0.01 |
| 19 | 5.21 | 0.60 | 0.55 | 0.05 |
| 20 | 4.94 | 0.87 | 0.84 | 0.03 |
| 21 | 4.30 | 1.50 | 1.47 | 0.03 |
| 22 | 3.91 | 1.89 | 1.72 | 0.18 |
| 23 | 3.30 | 2.50 | 2.18 | 0.32 |
| 24 | 1.97 | 3.83 | 2.43 | 1.40 |
| 25 | 1.76 | 4.04 | 2.66 | 1.37 |
| 26 | 1.24 | 4.56 | 3.04 | 1.52 |
| 27 | 1.18 | 4.62 | 2.99 | 1.62 |
| 28 | 1.00 | 4.80 | 2.97 | 1.83 |
| 29 | 0.88 | 4.92 | 3.16 | 1.76 |

Note:
[a] The values were obtained from 1H NMR.
[b] The values were calculated based on the proton density from 1H NMR.
[c] The values were calculated based on the proton density from 1H NMR and the deconvolution of FTIR spectra of corresponding samples.

Figure 25:
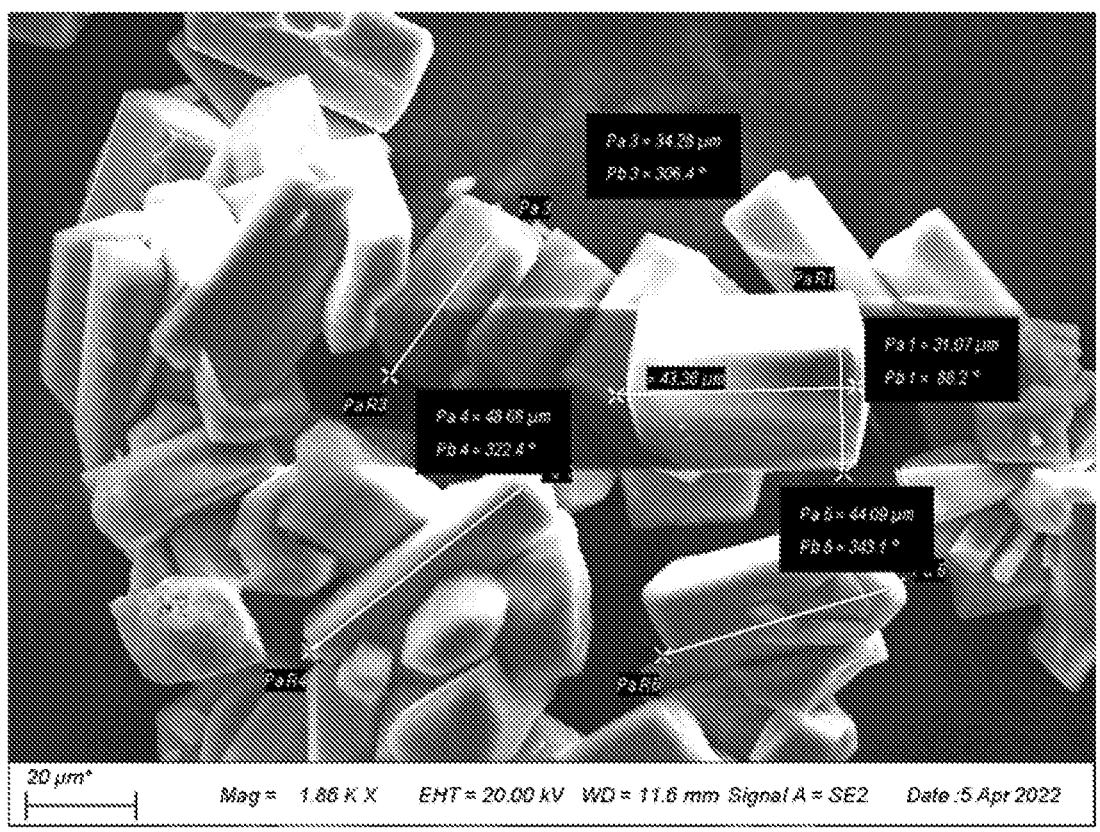
FIG. 25 shows scanning electron microscopic image of large crystals for single-crystal X-ray diffraction measurements. The sizes of the crystals are 30-40 μm.
Figure 26B:
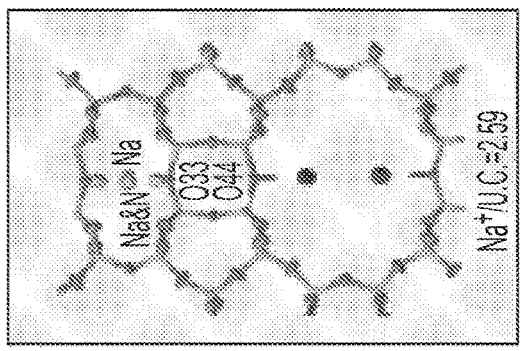
FIGS. 26A-26E show visualization of the sittings of $Na^+$ cations in Na-MOR-type zeolites as a function of $Na^+$ loadings. 26A) Four distinct sites, namely O33, O31, O44, O42, were found for balancing extraframework cations in the MOR-type framework. Oxy represents the oxygen atom connected to Tx and Ty sites. The extraframework cations balancing O33 and O31 sites are located at the 8-MR side-pocket. Those balancing the O44 site point to the 8-MR side-pocket. Those balancing the O42 site point to the 12-MR channel. Na&N represents the site partially exchanged by $Na^+$ and containing both $Na^+$ and $NH_4^+$ cations. 26B-26E) Results from samples (26A-26D) highlighted in FIG. 2C, respectively. Panel 26B) shows that sample 26A had $Na^+$ cations in the 8-MR side-pocket coordinated to the O atom (denoted as O31) from T1 site.
Figure 26C:
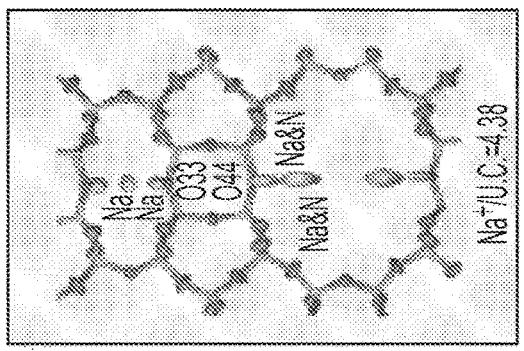
Figure 26D:
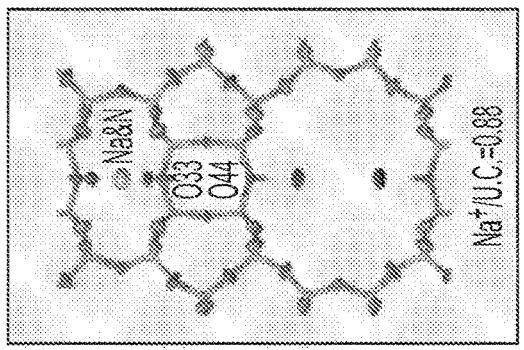
Figure 26E:
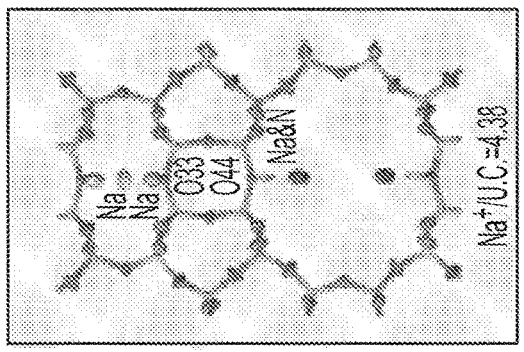
Figure 26A:
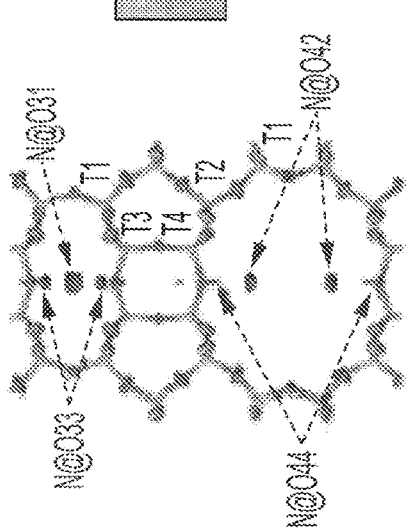

With an increase of Na$^+$ density, a shoulder at 2359 cm$^{-1}$ evolved on the right side of the gas phase vibration, suggesting that CO$_2$ molecules physiosorbed linearly. Importantly, in the second stage, an extra band attributed to the Na—O vibration was observed between 2400-2430 cm$^{-1}$, indicating the strong/close interaction between the extraframework Na$^+$ cation and the O atom of CO$_2$ molecules. B. Bonelli, B. Onida, B. Fubini, C. O. Arean, E. Garrone, Vibrational and thermodynamic study of the adsorption of carbon dioxide on the zeolite Na-ZSM-5. *Langmuir* 16, 4976-4983 (2000). Single-crystal XRD analysis was performed to locate the Na$^+$ in the MOR-type framework as a function of Na$^+$ loading. Representative samples with Na$^+$ densities of 0.88, 2.59, 4.38 and 5.96 Na$^+$/U.C. were evaluated (FIG. 25 and Table S6), corresponding to the samples highlighted as A, B, C and D in FIG. 2C.

TABLE S6

Compositions of MOR-type zeolite large crystals for single-crystal X-ray diffraction measurements.

| Sample code | Si/Al ratio | Na/Al | Al$^{3+}$/U.C. | Na$^+$/U.C. |
|---|---|---|---|---|
| 30 | 5.51 | 0.12 | 7.37 | 0.88 |
| 31 | 5.48 | 0.35 | 7.41 | 2.59 |
| 32 | 5.47 | 0.59 | 7.42 | 4.38 |
| 33 | 5.52 | 0.81 | 7.36 | 5.96 |

Note:
The compositions were measured using EDS.

The structure was solved using an orthorhombic Cmcm space group with lattice parameters of a typical MOR unit cell: a) 18.094 Å, b) 20.516 Å, and c) 7.524 Å. The refinement gave a chemical formula of Na$_x$Si40.6Al7.4O96, where x denotes the number of Na$^+$ cations detected per MOR unit cell. The results (FIG. 2D, FIGS. 26A-26E and Tables S7-S10) show that Na$^+$ preferentially sits in the 8-MR side-pocket followed by the 12-MR main channels.

TABLE S7

Single crystal X-ray structure data and refinement conditions for MOR (30#).

| Oxygen position | Na number | Occupancy (%) |
|---|---|---|
| O31 | 0.88 | 44 |
| O33 | | |
| O44 | | |
| O42 | | |

TABLE S8

Single crystal X-ray structure data and refinement conditions for MOR (31#).

| Oxygen position | Na number | Occupancy (%) |
|---|---|---|
| O31 | 1.39 | 70 |
| O32 | 1.22 | 61 |
| O44 | | |
| O42 | | |

TABLE S9

Single crystal X-ray structure data and refinement conditions for MOR (32#).

| Oxygen position | Na number | Occupancy (%) |
|---|---|---|
| O31 | 2 | 100 |
| O33 | 2 | 100 |
| O44 | 0.4 | |
| O42 | | |

TABLE S10

Single crystal X-ray structure data and refinement conditions for MOR (33#).

| Oxygen position | Na number | Occupancy (%) |
|---|---|---|
| O31 | 2.01 | 100 |
| O33 | 2.01 | 100 |
| O44 | 0.75 | N.A. |
| O42 | 1.12 | N.A. |

Figure 22:
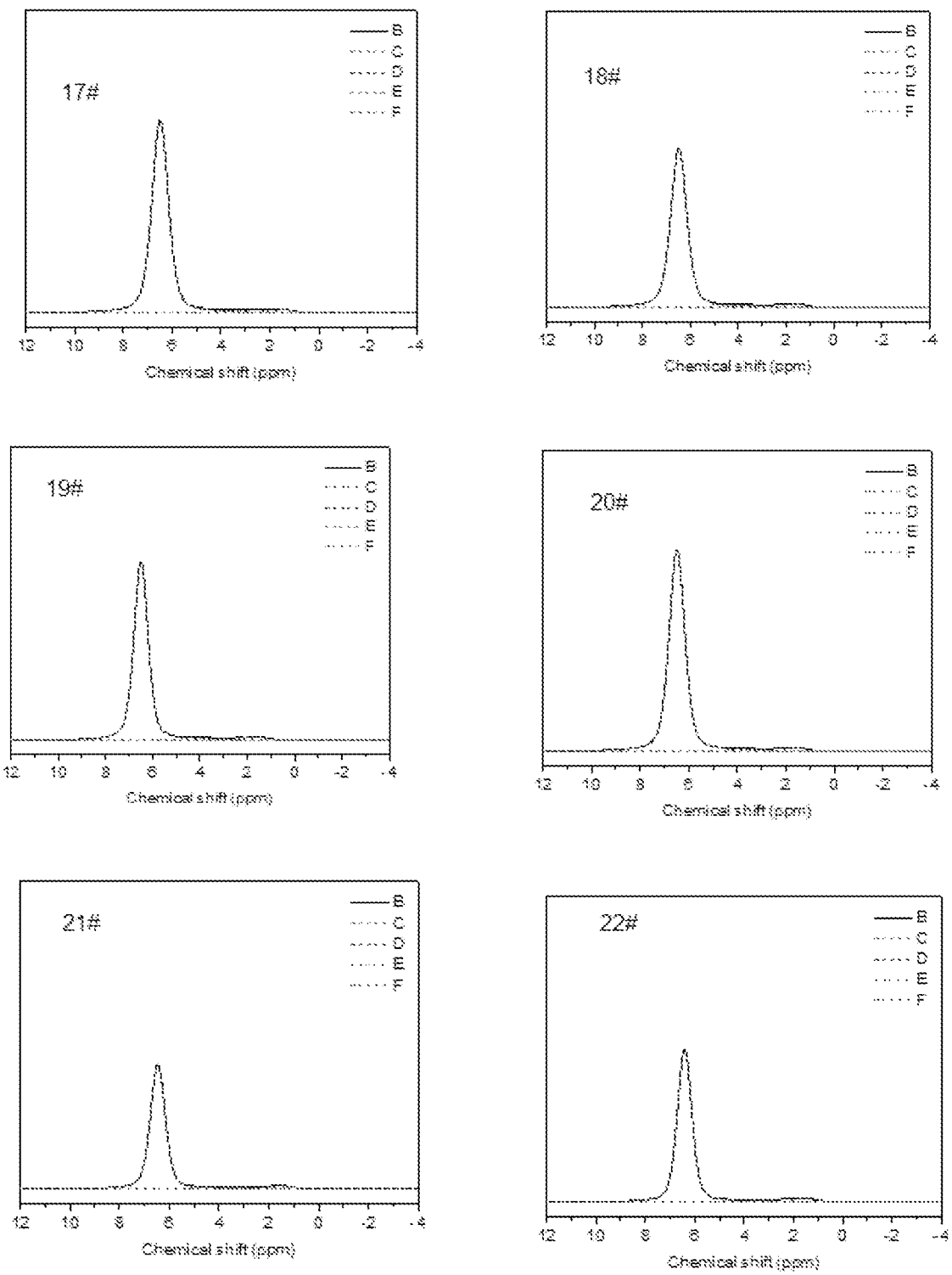
FIG. 22 show $^1H$ NMR spectra of the MOR-type (4 #in $NH_4^+$ form) samples with various $Na^+$ loading. The spectra were deconvoluted using a Voigt function, with contributions from Gaussian and Lorentz functions.
Figure 22:
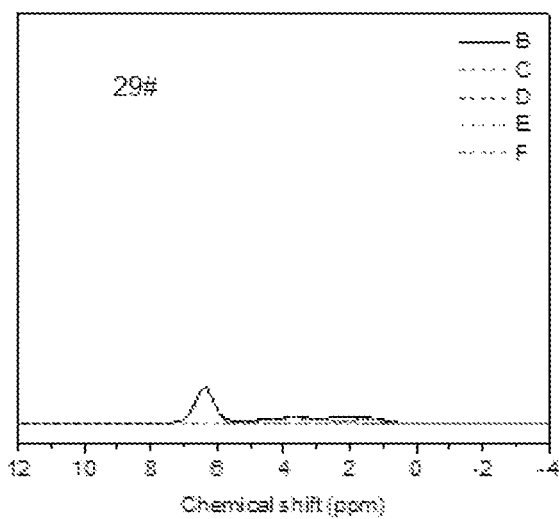
Figure 23:
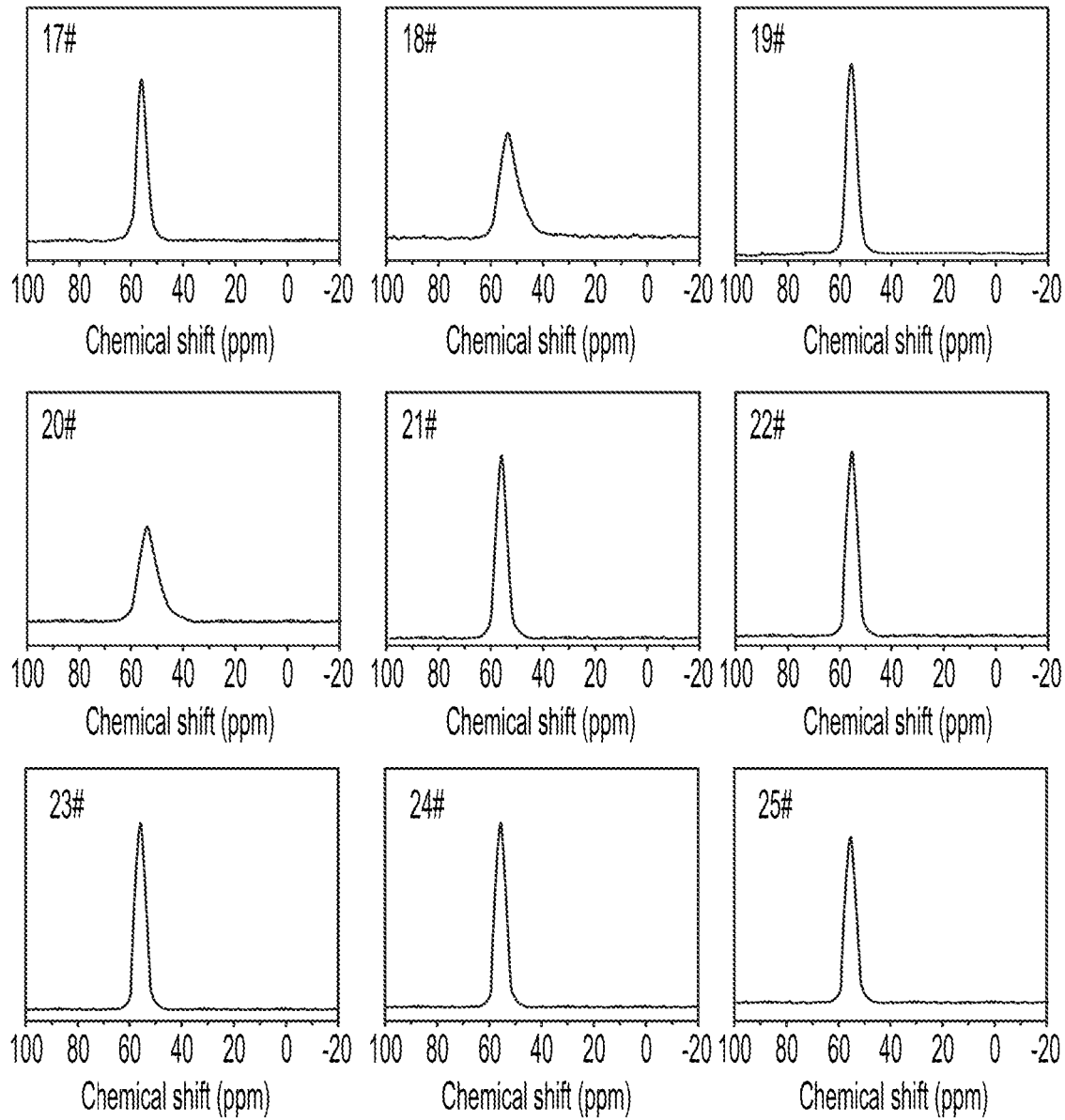
FIG. 23 show $^{27}Al$ NMR spectra of the MOR-type (4 #in $NH_4^+$ form) with various $Na^+$ loading. The results show that all materials were free of extraframework $Al^{3+}$, although small OH stretching bands attributed to extraframework $Al^{3+}$ were observed for some samples from FTIR (FIG. 21).
Figure 23:
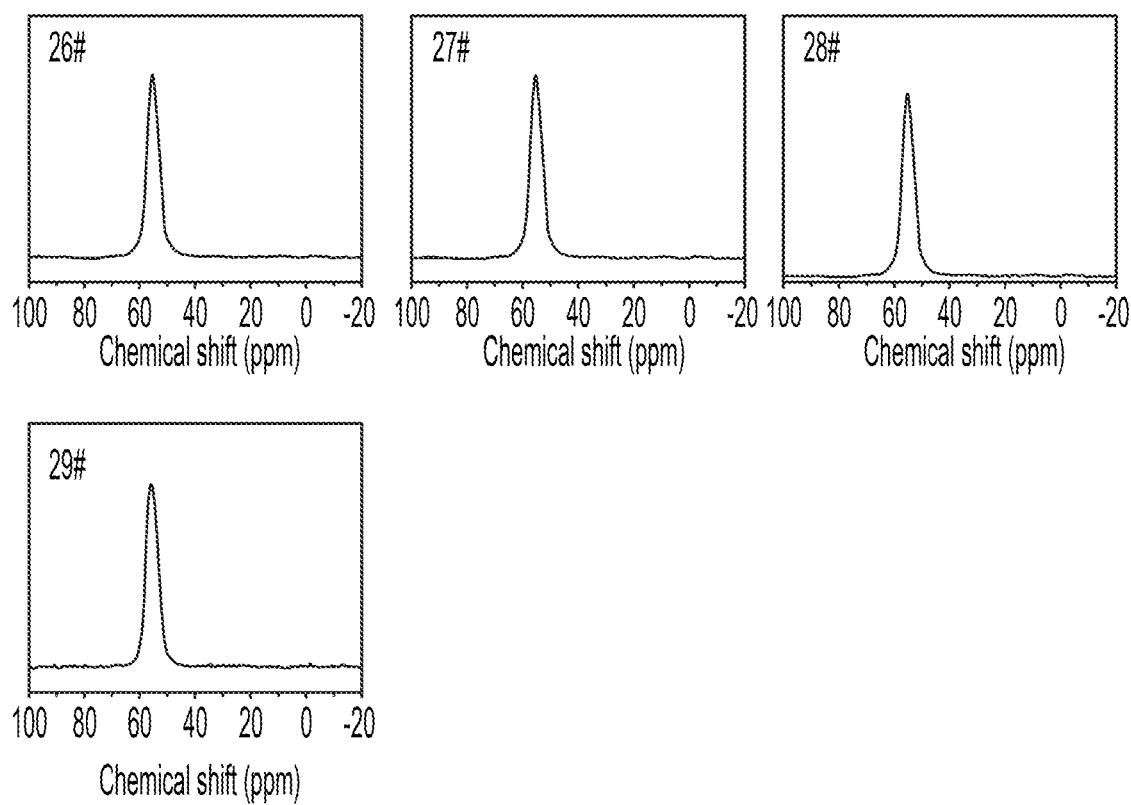

Specifically, the O atom site in the 8-MR side-pocket connecting to T1 is the only position occupied at stage I (sample A), while Na$^+$ cations started siting in the O33 site connecting to T4 at stage II with 61% occupancy observed for sample B. As the CO$_2$ capacity sharply increases at stage II, it can be concluded that O33 site is responsible for the adsorption of low concentration CO$_2$. Similarly, Corma et al. demonstrated that the O33 site is active for the selective carbonylation of DME as it stabilizes the adsorbed methoxy species. M. Boronat, C. Martinez-Sanchez, D. Law, A. Corma, Enzyme-like Specificity in Zeolites: A unique site position in mordenite for selective carbonylation of methanol and dimethyl ether with CO. *J. Am. Chem. Soc.* 130, 16316-16323 (2008). Interestingly, the CO$_2$ capacity continues to increase after the O33 site is fully occupied, as shown in sample C. The material possessed partial occupancy of the O44 site connecting to T4 that is located in the intersection of 8-MR side-pocket and 12-MR channel. These data suggest that the O44 site also contributes to the adsorption of low concentration CO$_2$, corroborating the results from py-MOR (FIG. 2A) and CO$_2$ isotherms (FIG. 2B). However, adding Na$^+$ cations that are balanced to the O atom site in the 12-MR channel did not lead to an apparent increase of capacity, as shown from the data (FIGS. 2C and 2D of sample D at stage III. Furthermore, quantitative analysis of the location and number of Na+ in the MOR-type zeolites has been performed using IR spectroscopy and $^1$H NMR spectroscopy (FIG. 22-23, and Table S4). Correlation of the numbers of Na$^+$ at O33 site and CO$_2$/U.C. gives a linear relation (FIG. 2D) at stage II. Therefore, these results demonstrate that the presence of confined site O33 in the 8-MR side-pocket in the MOR framework is the primary site for CO$_2$ adsorption from low concentrations, with the intersection site contributing to ca. 20% of the capacity.

Confinement effects facilitate low concentration CO$_2$ adsorption. Zeolites with different topologies were investigated to determine the relationship between the size of the zeolite pores space and the adsorption behavior for capturing low concentration CO$_2$ (FIGS. 3A-3D, Table S11-S12 and FIGS. 27-26A-26E).

TABLE S11

Physicochemical properties of the zeolite samples.

| Adsorbent | Framework | Si/Al ratio$^a$ | Na/Al$^a$ | Micropore volume (cm$^3$/g) |
|---|---|---|---|---|
| 34 | FAU | 1.22 | 0.82 | 0.28 |
| 35 | LTL | 2.79 | 0.84 | 0.17 |
| 36 | MAZ | 3.15 | 0.78 | 0.05 |
| 37 | BEA | 4.31 | 0.93 | 0.21 |
| 4 | MOR | 5.81 | 1.03 | 0.17 |
| 38 | FER | 10 | 0.98 | — |
| 39 | MFI | 9.84 | 1.00 | 0.14 |
| 40 | MEL | 15.49 | 0.98 | 0.12 |

$^a$Elemental analysis was performed using EDS.

TABLE S12

Capacity of zeolites with different framework topologies as measured by isotherms at 25° C.

| Sample code | Framework | Samples | 400 ppm Capacity (mmol/g) | Ads. Efficiency (CO$_2$/Na$^+$) | 1 bar Capacity (mmol/g) |
|---|---|---|---|---|---|
| 34 | FAU | FAU1 (13X) | 0.41 | 0.06 | 5.64 |
| 35 | LTL | LTL3 | 0.02 | 0.01 | 2.39 |
| 36 | MAZ | MAZ3 (Omega-1) | 0.65 | 0.22 | 4.06 |
| 37 | BEA | BEA5 | 0.23 | 0.08 | 3.13 |
| 4 | MOR | MOR6 | 0.77 | 0.32 | 3.32 |
| 14 | | MOR4 (OSDA free) | 1.13 | 0.49 | 3.57 |
| 38 | FER | FER10 (ZSM-35) | 0.11 | 0.08 | 2.12 |
| 39 | MFI | MFI12 (ZSM-5) | 0.57 | 0.38 | 2.78 |
| 40 | MEL | MEL15 (ZSM-11) | 0.17 | 0.17 | 2.39 |

Figure 3A:
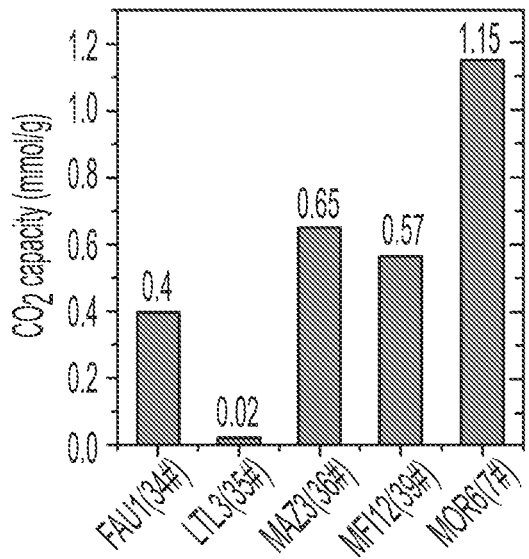
FIGS. 3A-3D The impact of the confinement effect of zeolites on $CO_2$ adsorption. 3A) The capacities for 400 ppm $CO_2$ adsorption with the Na+ form of zeolites with different frameworks. The three-letter framework code followed by the Si/Al ratio of the corresponding material. Sample codes in the brackets are listed in Table S1. 3B $CO_2$ per adsorption site, i.e., $Na^+$, of the zeolite samples for the adsorption of 400 ppm $CO_2$ with increasing the size of the confined space. 3C) Capacity of the zeolite samples for the adsorption of 1 bar ppm $CO_2$ with decreasing the adsorption site density/ aluminum content. 3D) The FTIR spectra for the asymmetric linear vibration of $CO_2$ molecules in zeolites as a function of framework topology. The adsorption capacities were obtained from the isotherms measured at 25° C. The MOR-, MFI- and MAZ-type zeolites are highlighted in panels (3B and 3D).
Figure 3B:
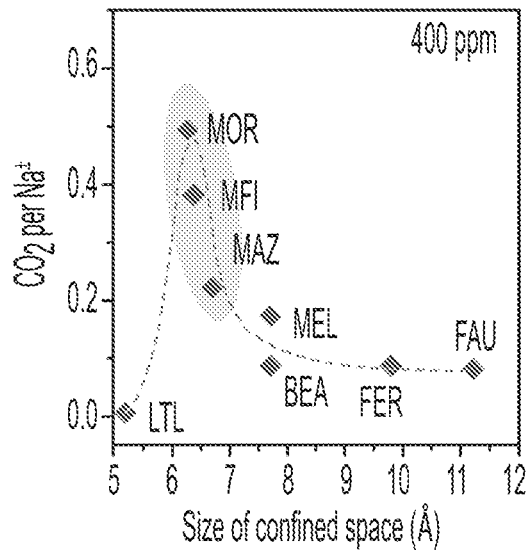
Figure 3C:
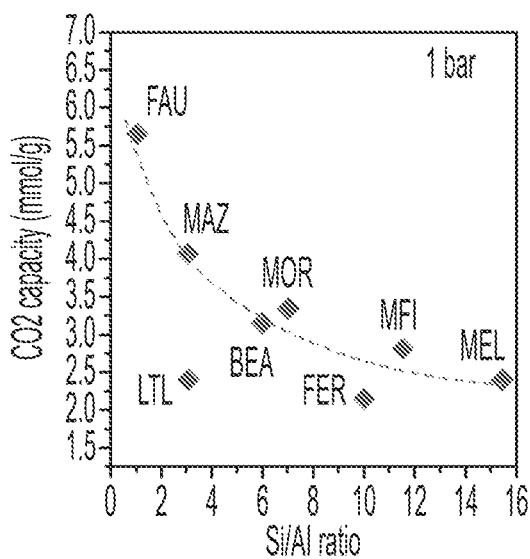
Figure 3D:
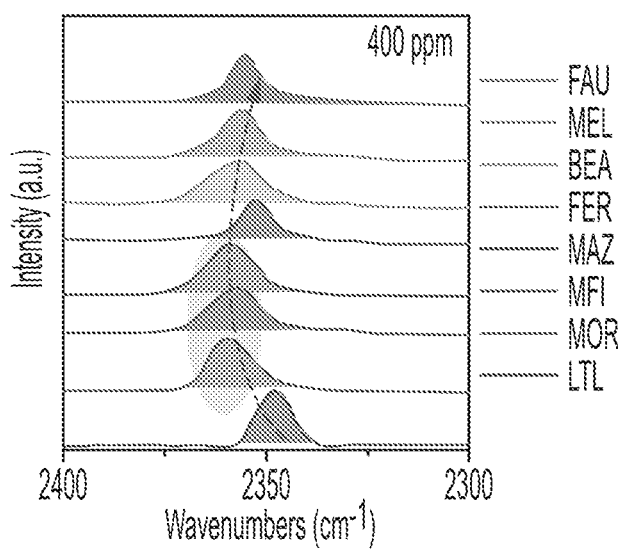

The window of the 8-MR channel in LTL-type zeolite has an elliptical structure of 2.3×5.2 Å$^2$ that is too small to allow CO$_2$ molecules to enter. LTL-type zeolites with a Si/Al of 3 showed almost no uptake for 400 ppm CO$_2$ (FIGS. 3A and 3B). Note that the LTL-type zeolite also has a low capacity at 1 bar CO$_2$ (FIG. 3C). The MAZ-type zeolites with a Si/Al of 3 showed a high adsorption capacity of 0.65 mmol/g for 400 ppm CO$_2$. Results from CO$_2$ adsorption with pyridine containing MAZ-type zeolite (FIGS. 31A-31B) shows that the 8-MR side-pocket of the MAZ framework is responsible for the adsorption of 400 ppm $CO_2$ (like observed with the MOR-type zeolites). The MFI-type (39 #) zeolites showed a capacity of 0.57 mmol/g, that is much higher than the 0.4 mmol/g from 13X zeolite, although the cation content (Si/Al=12) is 8% of that (Si/Al=1.1) for 13X (34 #). The MEL-type (40 #) zeolite with similar structure and cation content (Si/Al=15) to MFI-type zeolite has a larger intersection (7.7 Å) and gives a much lower uptake for 400 ppm $CO_2$ (Table S12). Thus, the high capacity of MFI-type zeolites is likely attributed to the size (6.4 Å) of the intersection. These results suggest that there are specific regions in the microporous zeolites where adsorption is preferred for capture of $CO_2$ from low concentrations. To further this point, there is no apparent correlation between total micropore volume (Table S11) and $CO_2$ capacity (Table S12).

However, there is a relationship between the adsorption efficiency ($CO_2/Na^+$) and the size of the confined space (see definition in FIG. 29) in zeolites where $CO_2$ molecules are preferentially adsorbed. As shown in FIG. 3B, the highest $CO_2$ adsorption efficiency obtained is from MOR-type zeolites that have a confined space of ca. 6.2 Å. A decline of adsorption efficiency is observed with the increase in size of the confined space in the MFI- and MAZ-type zeolites. Further increase of the confined space leads to a fast decline of $CO_2$ adsorption efficiency to ca. 0.1 $CO_2$/Al for the size >0.8 nm. Interestingly, the adsorption performance for zeolites is distinctly different for 1 bar $CO_2$ and 400 ppm $CO_2$. These results show that the saturated $CO_2$ adsorption capacity at 1 bar highly depends on the total number of adsorption sites in zeolites. As shown in FIG. 3C, the capacity gradually decreases with the increase of Si/Al ratio in zeolites. Indeed, Lobo et al. have shown that the number of energetically favorable sites is decisive for adsorption of low pressure $CO_2$, while $CO_2$ molecules at high pressure can sit in all available sites, i.e., $Na^+$ cations. T. D. Pham, R. Xiong, S. I. Sandler, R. F. Lobo, Experimental and computational studies on the adsorption of $CO_2$ and $N_2$ on pure silica zeolites. *Microporous Mesoporous Mater.* 185, 157-166 (2014). FTIR spectra (FIG. 3D) were obtained to identify the adsorption states of $CO_2$ in zeolites with different topologies. LTL-type zeolites showed an adsorption band at 2348 cm-1, indicating the appearance of gas phase $CO_2$ molecules. The asymmetric vibration of $CO_2$ for zeolites for MOR-, MFI- and MAZ-type zeolites appeared at 2357-2360 $cm^{-1}$, suggesting strong ion-dipole interaction induced by the large electric field gradients in these zeolites with confined space between 6.2-6.7 Å. J. W. Ward, H. W. Habgood, The infrared spectra of carbon dioxide adsorbed on zeolite X. *J. Phys. Chem.* 70, 1178-1182 (1966). Interestingly, further increase of the size of the confined space resulted in a red shift of the physisorption band of the $CO_2$ molecules, showing a decline of electric field in the zeolites. These results demonstrate the significance of the confined space size (the confinement effect) in the adsorption of low concentration $CO_2$ by altering the electric gradient field, while the total density of adsorption sites dictates the adsorption of high concentration $CO_2$.

Figure 4B:
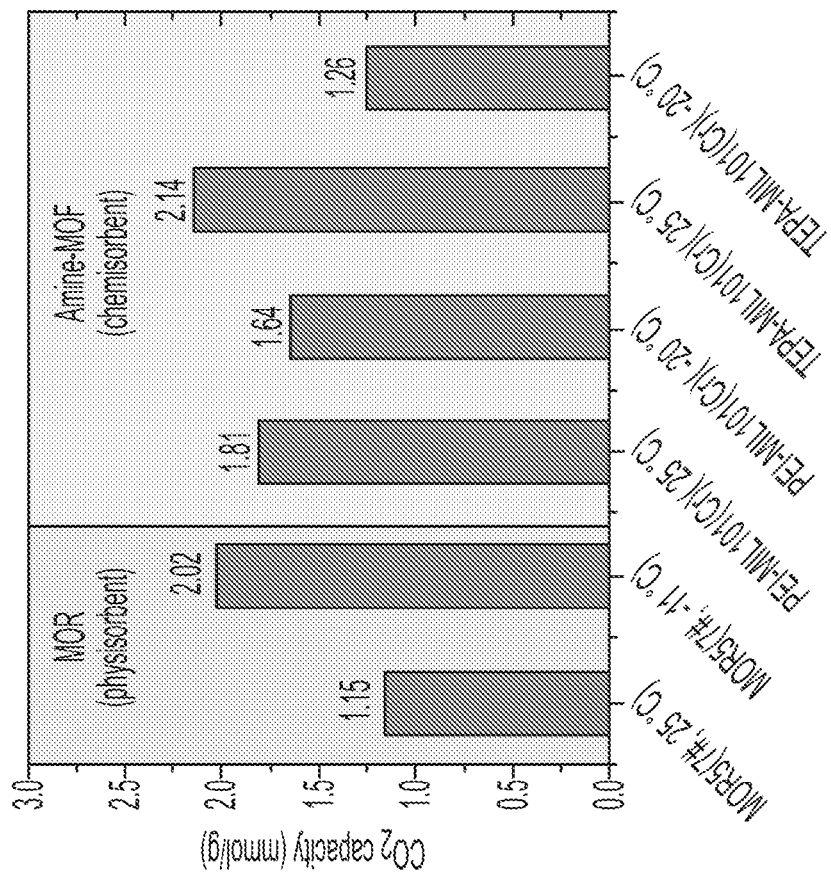
FIGS. 4A-4B show performance of MOR-type zeolites for the capture of $CO_2$ under simulated DAC conditions. 4A) Real time breakthrough profiles for MOR-type zeolites (4 #) with simulated air gas 400 ppm $CO_2$/1Ar % (internal standard)/20% $O_2$/$N_2$ at 30° C. 4B) Capacities of MOR-type (14 #) zeolites for the capture of 400 ppm $CO_2$ at ambient and sub-ambient temperatures, in comparison with amine-modified metal-organic frameworks (MOFs). Data for the amine modified MOFs were obtained from (3).
Figure 4A:
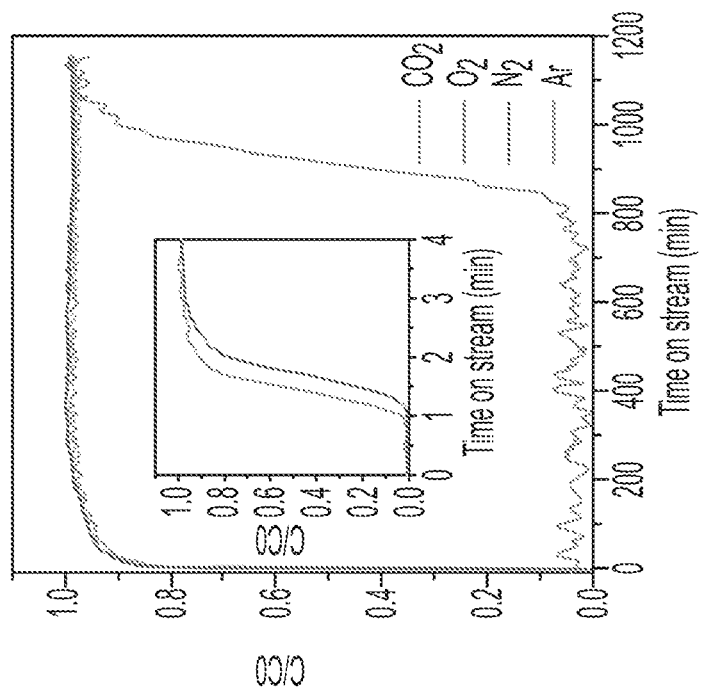
Figure 16:
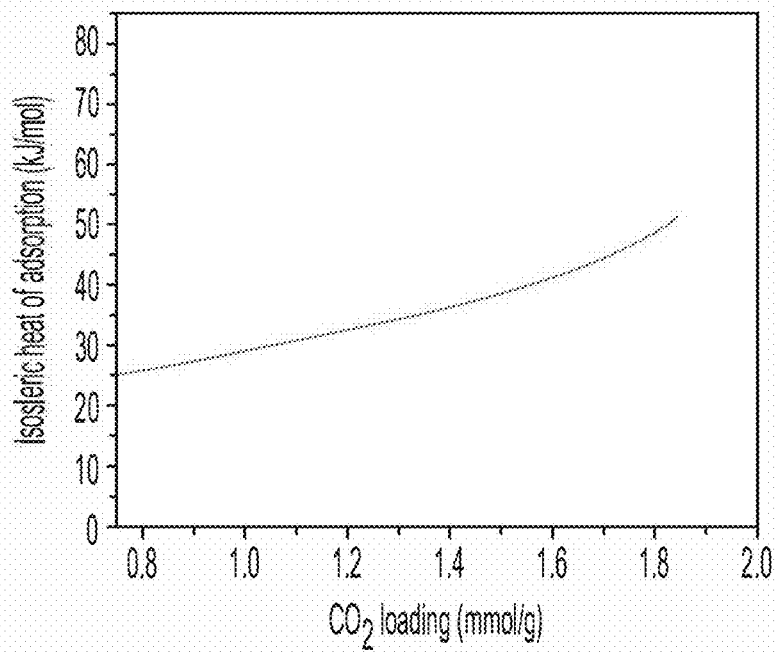
FIG. 16 shows isosteric heat of adsorption of a representative MOR-type zeolite (14 #) in the low-pressure range of 0-0.008 bar.

MOR-type zeolites for DAC. Real time breakthrough experiments were performed with the commercially available MOR-type zeolites (4 #) using simulated air with a gas mixture of 400 ppm $CO_2$/1% Ar/20% $O_2/N_2$ at 30° C., with Ar as the internal standard for quantitative analysis. A $CO_2$ capacity of 0.72 mmol/g was obtained with a breakthrough time of 1839 min/g (800 min for 435 mg dry material) under a flow of 20 mL/min. This value is slightly lower than the 0.77 mmol/g obtained from the 400 ppm $CO_2$/He under the same conditions, which may be attributed to the weak competitive adsorption between $CO_2$ and $N_2$. The preferential adsorption of $CO_2$ also led to a higher $CO_2/N_2$ selectivity (FIG. 32) in the breakthrough experiments with simulated air compared to the value obtained from single-component isotherm measurements. The material is also highly stable under DAC conditions, as demonstrated by the comparable $CO_2$ capacity obtained from 6 adsorption-desorption cycles with simulated air (FIGS. 33A-33B). It should be noted that the material can be fully regenerated at temperatures as low as 60° C., which is a benefit of using pure physisorption (FIGS. 14A-14B) with the low isosteric heat of adsorption (FIG. 16). $CO_2$ capacity sharply increased to 2.02 mmol/g for MOR(14 #) at −11° C. compare to that from 25° C. (FIGS. 4B and 33A-33B), while a decline of adsorption efficiency/capacity was observed for chemisorbents with the increase of adsorption temperatures. Thus, this material may be promising for DAC under sub-ambient temperature conditions as ca. 80% of the world land temperature is lower than 25° C. G. Rim, et al., Sub-ambient temperature direct air capture of $CO_2$ using amine-impregnated MIL-101(Cr) enables ambient temperature $CO_2$ recovery. *JACS Au* 2, 380-393 (2022). As with all zeolites used to date, the presence of water typically is detrimental to their $CO_2$ adsorption performance. As mentioned above, there are situations where the removal of water prior to $CO_2$ uptake can be accomplished.

Summary MOR-type zeolites are promising physisorbents for the capture of low concentration $CO_2$, e.g., DAC. The $Na^+$ located at the O33 site in the 8-MR side-pocket of the MOR framework is responsible for the capture of most of the 1.15 mmol $CO_2$/g zeolites under low concentration conditions, and the value is among the highest obtained for physisorbents with a low isosteric heat of adsorption of ca. 30 kJ/mol. The size of the confined space in the zeolite is critical to achieve high performance for the adsorption of low concentration $CO_2$. MOR-type zeolites show the greatest effects from confinement. They also adsorb $CO_2$ with negligible impact from the presence of $N_2$ and $O_2$, the latter can cause the time-dependent degradation of amine-based adsorbents. Additionally, the capacity of the MOR-type zeolite can be further increased to over 2 mmol $CO_2$/g zeolite at sub-ambient temperatures, outperforming amine-based adsorbents under those conditions as the latter shows a decline in capacity with the decrease in temperature.

MOR-Type Zeolites for DAC from Humid Gaseous Source Mixture.

Simulated air containing 2500 ppm $H_2O$ was passed through a column of MOR zeolite at 30° C. The MOR zeolite exhibited a $CO_2$ capacity of 0.94 mmol/gram of zeolite. Regeneration of the zeolite at 200° C. returned the zeolite to a $CO_2$ capacity of only 0.73 mmol/gram. Regeneration of the zeolite at 300° C. returned the zeolite to a $CO_2$ capacity of only 0.93 mmol/gram. Thus, in the absence of a desiccant, a regeneration temperature of 300° C. is needed to maintain $CO_2$ capacity.

Simulated air containing 2500 ppm $H_2O$ was passed through a column of SAPO-34 and then a column of MOR zeolite at 30° C. The MOR zeolite exhibited a $CO_2$ capacity of 0.94 mmol/gram of zeolite. Regeneration of the zeolite at 100° C. returned the zeolite to a $CO_2$ capacity of 0.93 mmol/gram in a first cycle, and then 0.94 mmol/gram in a second cycle. Thus, when SAPO-34 is used as a desiccant to pre-treat the source gas mixture, a regeneration temperature of only 100° C. is needed to maintain the $CO_2$ capacity of MOR7. The results of this study are shown in Figure. 52.

MOR-type zeolites for DAC from Humid Gaseous Source Mixture at low temperatures.

For multi-layer bed experiments, SAPO-34 (Mitsubishi Plastic Inc.) was loaded in the upstream of $CO_2$ adsorbent bed and the two materials were separated with quartz wool. The ratio between SAPO-34 and $CO_2$ adsorbent was determined by the duration of water breakthrough with SAPO-34 and the duration of $CO_2$ saturation with adsorbent. Typically, 300 mg SAPO-34 and 250 mg MOR-type zeolites were used for simulated air with 2500 ppm $H_2O$. 350 mg SAPO-34 and 150 mg MOR-type zeolites with Si/Al=7 (MOR7, CBV10A) were used for simulated air with 20000 ppm $H_2O$. The adsorption measurements were performed at 30 or −10° C. with a 60 mL/min flow of simulated air. A reversed flow of 5% Ar/He gas was used for regeneration at corresponding temperatures.

The effect of temperature of the ability of SAPO-34 desiccant to maintain the $CO_2$ capacity of MOR7 at low temperatures was also demonstrated. Simulated air containing 2500 ppm $H_2O$ was passed through a column of SAPO-34 and then a column of MOR zeolite at −10° C., and at 30° C. The $CO_2$ capacity of MOR was the same as the $CO_2$ capacity observed with dry air at the same temperatures. The results of this experiment are shown in FIG. 51.

Multicycle adsorption-desorption of two parallel adsorption units with dual-layer beds.

A two-bed system was designed and employed for the multi-cycle experiments with two parallel SAPO-34+MOR units. Typically, one unit (Unit A) is running for $CO_2$ adsorption at 30° C. with simulated, humid air, while another unit (Unit B) is running for regeneration at 100° C. with the exhaust gas from Unit A. The adsorption measurements were performed at 30° C. with a ca. 64 mL/min flow of simulated air. A reversed flow of 5% Ar/He gas was used for regeneration at corresponding temperatures.

Adsorption-desorption in a DAC system having two parallel adsorption units was demonstrated through 15 adsorption-desorption cycles. Each adsorption unit had a dual layer bed comprising a layer of SAPO-34 upstream of a layer of MOR. Adsorption was demonstrated using simulated air at containing 2500 ppm water at 30° C. Desorption was achieved by passing the effluent gas from an adsorption unit through the unit undergoing desorption at 100° C. These results demonstrated that running two parallel units can efficiently capture $CO_2$ from humid air (2500 ppm $H_2O$) with adsorption and desorption at 30 and 100° C., respectively. The results of this experiment are shown in FIGS. 53 and 54.

What is claimed:

1. A metal ion-doped crystalline microporous aluminosilicate composition comprising: a three-dimensional aluminosilicate framework having Mordenite topology comprising 12-MR channels and 8-MR side pockets; wherein the crystalline microporous aluminosilicate contains 2.5 to 9 metal ions per unit cell, wherein the ratio of metal ions to aluminum within the unit cell is from 0.3 to 1.4; and wherein the metal ion-doped crystalline microporous aluminosilicate composition adsorbs carbon dioxide when exposed to a gaseous mixture comprising $CO_2$.

2. The metal ion-doped crystalline microporous aluminosilicate composition of claim 1, wherein the gaseous mixture further comprises oxygen.

3. The metal ion-doped crystalline microporous aluminosilicate composition of claim 1, wherein the gaseous mixture further comprises air.

4. The metal ion-doped crystalline microporous aluminosilicate composition of claim 1, wherein the composition has a Si:Al atomic ratio in a range of from 4:1 to 13:1.

5. The metal ion-doped crystalline microporous aluminosilicate composition of claim 4, wherein the composition has a Si:Al atomic ratio in a range of from 6:1 to 13:1.

6. The metal ion-doped crystalline microporous aluminosilicate composition of claim 4, wherein the composition has a Si:Al atomic ratio in a range of from 4:1 to 6:1.

7. The metal ion-doped crystalline microporous aluminosilicate composition of claim 4, wherein the composition has a Si:Al atomic ratio in a range of from 4:1 to 5.9:1.

8. The metal ion-doped crystalline microporous aluminosilicate composition of claim 1, wherein the metal ions are positioned within voids or channels of the three-dimensional aluminosilicate framework.

9. The composition according to claim 1, wherein the metal ions are alkali metal cations.

10. The composition according to claim 1, wherein the crystalline microporous aluminosilicate contains 6 to 9 metal ions per unit cell.

11. The composition according to claim 1, wherein the crystalline microporous aluminosilicate contains 2.5 to 5 metal ions in the 8-MR side-pocket per unit cell.

12. The composition according to claim 1, wherein the metal ions are alkaline earth metal cations.

13. The composition according to claim 1, wherein the crystalline microporous aluminosilicate contains 3 to 4.5 metal ions per unit cell.

14. The composition according to claim 1, wherein the crystalline microporous aluminosilicate contains 1.2 to 2.5 metal ions in the 8-MR side-pocket per unit cell.

15. The metal ion-doped crystalline microporous aluminosilicate composition of claim 1, wherein the metal ion-doped crystalline microporous aluminosilicate composition adsorbs at least 0.9 mmol of carbon dioxide per gram of metal ion-doped crystalline microporous aluminosilicate composition when exposed to $CO_2$ at a pressure of 0.0004 bar and a temperature of 25° C.

16. The metal ion-doped crystalline microporous aluminosilicate composition of claim 1, wherein the metal ion-doped crystalline microporous aluminosilicate composition adsorbs at least 1.1 mmol of carbon dioxide per gram of metal ion-doped crystalline microporous aluminosilicate composition when exposed to $CO_2$ at a pressure of 0.0004 bar and a temperature of 25° C.

17. The metal ion-doped crystalline microporous aluminosilicate composition of claim 1, wherein the metal ion-doped crystalline microporous aluminosilicate composition adsorbs at least 1.4 mmol of carbon dioxide per gram of metal ion-doped crystalline microporous aluminosilicate composition when exposed to $CO_2$ at a pressure of 0.0004 bar and a temperature of 25° C.

18. The metal ion-doped crystalline microporous aluminosilicate composition of claim 1, wherein the metal ion-doped crystalline microporous aluminosilicate composition adsorbs at least 2.0 mmol of carbon dioxide per gram of metal ion-doped crystalline microporous aluminosilicate composition when exposed to $CO_2$ at a pressure of 0.0004 bar and a temperature of −11° C.

19. The metal ion-doped crystalline microporous aluminosilicate composition of claim 1, wherein passage of a gaseous mixture having (a) a total pressure in a range of from 50 kPa to 350 kPa, and (b) a $CO_2$ content in a range of from 350 to 1000 ppm, through a tube containing a fixed bed of the metal ion-doped crystalline microporous aluminosilicate composition, results in complete breakthrough of $CO_2$ after adsorption of an amount of $CO_2$ (on a mmol/g basis) that is 1.5-2 times greater than the amount of $CO_2$ adsorbed by an equal weight of zeolite 13X before complete saturation of $CO_2$ occurs under the same conditions.

20. A method of capturing carbon dioxide from a gaseous source mixture that comprises carbon dioxide, the method comprising contacting the gaseous source mixture with the metal ion-doped crystalline microporous aluminosilicate of claim 1 such that carbon dioxide in the gaseous source mixture is adsorbed by the metal ion-doped crystalline microporous aluminosilicate.

21. The method of claim 20, wherein the gaseous mixture further comprises air.

22. The method of claim 20, wherein contacting the gaseous source mixture with the metal ion-doped crystalline microporous aluminosilicate occurs at a temperature of less than 50° C.

23. The method of claim 20, wherein the gaseous source mixture has (a) a total pressure in a range of from 50 kPa to 350 kPa, and (b) a $CO_2$ content in a range of from 350 to 1000 ppm.

24. The method of claim 23, wherein the gaseous source mixture has a $CO_2$ content in a range of from 350 to 425 ppm.

25. The method of claim 23, wherein the gaseous source mixture has a total pressure in a range of from 50 kPa to 300 kPa.

26. A method of capturing carbon dioxide from a humid gaseous source mixture that comprises water and carbon dioxide, wherein the method comprises contacting the gaseous source mixture first with a desiccant, then with the metal ion-doped crystalline microporous aluminosilicate of claim 1, such that such that water in the gaseous source mixture is adsorbed by the desiccant and carbon dioxide in the gaseous source mixture is adsorbed by the metal ion-doped crystalline microporous aluminosilicate.

27. The method of claim 26, wherein the desiccant is SAPO-34 or ALPO-34.

28. The method of claim 26, wherein the desiccant is regenerated by passing a gas through the desiccant at a temperature of 150° C. or less, 140° C. or less, 130° C. or less, 120° C. or less, 110° C. or less, 100° C. or less, 90° C. or less, or 80° C. or less.

* * * * *